(12) United States Patent
Guo et al.

(10) Patent No.: US 10,491,888 B2
(45) Date of Patent: Nov. 26, 2019

(54) METHOD AND APPARATUS FOR DETERMINING STEREOSCOPIC MULTIMEDIA INFORMATION

(71) Applicant: SAMSUNG ELECTRONICS CO., LTD., Suwon-si (KR)

(72) Inventors: Liang Guo, Beijing (CN); Zijian Xu, Beijing (CN); Li Zuo, Beijing (CN); Qixing Lu, Beijing (CN); Zhanlong Hao, Beijing (CN); Yanjun Gao, Beijing (CN); Junjun Xiong, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 15/880,050

(22) Filed: Jan. 25, 2018

(65) Prior Publication Data

US 2018/0213208 A1 Jul. 26, 2018

(30) Foreign Application Priority Data

Jan. 25, 2017 (CN) .......................... 2017 1 0056693
Jan. 24, 2018 (KR) ........................ 10-2018-0008920

(51) Int. Cl.
*H04N 13/296* (2018.01)
*G06T 7/246* (2017.01)
(Continued)

(52) U.S. Cl.
CPC ......... *H04N 13/296* (2018.05); *B64C 39/024* (2013.01); *G05D 1/0027* (2013.01);
(Continued)

(58) Field of Classification Search
None
See application file for complete search history.

(56) References Cited

U.S. PATENT DOCUMENTS 8,902,295 B2 12/2014 Bickerstaff et al.
9,277,122 B1 3/2016 Imura et al.
(Continued)

FOREIGN PATENT DOCUMENTS

WO 2016/086379 A1 6/2016

OTHER PUBLICATIONS

International Search Report (PCT/ISA/210), issued by International Searching Authority in corresponding International Application No. PCT/KR2018/001135, dated Apr. 27, 2018.
(Continued)

*Primary Examiner* — Dakshesh D Parikh
(74) *Attorney, Agent, or Firm* — Sughrue Mion, PLLC

(57) ABSTRACT

Disclosed is a method, device and system for determining stereoscopic multimedia information. The method includes: acquiring multimedia information collected by respective multimedia collection apparatuses of two or more aerial vehicles; and, determining corresponding stereoscopic multimedia information according to the acquired multimedia information. In the present disclosure, a same object is shot by respective loaded multimedia collection apparatuses of two or more aerial vehicles at different angles. In comparison with conventionally shooting a same object by a single unmanned aerial vehicle at a same angle, more stereoscopic multimedia information may be obtained, and a user is more likely to feel the stereoscopic impression of the multimedia information when viewing the multimedia information. In this way, both the visual enjoyment of the user and the user experience are improved.

20 Claims, 26 Drawing Sheets

Long baseline

Short distance (a) Different object distances (b) Different sizes of the occupied regions

(51) Int. Cl.
*G05D 1/00* (2006.01)
*B64C 39/02* (2006.01)
*H04N 13/144* (2018.01)
*H04N 13/00* (2018.01)

(52) U.S. Cl.
CPC ......... *G05D 1/0038* (2013.01); *G05D 1/0094* (2013.01); *G06T 7/248* (2017.01); *H04N 13/144* (2018.05); *B64C 2201/024* (2013.01); *B64C 2201/127* (2013.01); *B64C 2201/146* (2013.01); *G06T 2207/10021* (2013.01); *H04N 2013/0081* (2013.01); *H04N 2013/0085* (2013.01)

(56) References Cited

U.S. PATENT DOCUMENTS

| | | | |
|---|---|---|---|
| 2010/0066815 A1 | 3/2010 | Allen | |
| 2016/0253808 A1* | 9/2016 | Metzler | G06T 17/05 382/103 |
| 2016/0301916 A1 | 10/2016 | Zhang et al. | |
| 2017/0251193 A1* | 8/2017 | Zhou | G01C 11/06 |

OTHER PUBLICATIONS

Written Opinion (PCT/ISA/237) issued by the International Searching Authority in corresponding International Application No. PCT/KR2018/001135, dated Apr. 27, 2018.

* cited by examiner

Unmanned aerial vehicle 1
Unmanned aerial vehicle 2

METHOD AND APPARATUS FOR DETERMINING STEREOSCOPIC MULTIMEDIA INFORMATION

CROSS-REFERENCE TO RELATED APPLICATION

This application is based on and claims priority under 35 U.S.C. § 119 to Chinese Patent Application Serial No. 201710056693.X, filed on Jan. 25, 2017, in the State Intellectual Property Office (SIPO) of the People's Republic of China, and to Korean Patent Application Serial No. 10-2018-0008920, filed on Jan. 24, 2018, in the Korean Intellectual Property Office (KIPO), the disclosures of which are incorporated by reference herein in their entirety.

BACKGROUND

1. Field

The present disclosure relates to the technical field of vision processing, and in particular to a method and apparatus for determining stereoscopic multimedia information.

2. Discussion of Related Art

The Virtual Reality (VR) technology is a technology for providing a sense of immersion in a computation-generated interactive stereoscopic (i.e., three-dimensional) environment by comprehensively utilizing a computer graphic system and various display and control interface apparatuses. At present, with the increasing popularization of VR apparatuses, more and more users start enjoying such immersive experience, and a large amount of stereoscopic video sources are required. Accordingly, the stereoscopic video sources become more important. A user might want to view a stereoscopic video shot by himself/herself. However, since equipments for shooting a stereoscopic video are expensive, purchasing such equipments to shoot a stereoscopic video is high in cost. Meanwhile, a user might have a demand for viewing stereoscopic videos shot at a high altitude.

In conventional methods for shooting stereoscopic videos, stereoscopic videos are generally formed based on dual-camera frame images collected by a binocular camera having a normal pupil distance. A user may hold by hands a binocular camera for shooting. When shooting a close-shot video, the user may place the binocular camera for shooting the close-shot video on a holder, and move the holder for shooting along a prearranged trajectory; and, when shooting a long-shot video, the user may mount the binocular camera on an unmanned aerial vehicle for shooting.

However, when an object to be shot is far from the camera mounted on the unmanned aerial vehicle, the object to be shot in a video obtained by the conventional method for shooting stereoscopic videos may not have any stereoscopic effect.

SUMMARY

In accordance with an aspect of the disclosure, a method and apparatus for determining stereoscopic multimedia information are provided in order to solve the problem in the prior art that a far-distance object to be shot in the shot videos does not have any stereoscopic effect.

In accordance with an aspect of the present disclosure, a method for determining stereoscopic multimedia information is provided. The method includes: adjusting a baseline distance between a plurality of aerial vehicles based on a target object to be shot by the plurality of aerial vehicles; acquiring multimedia information about the target object from each of the plurality of aerial vehicles with the adjusted baseline distance; and determining stereoscopic multimedia information based on the acquired plurality of multimedia information.

In accordance with another aspect of the present disclosure, an apparatus for determining stereoscopic multimedia information is provided. The apparatus includes a transceiver transmitting and receiving data; and a processor configured to adjust a baseline distance between a plurality of aerial vehicles based on a target object to be shot by the plurality of aerial vehicles, acquire multimedia information about the target object from each of the plurality of aerial vehicles with the adjusted baseline distance, and determine stereoscopic multimedia information based on the acquired plurality of multimedia information.

According to embodiments of the present disclosure, a same object may be shot by multimedia collection apparatuses loaded on a plurality of aerial vehicles at different angles.

When comparing the conventional method in which the same object is shot by a single unmanned aerial vehicle at the same angle and embodiments of the present disclosure in which the same object is shot by a plurality of aerial vehicles at different angles, an apparatus for determining stereoscopic multimedia information in accordance with embodiments of the present disclosure may obtain more stereoscopic multimedia information, allowing the user to be more likely to feel the stereoscopic impression of the multimedia information when viewing the multimedia information.

Accordingly, the embodiments of the present disclosure may give the user a delight to the eyes and improve experience of the user.

Additional aspects and advantages of the present disclosure may be partially obvious or learned well from the following description.

BRIEF DESCRIPTION OF THE DRAWINGS

The above and/or additional aspects and advantageous of the present disclosure will become apparent and be more readily appreciated from the following descriptions of embodiments, with reference to the accompanying drawings, in which.

Figure 6A:
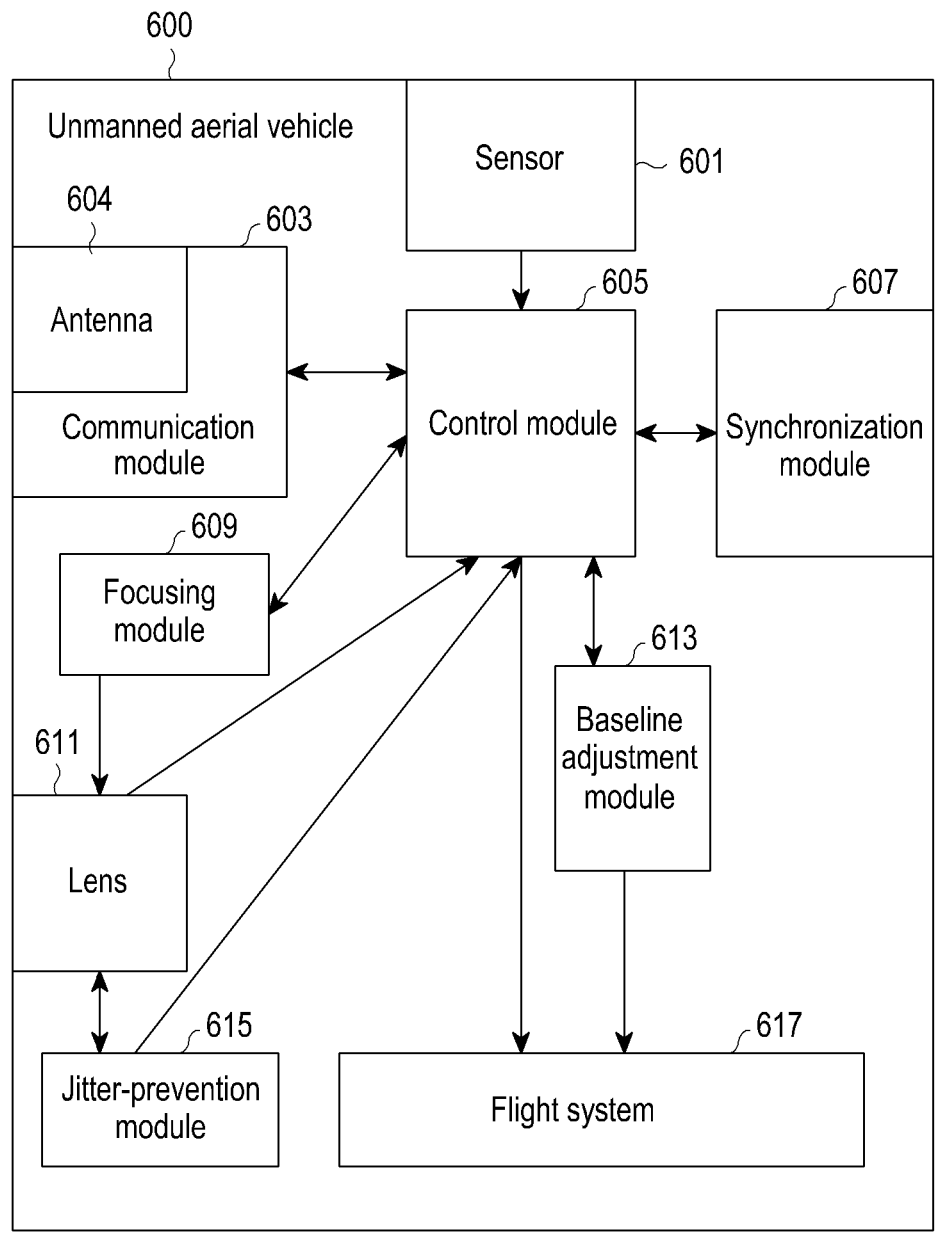
Figure 6B:
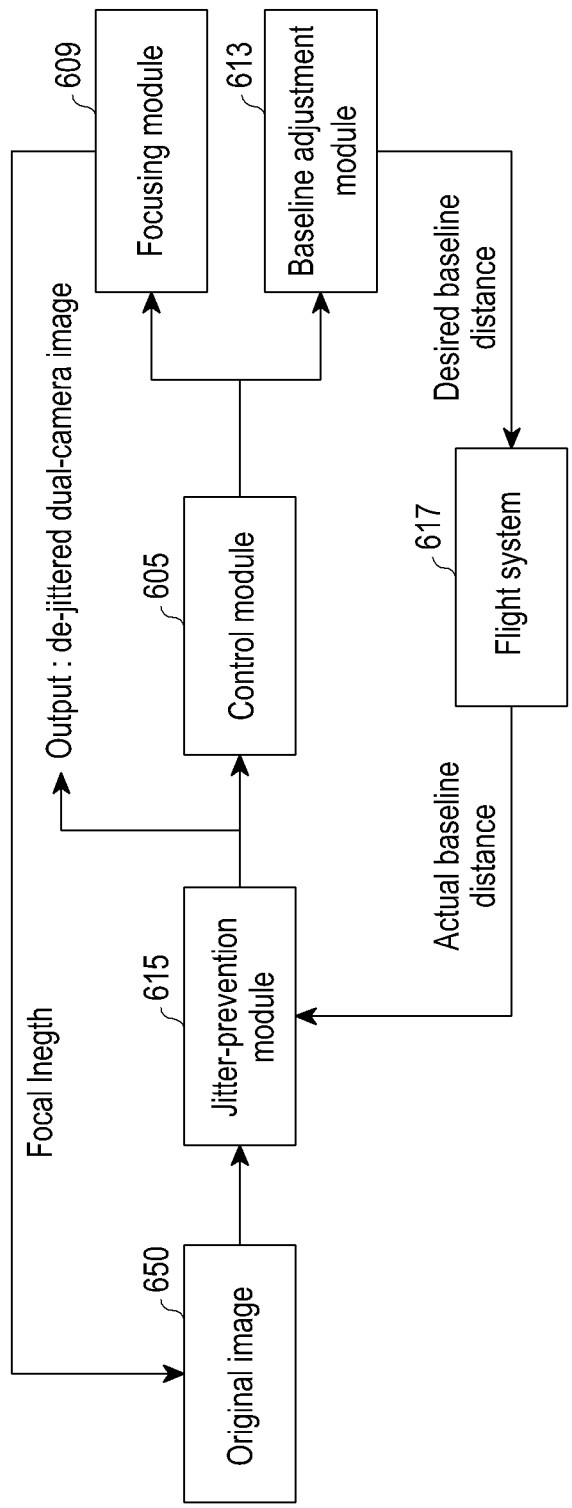
Figure 7:
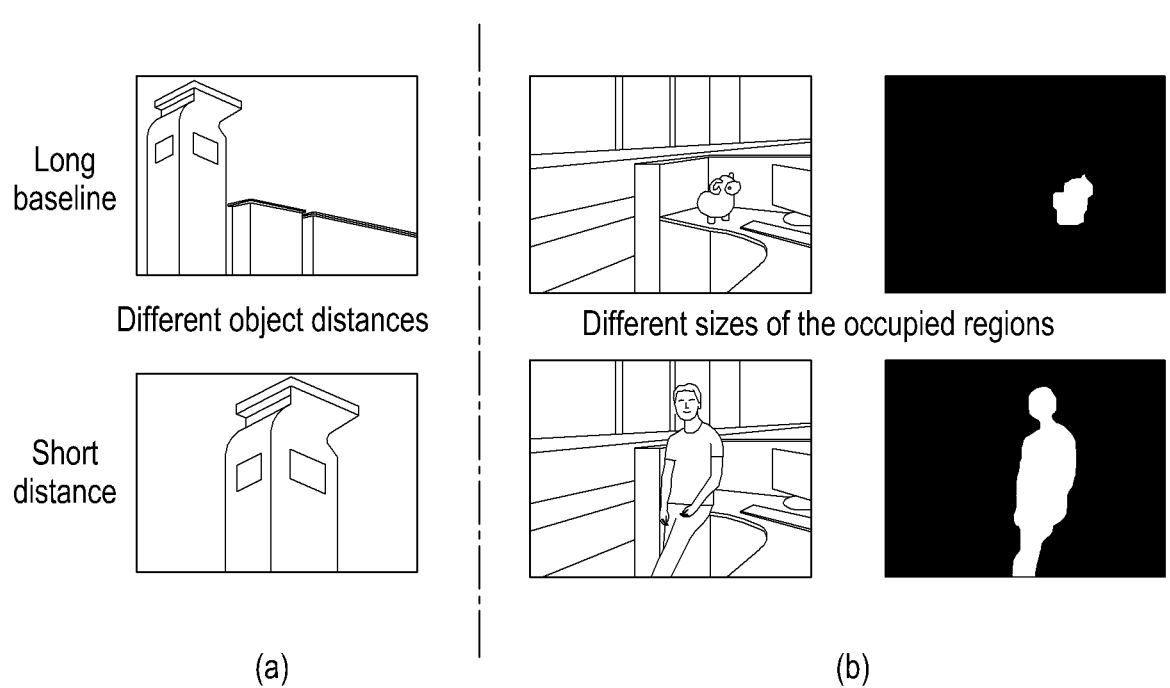
Figure 8:
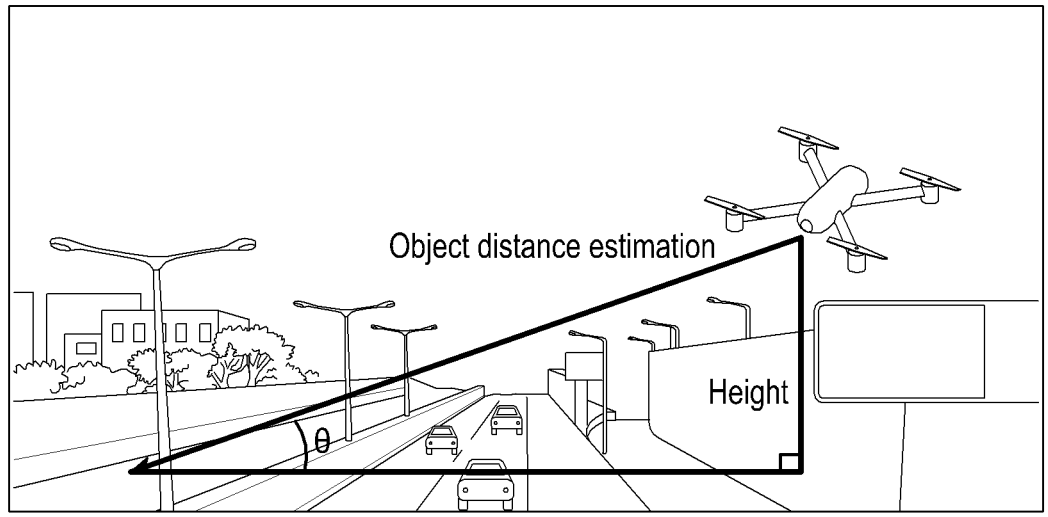
Figure 9:
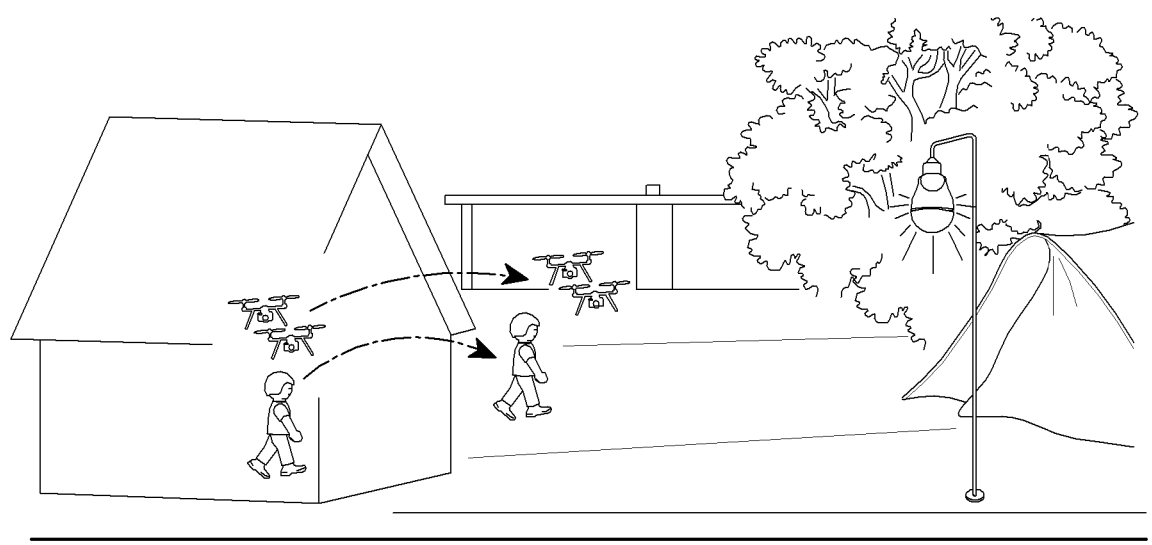
Figure 10A:
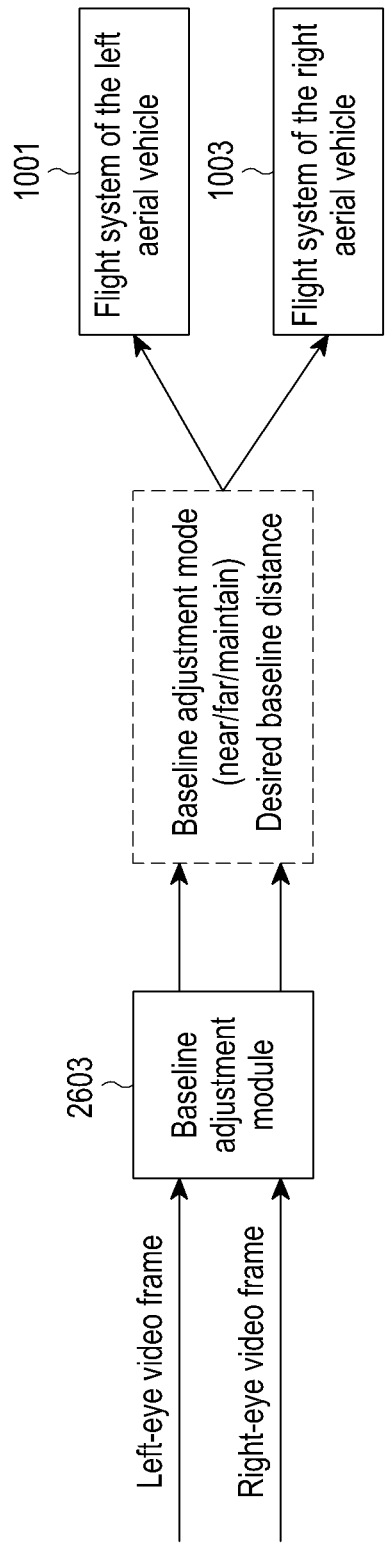
Figure 10B:
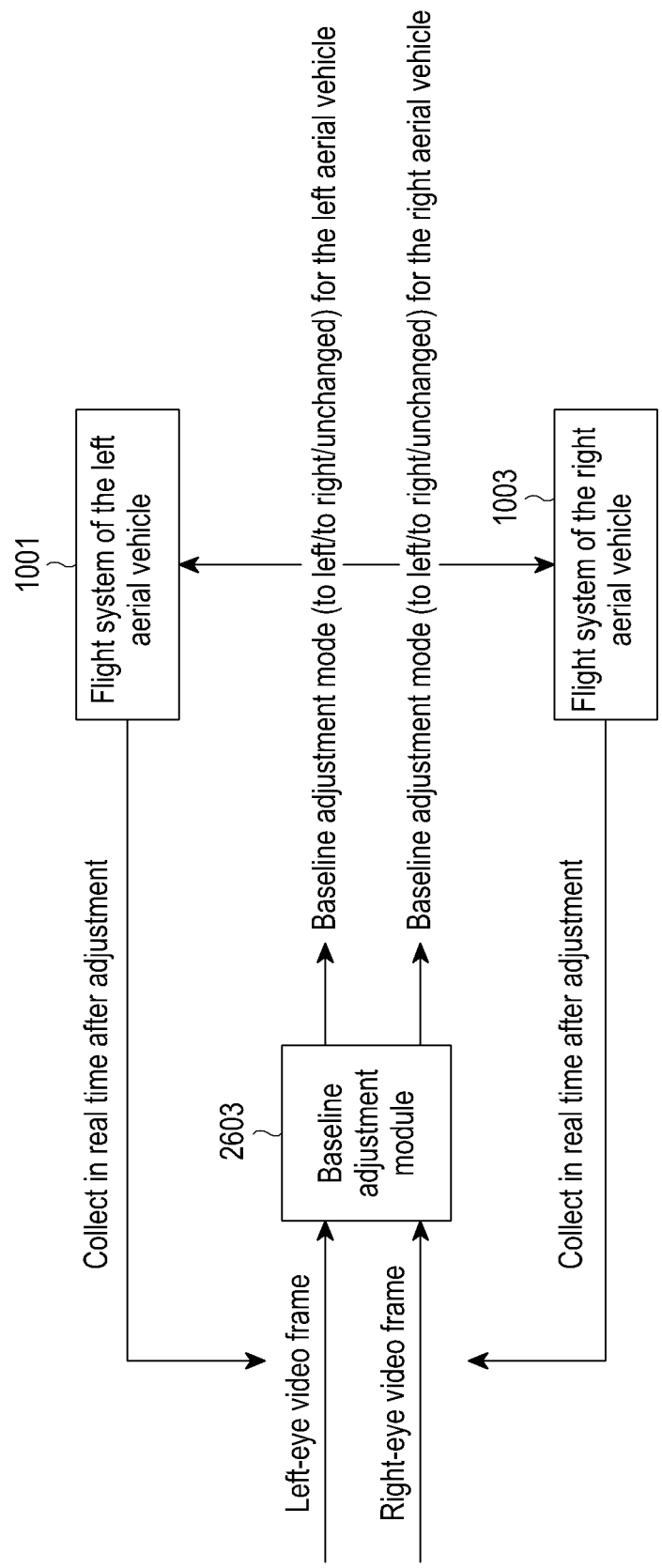
Figure 11:
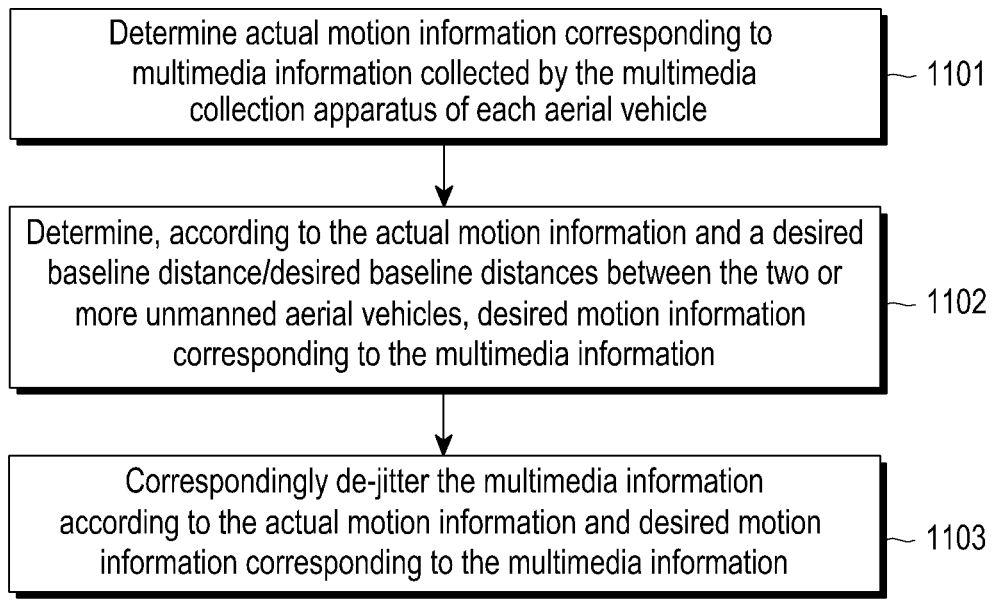
Figure 12:
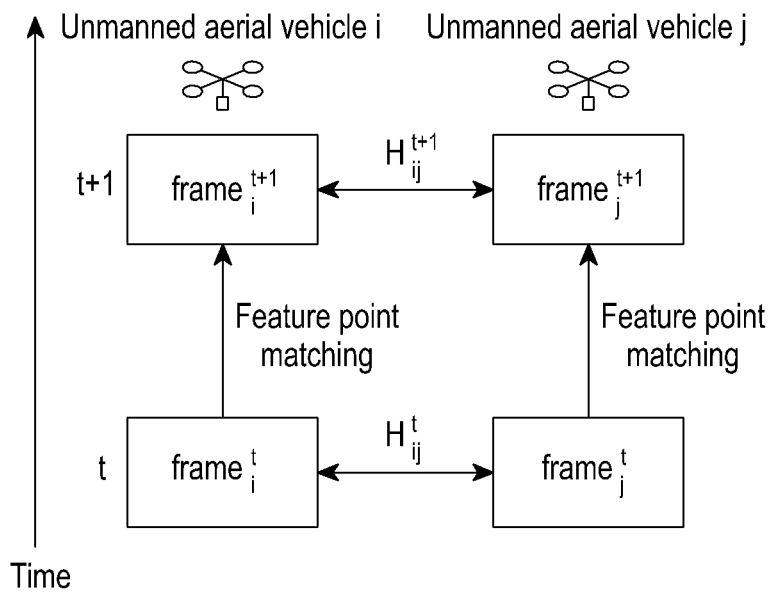
Figure 13A:
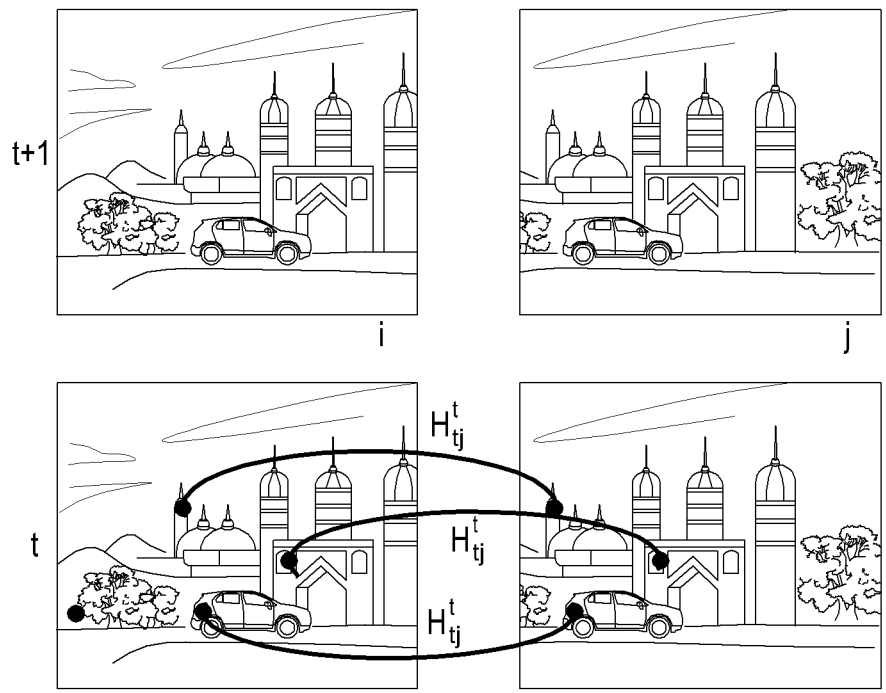
Figure 13B:
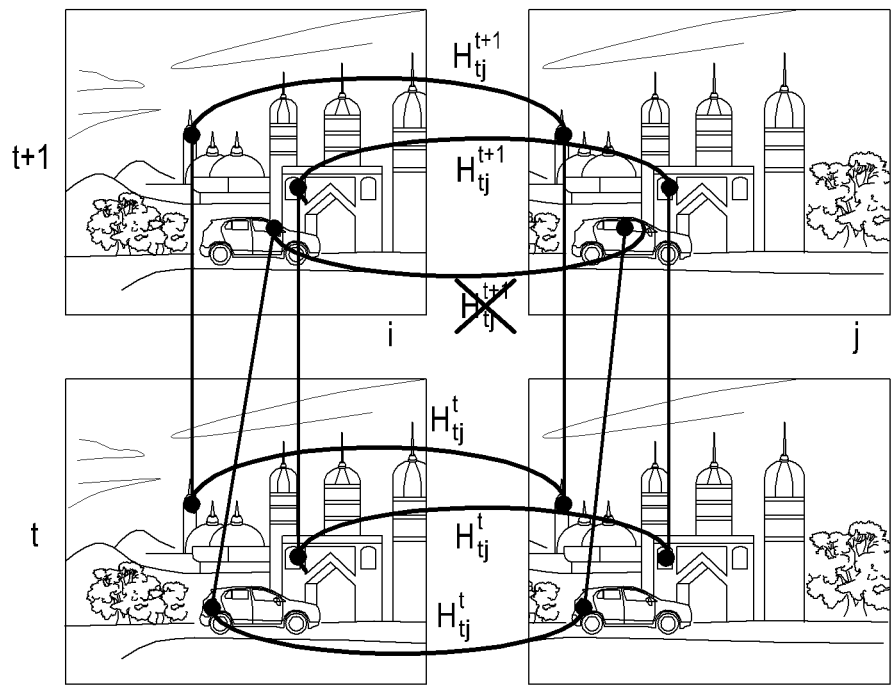
Figure 14:
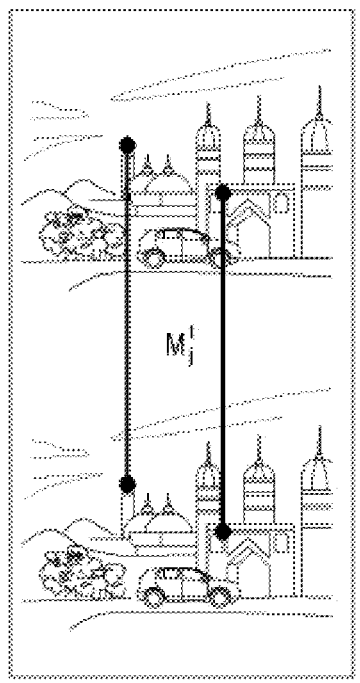
Figure 15:
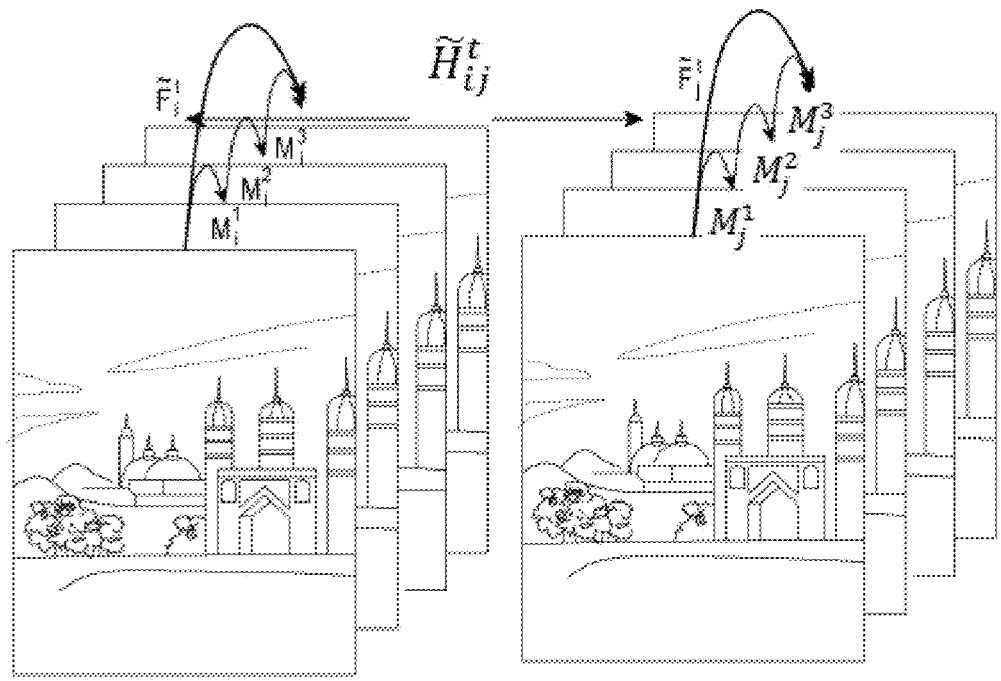
Figure 16:
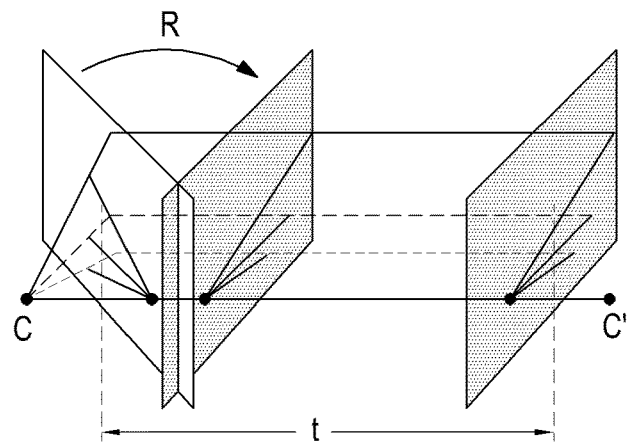
Figure 17A:
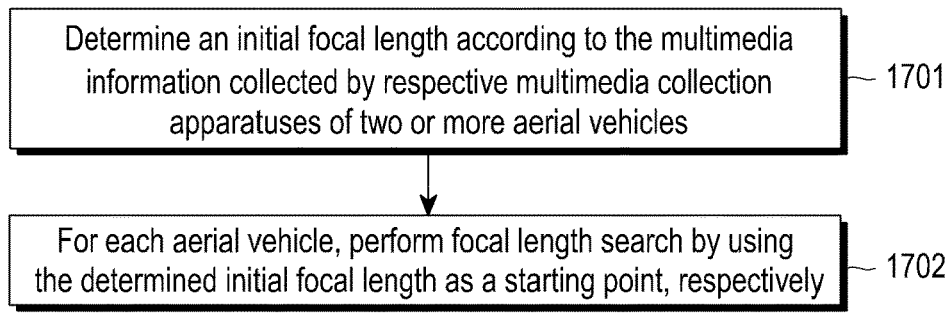
Figure 17B:
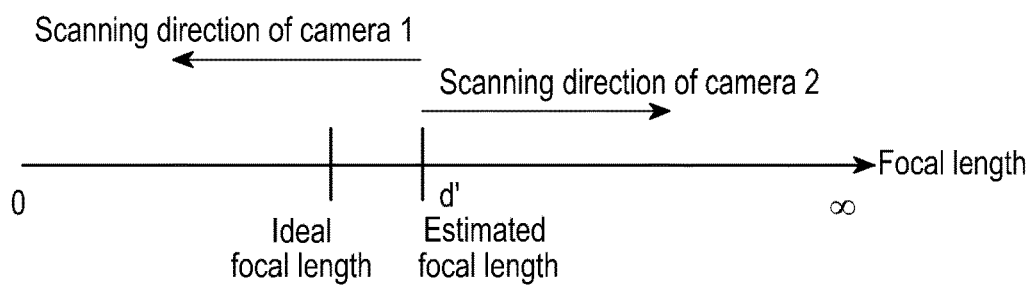
Figure 17C:
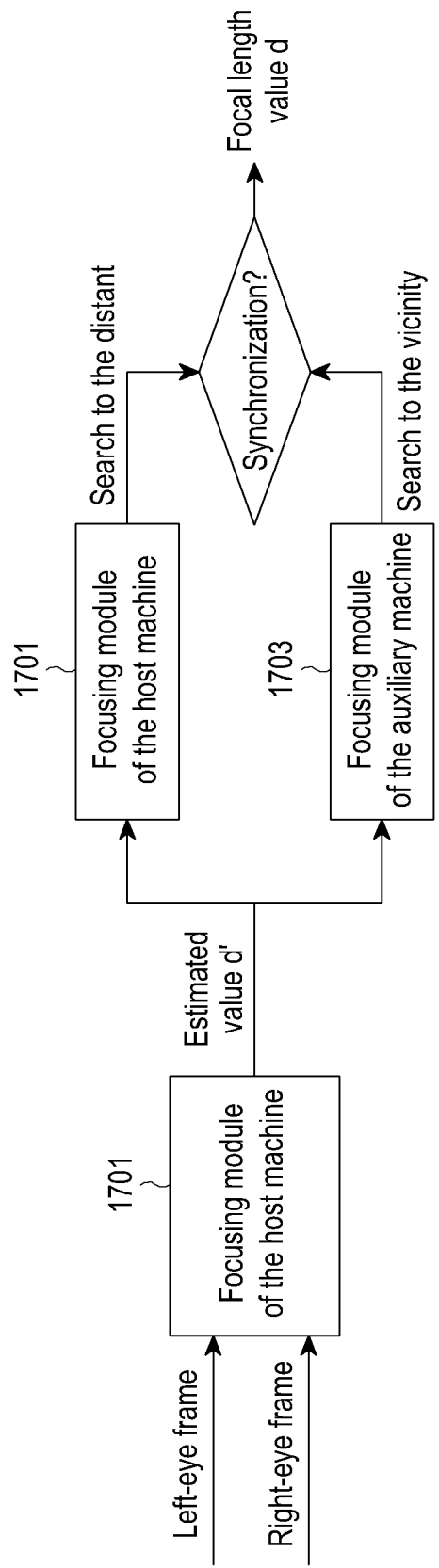
Figure 18:
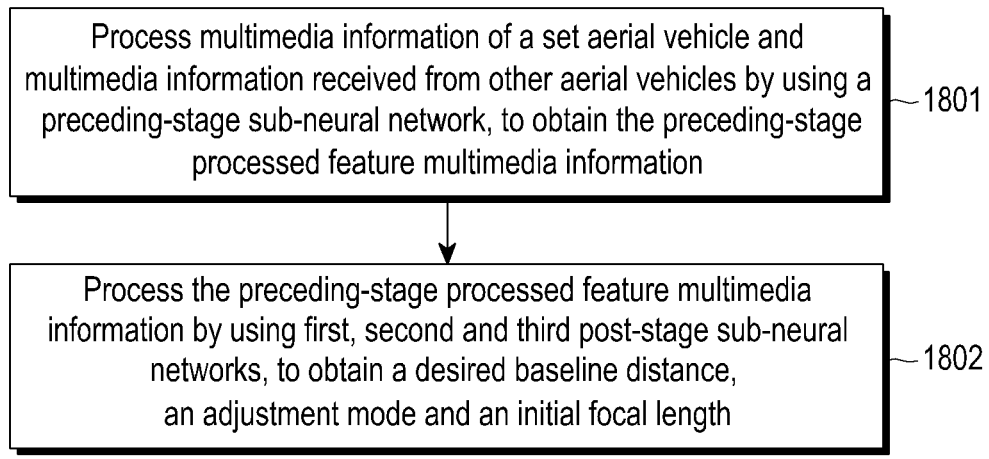
Figure 19:
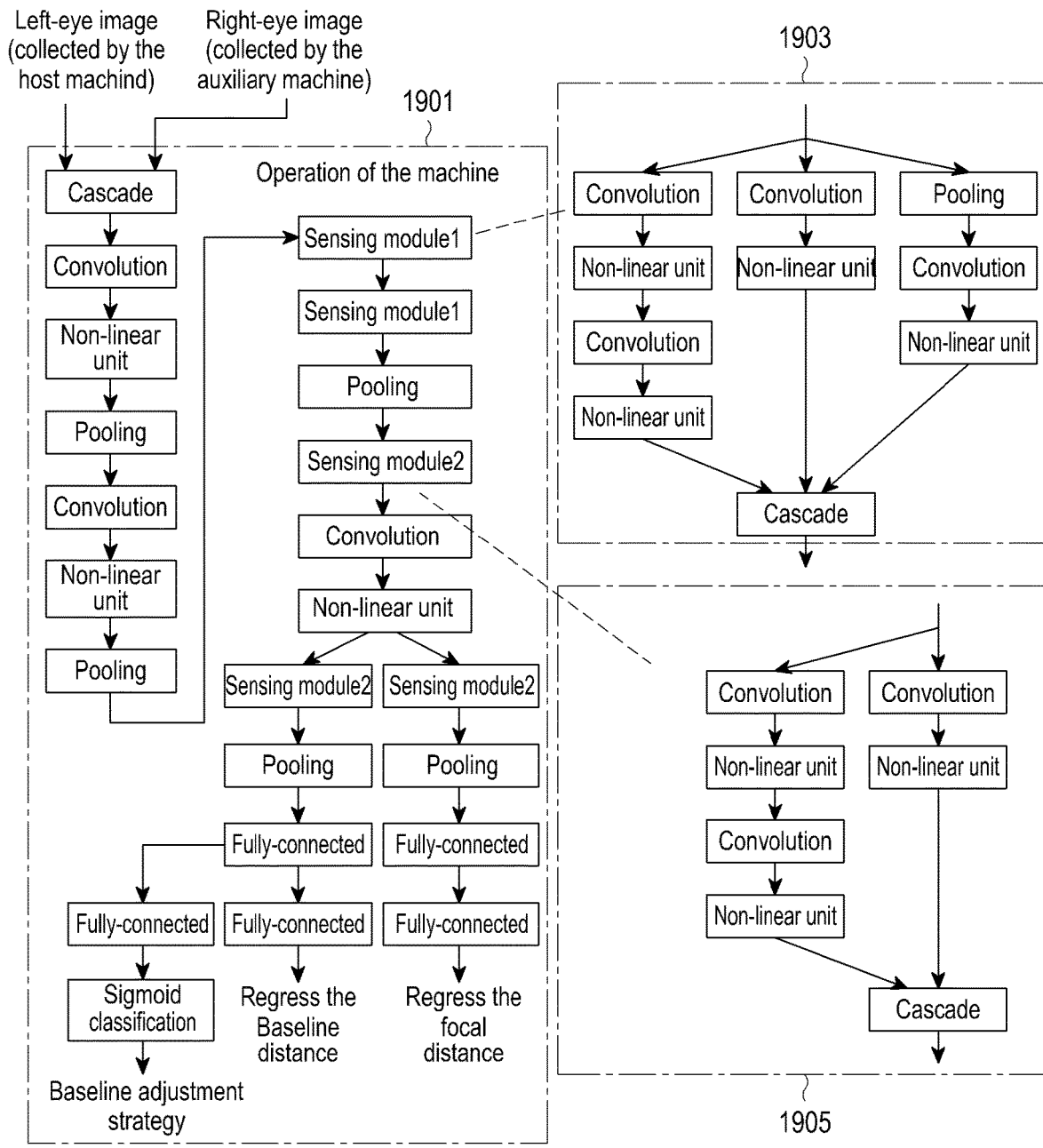
Figure 20:
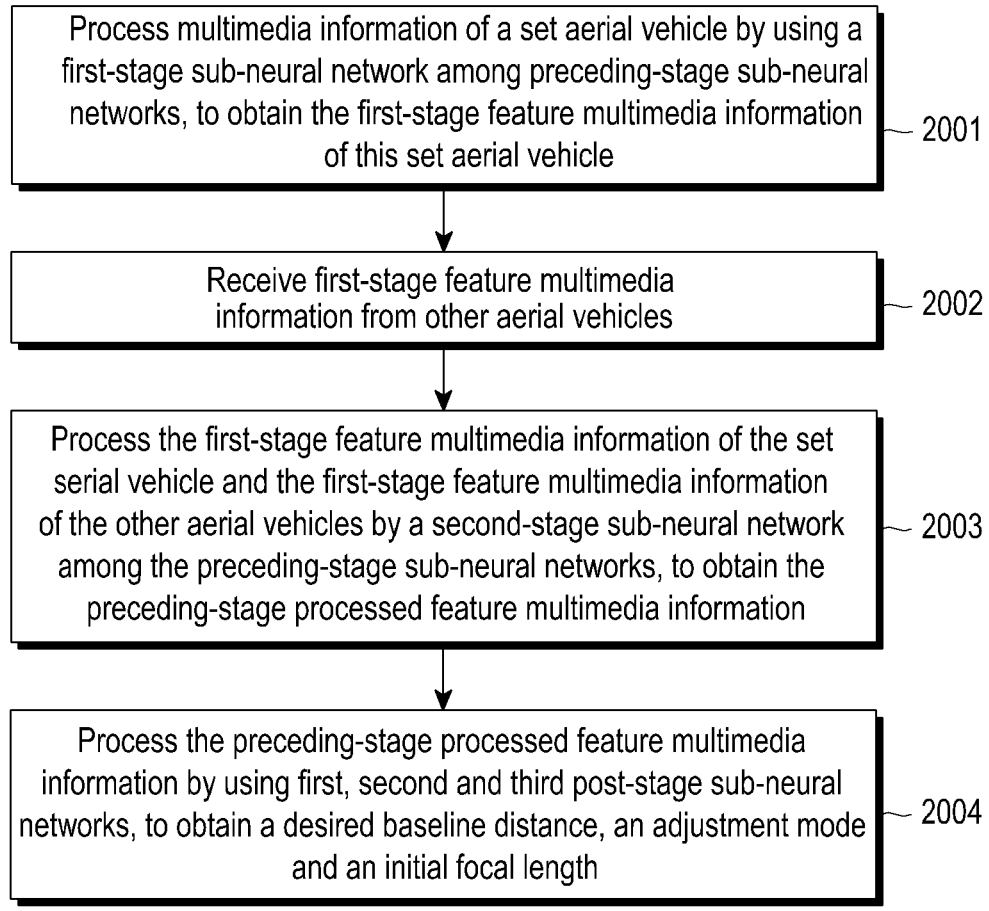
Figure 21:
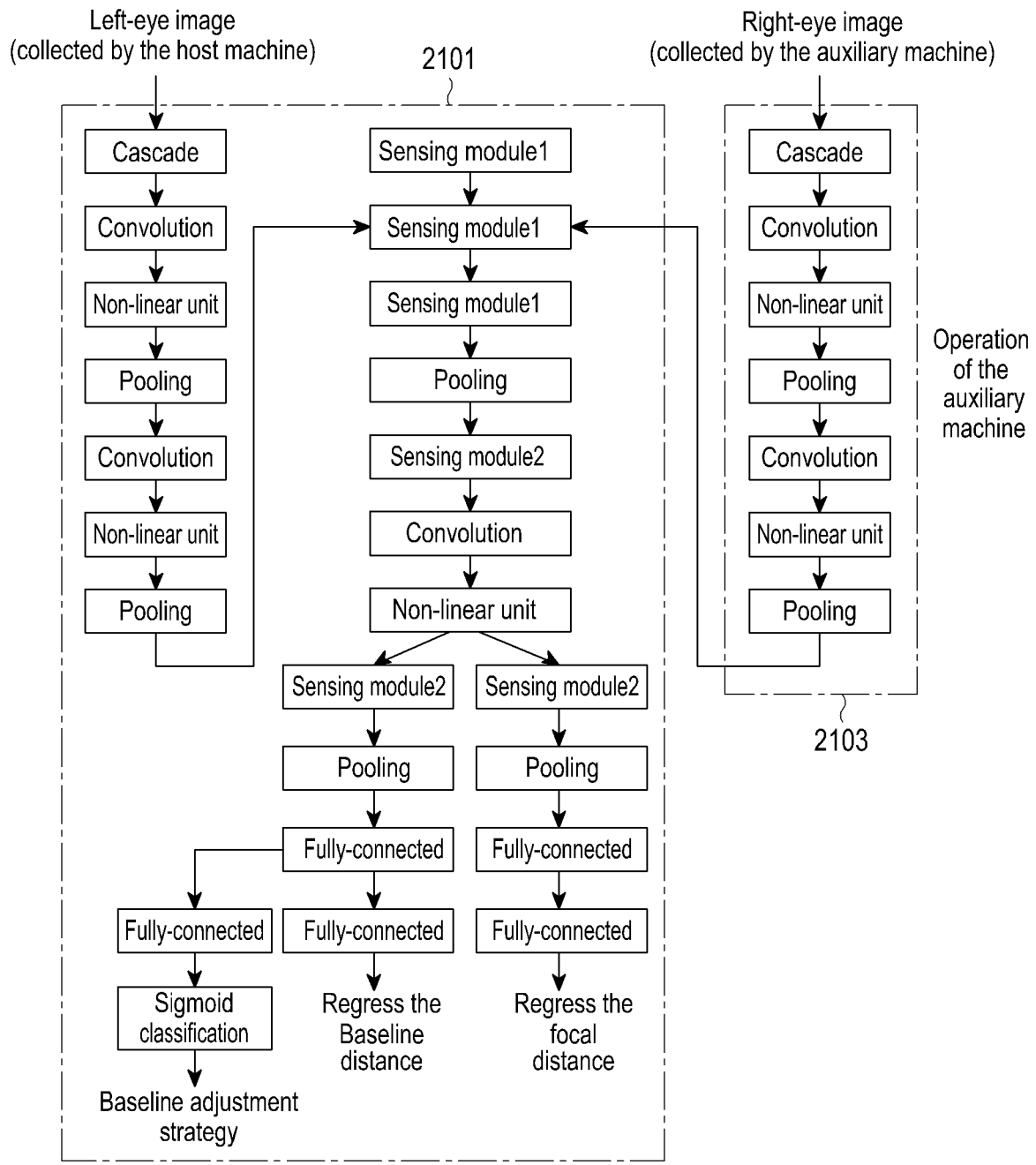
Figure 22:
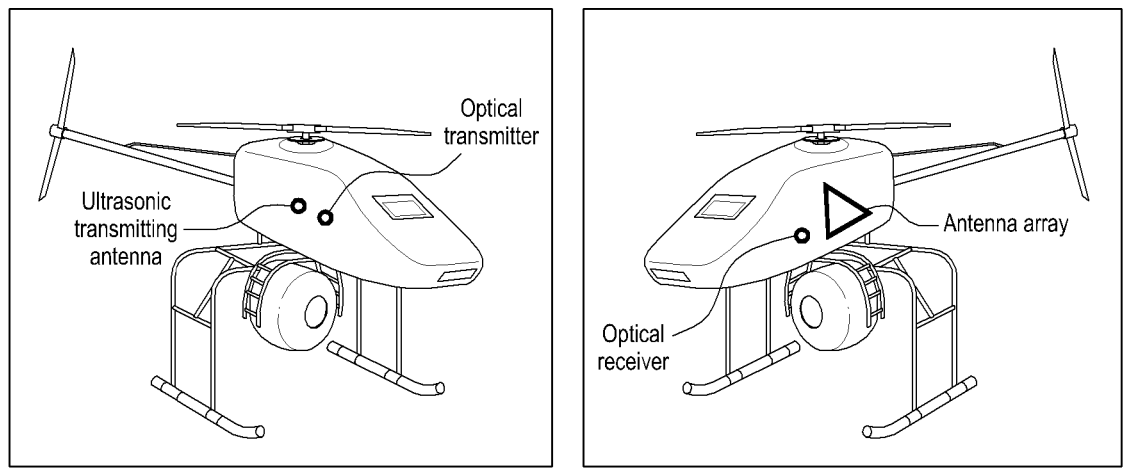
Figure 23A:
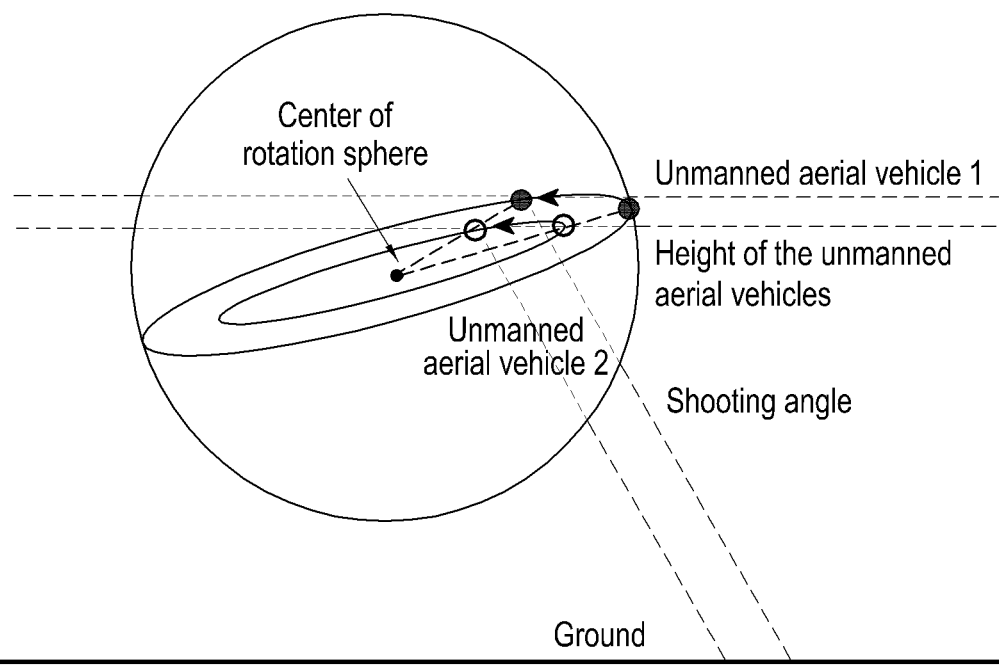
Figure 23B:
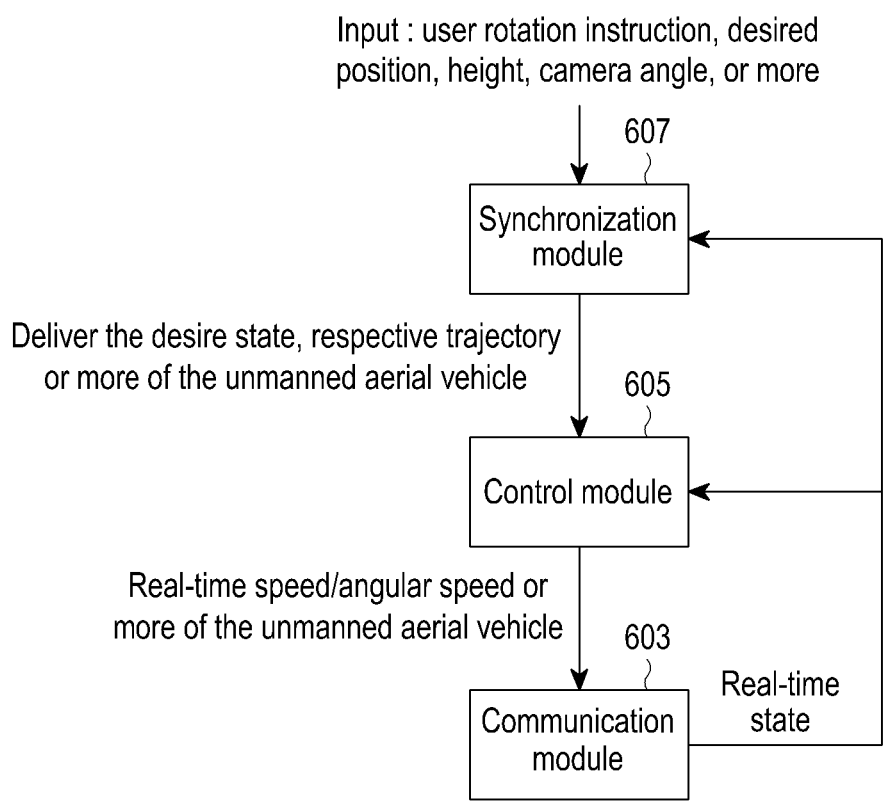
Figure 24:
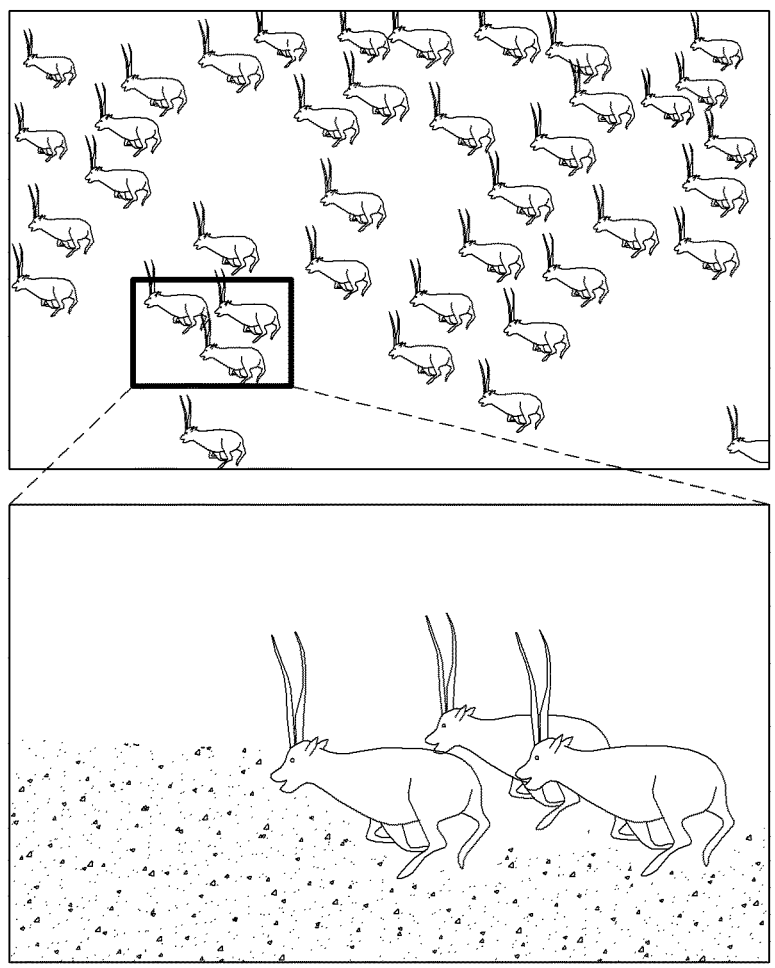
Figure 25:
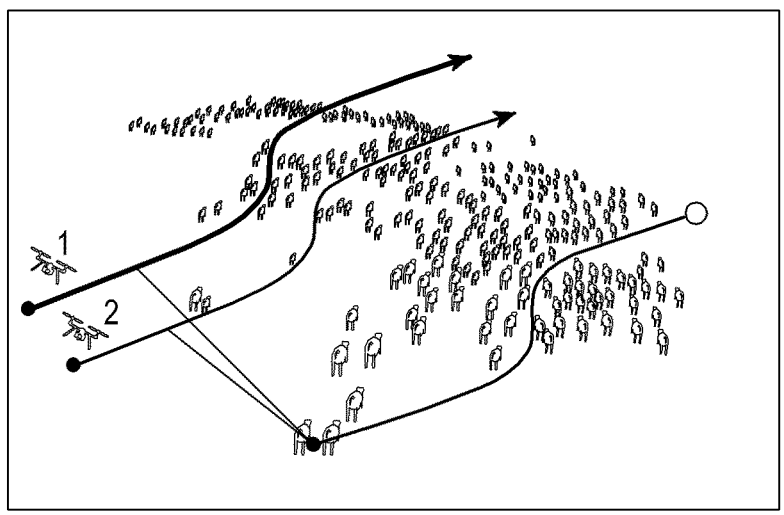
Figure 26:
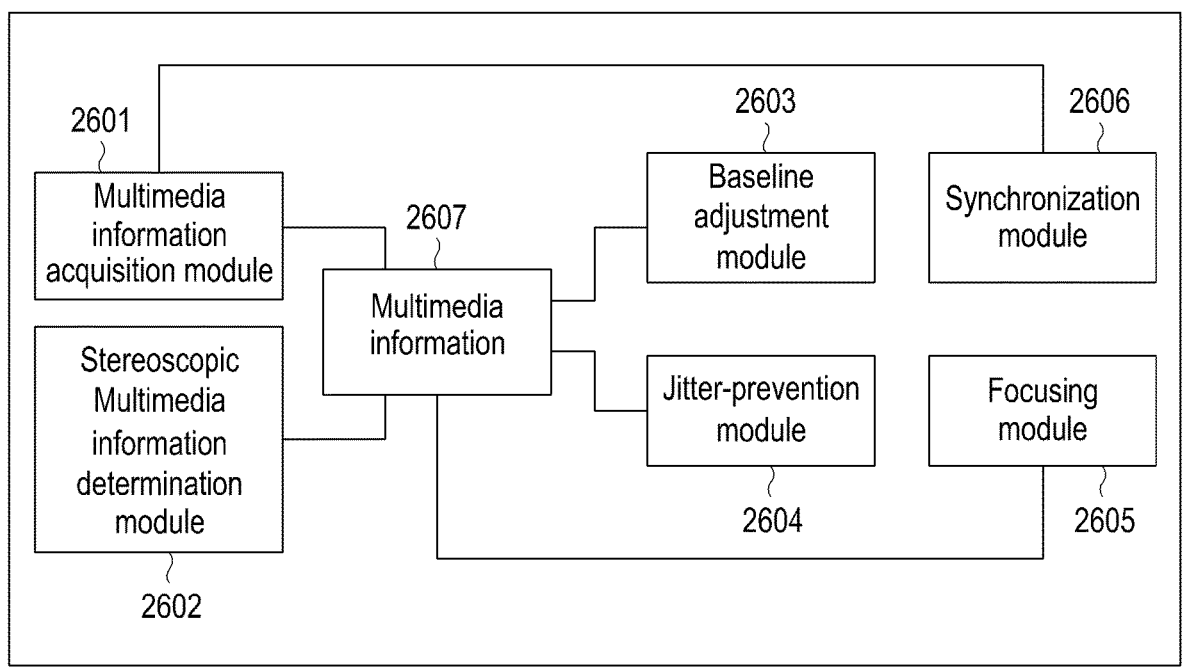
Figure 27A:
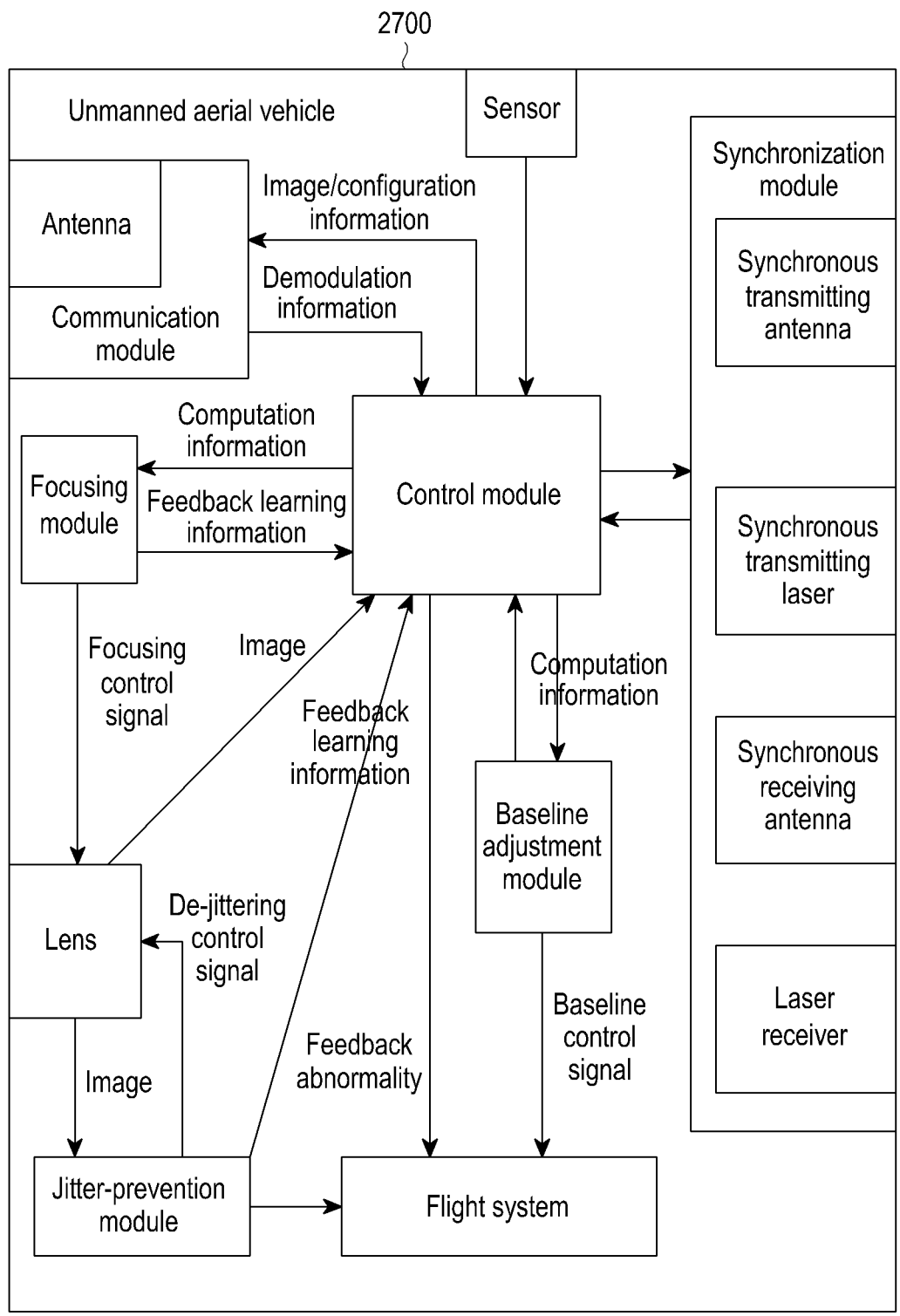
Figure 27B:
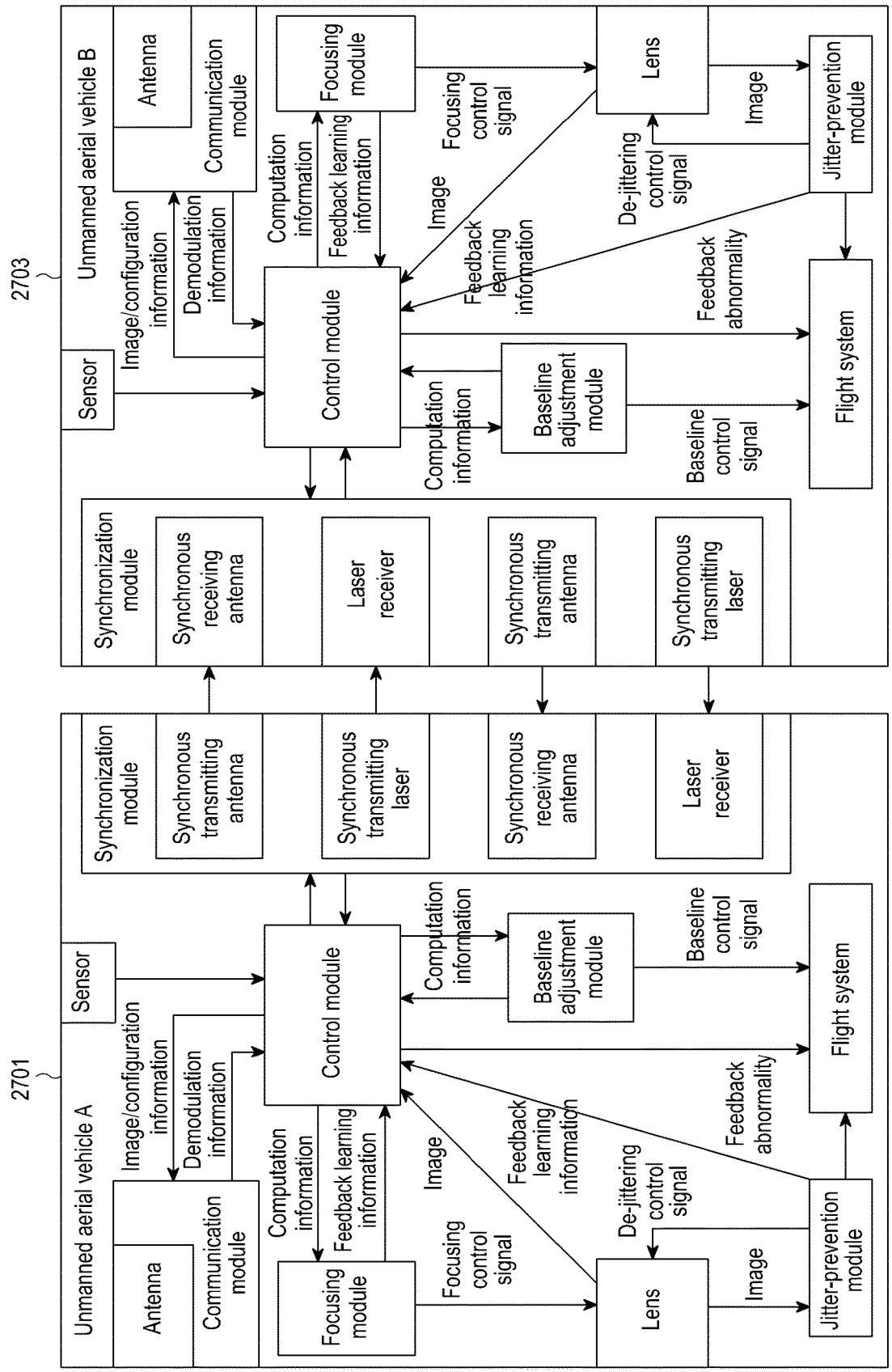

FIG. 6A is a schematic diagram of an instance of an interior structure of the unmanned aerial vehicles, when the aerial vehicles are unmanned aerial vehicles, according to Embodiment 1 of the present disclosure;

FIG. 6B is a schematic diagram of an instance of a flow principle of shooting stereoscopic videos by two unmanned aerial vehicles, when aerial vehicles are unmanned aerial vehicles, according to Embodiment 1 of the present disclosure;

FIG. 7 is a schematic diagram of an instance of a relationship between an object distance and a baseline distance, and an instance of a relationship between the size of a region occupied by an object to be shot and the baseline distance, according to Embodiment 2 of the present disclosure;

FIG. 8 is a schematic diagram of an instance of estimating the object distance according to an angle of pitch of the unmanned aerial vehicles and a shooting height of the unmanned aerial vehicles, according to Embodiment 2 of the present disclosure;

FIG. 9 is a schematic diagram of an instance in which a baseline distance between two aerial vehicles does not change when the object to be shot remains unchanged, according to Embodiment 2 of the present disclosure;

FIGS. 10A and 10B are schematic diagrams of an instance of adjusting the baseline distance between two aerial vehicles in a first or second baseline distance adjustment mode, according to Embodiment 2 of the present disclosure, respectively;

FIG. 11 is a schematic flowchart of a method for de-jittering multimedia information collected by respective multimedia information collection apparatuses of two or more aerial vehicles, according to Embodiment 3 of the present disclosure;

FIG. 12 is a schematic diagram of a relationship between four frames of single-camera frame images collected by two unmanned aerial vehicles at adjacent moments, according to Embodiment 3 of the present disclosure;

FIGS. 13A and 13B are principle diagrams of filtering feature points in frame images, according to Embodiment 3 of the present disclosure;

FIG. 14 is a schematic diagram of an instance of determining motion information between two frame images at adjacent moments, according to Embodiment 3 of the present disclosure;

FIG. 15 is a schematic diagram of an instance of the accumulated motion information of a multiple of frame images within a period of time, according to Embodiment 3 of the present disclosure;

FIG. 16 is a principle diagram of determining a position relationship of imaging pixels at a same three-dimensional point by two aerial vehicles, according to Embodiment 3 of the present disclosure;

FIG. 17A is a schematic flowchart of a method for adjusting a shooting focal length of multimedia collection apparatuses, according to Embodiment 4 of the present disclosure;

FIG. 17B is a schematic diagram of bi-directionally searching the current focal length based on an initial focal length by respective multimedia collection apparatuses of two aerial vehicles, according to Embodiment 4 of the present disclosure;

FIG. 17C is a schematic block diagram of bi-directionally searching the current focal length based on an initial focal length by respective multimedia information collection apparatuses of two aerial vehicles, according to Embodiment 4 of the present disclosure;

FIG. 18 is a schematic flowchart of a method for determining a baseline distance, an adjustment mode and an initial focal length based on a shared neural network, according to Embodiment 5 of the present disclosure;

FIG. 19 is a schematic diagram of an instance of an interior structure and an operating principle of the shared neural network, according to Embodiment 5 of the present disclosure;

FIG. 20 is a schematic flowchart of another method for determining a baseline distance, an adjustment mode and an initial focal length based on a shared neural network, according to Embodiment 5 of the present disclosure;

FIG. 21 is a schematic diagram of an instance of the interior structure and operating principle of the shared neural network, according to Embodiment 5 of the present disclosure;

FIG. 22 is a schematic diagram of an instance of spatial synchronization related hardware in the unmanned aerial vehicles, according to Embodiment 6 of the present disclosure;

FIG. 23A is a schematic diagram of an instance of rotation trajectories of two aerial vehicles, according to Embodiment 7 of the present disclosure;

FIG. 23B is a schematic flowchart of an instance of a collaborative steering control method for two aerial vehicles, according to Embodiment 7 of the present disclosure;

FIG. 24 is a schematic diagram of an instance of a target object, according to Embodiment 8 of the present disclosure;

FIG. 25 is a schematic diagram of an instance of a trajectory along which two aerial vehicles automatically track and shoot the target object, according to Embodiment 8 of the present disclosure;

FIG. 26 is a schematic block diagram of an interior structure of a device for determining stereoscopic multimedia information, according to embodiments of the present disclosure;

FIG. 27A is a schematic diagram of a detailed framework instance of a single unmanned aerial vehicle, according to embodiments of the present disclosure; and FIG. 27B is a schematic diagram of a detailed framework instance of two unmanned aerial vehicles, according to embodiments of the present disclosure.

DETAILED DESCRIPTION OF EXEMPLARY EMBODIMENTS

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein may comprise wireless connection or coupling. As used herein, the term "and/or" comprises all or any of one or more associated listed items or combinations thereof. Further, expressions such as, "at least one of a, b, and c," should be understood as including only a, only b, only c, both a and b, both a and c, both b and c, or all of a, b, and c.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices may comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or global positioning system (GPS) receivers; and/or conventional laptop and/or palmtop computers or other devices having and/or including a RF receiver. The "terminal" and "terminal equipment" as used herein may be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it may be a PDA, a Mobile Internet Device (MID) and/or a mobile phone with a music/video playback function, or may be equipment such as a smart TV and a set-top box.

The present disclosure provides a system for determining stereoscopic multimedia information, including two or more aerial vehicles.

Each of the two or more aerial vehicles includes a multimedia collection apparatus.

In the present disclosure, the multimedia information includes: pictures and/or videos. The pictures may be individual pictures or successive pictures. The videos include frame images.

For ease of understanding of the present disclosure, the technical solutions of the present disclosure will be specifically described below by taking stereoscopic videos shot by two aerial vehicles as example.

The two aerial vehicles as herein used may be fixed-wing aerial vehicles or rotor-wing aerial vehicles; or may be manned aerial vehicles or unmanned aerial vehicles.

Since rotor-wing unmanned aerial vehicles are easily controlled in terms of the flight attitude, for example, they are able to hover, the rotor-wing unmanned aerial vehicles may be used as two aerial vehicles for shooting stereoscopic videos. The rotor-wing unmanned aerial vehicles may comprise: single-shaft rotor-wing unmanned aerial vehicles and multi-shaft rotor-wing unmanned aerial vehicles, for example, four-shaft rotor-wing unmanned aerial vehicles, each of which includes four independent rotating shafts from the perspective of appearance, with each rotating shaft being correspondingly configured with a set of rotor-wings.

The system for determining stereoscopic multimedia information provided by the present disclosure further includes a device for determining stereoscopic multimedia information.

Preferably, the system for determining stereoscopic multimedia information provided by the present disclosure further includes a ground control console.

Figure 1A:
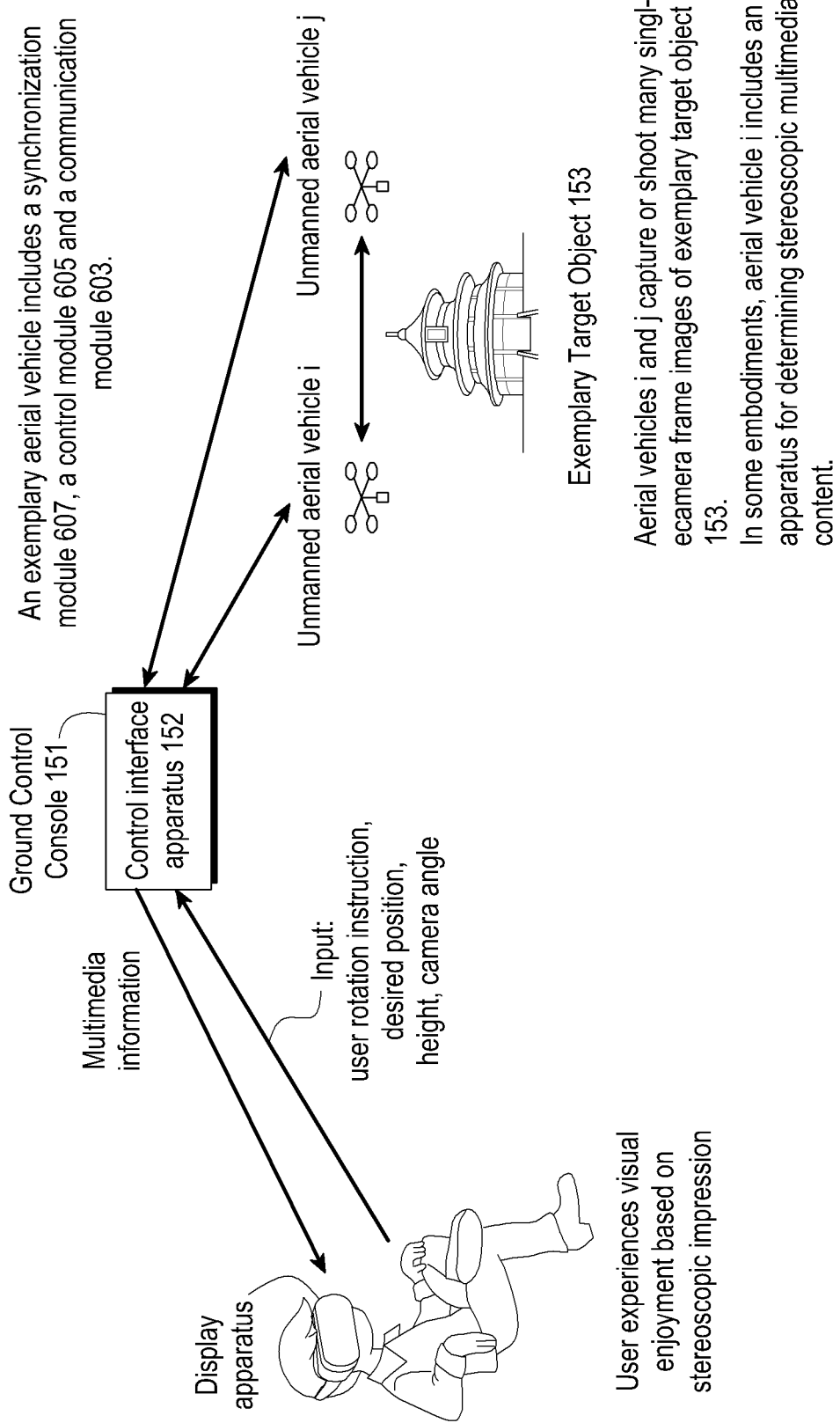
FIG. 1A is a schematic system diagram showing a user, a control interface apparatus, a plurality of unmanned aerial vehicles, according to an embodiment of the present disclosure and an exemplary target object

FIG. 1A shows a user wearing a display apparatus. The user can input instructions such as a rotation instruction, desired position instruction, height instruction, and/or camera angle instruction to a ground control console 151 which includes a control interface apparatus 152. The ground control console 151 communicates with a plurality of unmanned aerial vehicles including illustrated unmanned aerial vehicle i and unmanned aerial vehicle j. The aerial vehicles of this disclosure are unmanned, so sometimes the unmanned aerial vehicles are simply referred to as aerial vehicles. Aerial vehicles i and j, in some embodiments, communicate as indicated by the double-headed arrow. Aerial vehicles i and j capture or shoot many single-camera frame images of exemplary target object 153. In some embodiments, aerial vehicle i includes an apparatus for determining stereoscopic multimedia content. In some embodiments, aerial vehicle i or j may be referred to as a "set aerial vehicle." An exemplary aerial vehicle includes a synchronization module 607, a control module 605 and a communication module 603 (see FIG. 23B). Based on multimedia information provided by, for example, aerial vehicle i to the display apparatus via the ground control console 151, the user experiences visual enjoyment based on stereoscopic impressions.

Figure 1B:
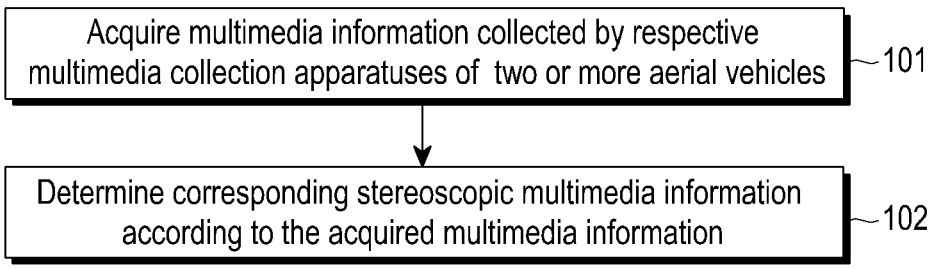
FIG. 1B is a schematic flowchart of a method for determining stereoscopic multimedia information, according to an embodiment of the present disclosure.

The present disclosure provides a method for determining stereoscopic multimedia information. FIG. 1B shows a method for determining stereoscopic multimedia information, according to an embodiment of the present disclosure.

Referring to FIG. 1B, an apparatus for determining stereoscopic multimedia information acquires multimedia information collected by respective multimedia collection apparatuses of two or more aerial vehicles, in 101. The apparatus then determines corresponding stereoscopic multimedia information is determined according to the acquired multimedia information.

Although stereoscopic videos are shot by a binocular camera loaded in one unmanned aerial vehicle in the prior art, in the technical solutions of the present disclosure, a same object is shot by respective loaded multimedia collection apparatuses of two or more aerial vehicles at different angles. Accordingly, in accordance with embodiments of the present disclosure, more stereoscopic multimedia information may be obtained as compared with the conventional solution, and a user is more likely to feel the stereoscopic impression of the multimedia information when viewing the multimedia information. In this way, both the visual enjoyment of the user and the user experience are improved by applying embodiments of the present disclosure to stereoscopic video.

Various embodiments of the technical solutions of the present disclosure will be specifically described hereinafter.

Embodiment 1

In a conventional method for determining stereoscopic videos, the two cameras are generally fixed and synchronized in all settings, and a baseline distance between the two cameras is fixed (the baseline distance is an absolute length of a line segment between optical centers of the two cameras).

Dual-camera frame images are collected by a binocular camera having a baseline distance which is a normal pupil distance. When a ratio of an object distance (a distance from an object to be shot to a camera) and the baseline distance is less than 50 (for example, the normal pupil distance is 7 cm, and a ratio of the object distance and the baseline distance is less than 50 when observing an object which is 2 m away), human eyes may feel a parallax, and an observer may thus feel the stereoscopic impression of the object.

For a far-distance or medium-distance object, since the object distance is far greater than the baseline distance (for example, a ratio of the object distance and the baseline distance is far greater than 50), the baseline distance between the two cameras may be actually ignored with respect to the object distance. In this case, it may be considered that the two cameras shoot a same object at a same angle. As a result, there is no parallax between an object region in one camera frame image and an object region in another camera frame image. When a user views an object without a parallax in the dual-camera frame image, human eyes basically do not feel the stereoscopic impression of the object to be observed (for example, overlook buildings on the ground from an airplane).

Therefore, in the existing methods for determining stereoscopic videos at a fixed short baseline distance, it is possible that the object to be shot at a long distance or medium distance loses the stereoscopic effect. In other words, although a stereoscopic video consists of dual-camera frame images shot by a binocular camera, when a user views the video, far-distance objects or medium-distance objects in the video have no stereoscopic impression. As a result, equivalently, the user views an ordinary 2D video, so the user's viewing experience is influenced greatly.

The baseline distance between cameras in the binocular camera arranged on a single carrier (handheld by the user, e.g., a holder, a guide rail, a single unmanned aerial vehicle or more) may be adjusted. The existing maximum baseline distance between the cameras in the binocular camera is still limited by the length of two arms of a person and the size of the holder, guide rail or the single unmanned aerial vehicle, and is far less than the object distance. In other words, a ratio of the object distance and the existing maximum baseline distance is still greater than 50. As a result, a far-distance (object distance) object to be shot still has no stereoscopic effect.

Accordingly, the need of adjusting the baseline distance between aerial vehicles is considered in embodiments of the present disclosure.

Specifically, the parallax is very important when shooting stereoscopic videos. Generally, the distance between two eyes of an adult is about 7 cm (for ease of computation, the baseline distance between human eyes is generally regarded as about 10 cm). If a person observes a close object by human vision, the person may often feel a great parallax, so that the stereoscopic effect may be experienced. When a single unmanned aerial vehicle shoots (i.e., views) a distant object by simulating the baseline distance between two eyes of a person, for example, as shown in the left part (a) of FIG. 2, since the far-distance object lacks parallax when observing a far-distance object, the far-distance object has no stereoscopic effect. Consequently, the stereoscopic video will be degraded to a 2D video.

Figure 2:
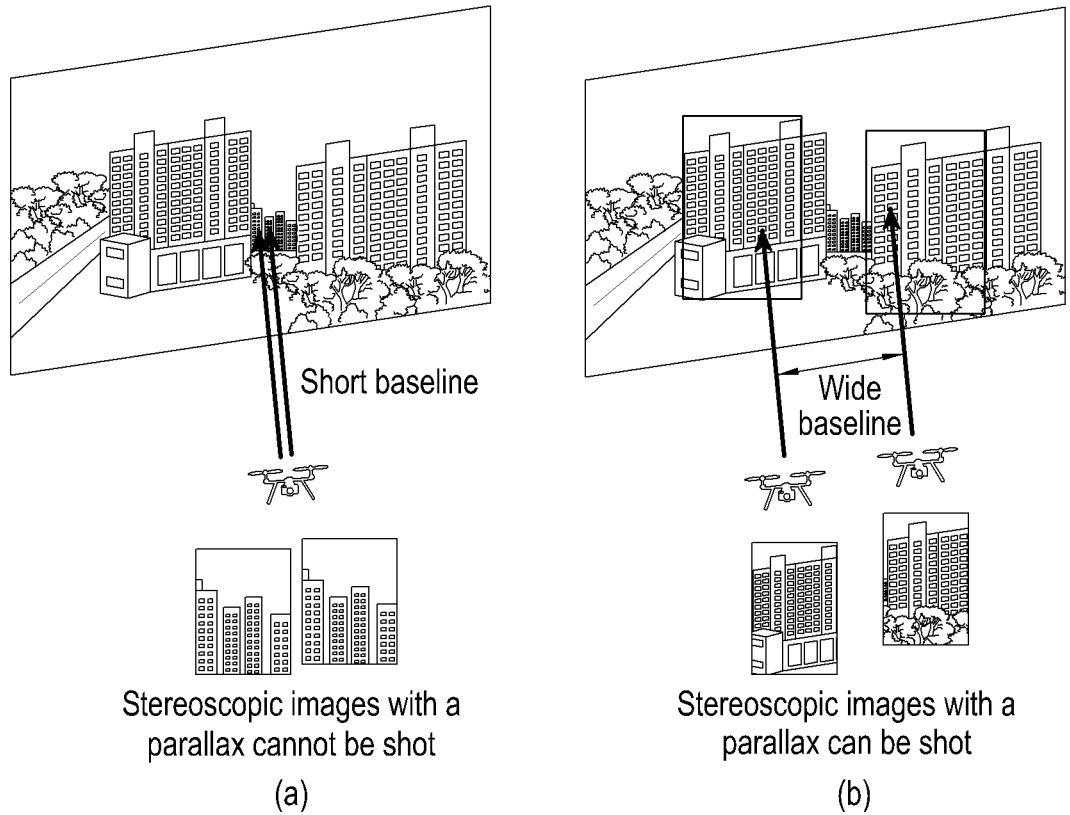
FIG. 2 is a comparison diagram of stereoscopic effects of a same far-distance object shot by a conventional single unmanned aerial vehicle and two unmanned aerial vehicles, according to Embodiment 1 of the present disclosure.

Therefore, in a scene with many far-distance objects, for example, a scene as shown in the right part (b) of FIG. 2, the appropriate increase in the baseline distance may present far-distance objects in user's eyes still in the stereoscopic effect. For some close-distance objects, the baseline distance may be decreased appropriately.

Based on this consideration, the method for determining stereoscopic multimedia information according to Embodiment 1 of the present disclosure further comprises the step of: adjusting, according to an object to be shot and/or a shooting environment, a baseline distance/baseline distances between the two or more aerial vehicles.

A specific embodiment of adjusting, according to an object to be shot and/or a shooting environment, a baseline distance/baseline distances between the two or more aerial vehicles refers to Embodiment 2 hereinafter.

In short, the method for adjusting the baseline distance/baseline distances between the two or more aerial vehicles in Embodiment 1 of the present disclosure may adaptively determine and adjust to, according to the object to be shot, a proper baseline distance.

Users are sensitive to the jitter of a video. If frame images viewed by left and right eyes of a user are inconsistent due to the jitter of the collected video, the viewing experience of the user will be influenced greatly. Therefore, de-jittering is a very important step for stereoscopic video collection.

When the two aerial vehicles collect stereoscopic videos, the jitter of the aerial vehicles will be caused by various causes such as the vibration of motors in the aerial vehicles, the influence from the airflow and/or the flight control error, and the multimedia information collection apparatuses fixed on the aerial vehicles will jitter along with the aerial vehicles. As a result, image jitter phenomena such as inconsistent upper and lower parts are likely to occur in the shot dual-camera frame images, and the quality of the shot stereoscopic video is likely to be decreased.

To ensure the quality of the shot content, in Embodiment 1 of the present disclosure, jitter is detected according to dual-camera frame images shot by the two aerial vehicles; and, if the jitter occurs, jitter information is computed, and jitter compensation (i.e., de-jittering) is performed on the shot frame images according to the jitter information.

Generally, jitter is classified into high-frequency jitter and low-frequency jitter. The high-frequency jitter is often caused by the flight control error of the aerial vehicles, which often has a small jitter amplitude and less influence on frame images. Since the high-frequency jitter changes fast, it needs to be dealt with quickly. In Embodiment 1 of the present disclosure, de-jittering may be performed by using optical or physical jitter-prevention devices built-in the multimedia information collection apparatuses of the aerial vehicles. These technologies are well known to those skilled in the art, so the detailed description thereof will be omitted here.

The low-frequency jitter is often caused by environmental changes, for example, airflow change or more, and the vibration amplitude of the low-frequency jitter is greater than that of the high-frequency jitter. Since the low-frequency jitter-prevention caused by the airflow or more goes beyond the capability of devices built-in the aerial vehicles, the low-frequency de-jittering needs to be performed in aid of a related image processing method. A low-frequency jitter-prevention method based on image processing will be emphasized below.

An existing jitter-prevention method for a single aerial vehicle generally includes the steps of: for a frame image in a single-camera video image sequence, detecting actual motion information of the frame image by a motion estimation algorithm, and deciding whether the motion of the frame image is jitter based on the detected motion information (for example, smooth filtering may be performed on the motion of the frame image, the filtered low-frequency motion information may be considered as expected motion information of the frame image, and the detected actual motion information of the frame image is compared with the expected motion information to decide whether the motion of the frame image is jitter); and, if the motion of the frame image is jitter, eliminating or relieving the interference from the jitter to the image by an image motion compensation algorithm.

However, a difference between the collaborative shooting based on a multiple of aerial vehicles and the separate shooting based on a single aerial vehicle lies in that, for the separate shooting based on a single aerial vehicle, only the jitter-prevention problem of the single aerial vehicle needs to be separately processed, while for the collaborative shooting based on a multiple of aerial vehicles, the relative position of two aerial vehicles is to be taken into consideration. For the collaborative operation of two aerial vehicles, if the jitter-prevention method for a single aerial vehicle is directly used, it is very likely to result in problems such as inconsistent height in the de-jittered dual-camera frame images. As a result, the viewing experience of the user is greatly influenced or the user may feel uncomfortable, for example, dizzy.

Figure 3A:
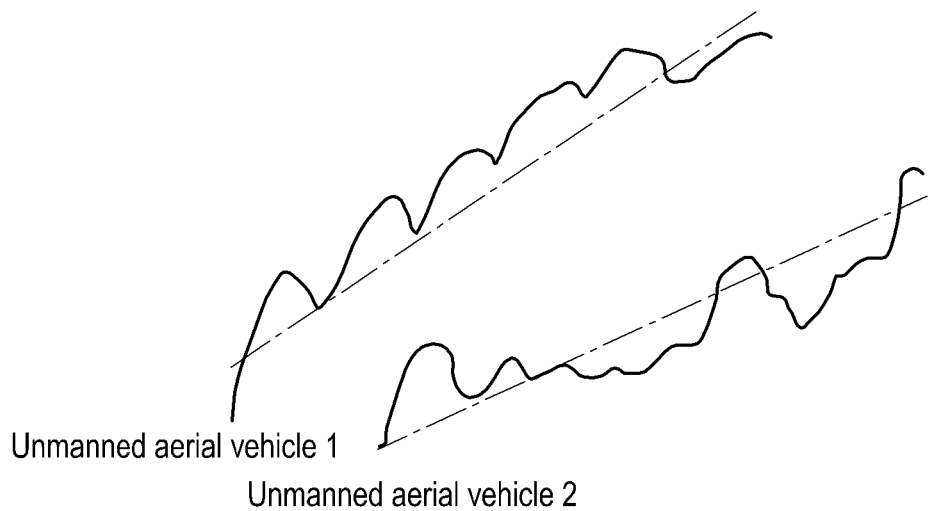
FIGS. 3A and 3B are schematic diagrams of instances of separately de-jittering dual-camera frame images shot by the two unmanned aerial vehicles in Embodiment 1 of the present disclosure directly by a jitter-prevention method for the single unmanned aerial vehicle.
Figure 3B:
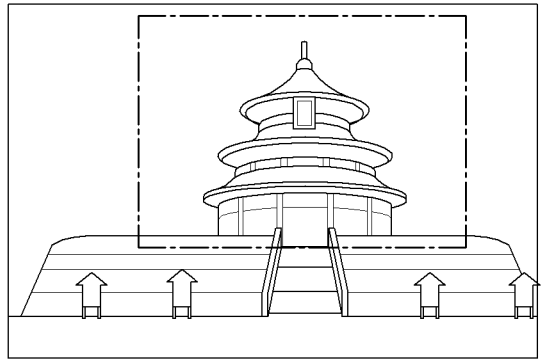
Figure 3B:
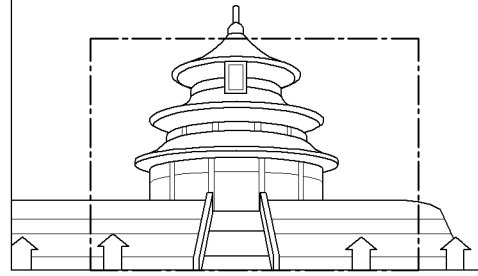
Figure 3B:
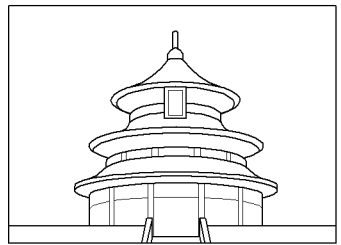
Figure 3B:
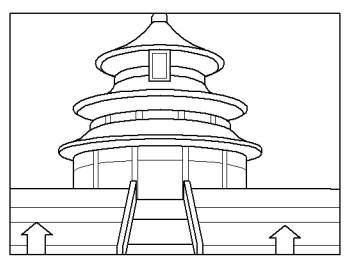

For example, when two unmanned aerial vehicles collaboratively shoot a stereoscopic video, and if the dual-camera frame images shot by the two unmanned aerial vehicles are de-jittered directly by the jitter-prevention method for a single unmanned aerial vehicle, the result shown in FIG. 3a or 3b may be obtained.

In FIG. 3A, two solid curves represent actual motion trajectories of two unmanned aerial vehicles of the shot frame images, respectively, and lower left endpoints of the two solid curves represent starting points of flight of the two unmanned aerial vehicles corresponding to a moment of starting shooting, respectively; and, dashed lines represent expected motion trajectories after jitter-prevention of the frame images shot by each aerial vehicle, when separate jitter-prevention is performed. Since the dual-camera frame images are separately shot by respective multimedia information collection apparatuses of the two unmanned aerial vehicles, the actual motion trajectories of the two unmanned aerial vehicles may be inconsistent due to the influence from the airflow or more, and according to the actual motion trajectories of the two unmanned aerial vehicles, independent expected motion trajectories of the two unmanned aerial vehicles are obtained after the jitter of the respective frame images shot by the aerial vehicles is controlled. Since the separate jitter-prevention for one unmanned aerial vehicle does not take matching with the expected motion trajectory of another unmanned aerial vehicle into consideration, in most cases, the respective motion trajectories of the two unmanned aerial vehicles are not coplanar or even have no overlapped field of view. As a result, it is very likely to result in human-eye unacceptable conditions between the respective shot single-camera frame images, for example, the position of an object in one camera frame image is higher while the position of the same object in another camera frame image is lower. Or, since the two expected motion trajectories are deviated to left and to right, respectively, there is no same object in two camera frame images (that is, there is no overlapped region between two camera frame images), and there is no dual-camera focus point, so that the stereoscopic effect may not be formed. Consequently, it is likely to result in inconsistent dual-camera vision, and the viewing experience of the user is greatly influenced.

In FIG. 3B, it is assumed that the two aerial vehicles encounter airflow, result in one aerial vehicle goes down, while the other aerial vehicle goes up. When the separate jitter-prevention algorithm for a single aerial vehicle is adopted, dual-camera frame images viewed by the user may have an unequal height. Naturally, the user will feel very uncomfortable when viewing such frame images. In FIG. 3b, if it is assumed that an aerial vehicle with a left-eye multimedia information collection apparatus (a multimedia information collection apparatus for shooting left-camera images) encounters a downward airflow, the separate jitter-prevention considers that the flight trajectory of this aerial vehicle is deviated downward and upward compensation will be performed on the left-eye image, that is, an upper partial region in the image is selected as the compensated left-eye image. Similarly, if it is assumed that an aerial vehicle with a right-eye multimedia information collection apparatus (a multimedia information collection apparatus for shooting right-camera images) encounters an upward airflow, the separate jitter-prevention is considers that the flight trajectory of this aerial vehicle is deviated upward and downward compensation will be performed on the right-eye image, that is, a lower partial region in the image is selected as the compensated right-eye image. However, since no collaborative jitter-prevention is performed on the two aerial vehicles, there may be a large deviation between the estimated jitter amplitude of the two aerial vehicles and the actual jitter amplitude. In the case of a single aerial vehicle, this deviation has little influence on the quality of videos. However, for a dual-camera video, due to this deviation, the observed dual-camera images will have less overlapped regions and the overlapped regions are not coplanar. From the results of separate jitter-prevention of the two aerial vehicles in FIG. 3B, it may be seen that the left-eye and right-eye images have less overlapped regions and the overlapped regions are not coplanar, so that the viewing experience of the user is greatly influenced. Therefore, in the embodiments of the present disclosure, a collaborative jitter-prevention method is adopted to realize the collaborative jitter-prevention of a multiple of aerial vehicles by considering both the de-jittering of a single aerial vehicle and the relative position relationship between a multiple of aerial vehicles, thereby providing the user with wonderful experience of viewing a stereoscopic video.

Specifically, in the collaborative jitter-prevention method for a multiple of aerial vehicles in the embodiments of the present disclosure, the actual motion information of the images shot by two aerial vehicles may be obtained by actual measurement, or may be obtained by matching feature points of dual-camera frame images shot by the aerial vehicles. In the process of computing expected motion information (shown by dashed lines in FIG. 4) of the images shot by the two aerial vehicles, an expected relative position relationship between the two aerial vehicles may be determined according to the current expected baseline distance obtained in the process of adjusting the baseline distance, and the expected relative position relationship between the two aerial vehicles is used as a constraint for determining expected motion information of the dual-camera frame images. Then, the dual-camera frame images are de-jittered according to the expected motion information and actual motion information of the dual-camera frame images.

Figure 4:
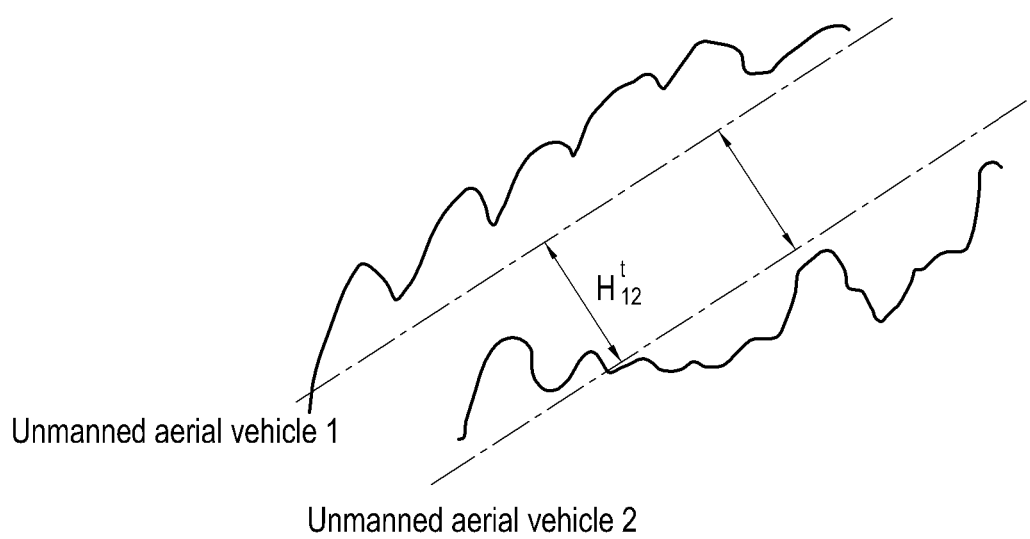
FIG. 4 is a principle diagram of an instance of de-jittering dual-camera frame images, according to Embodiment 1 of the present disclosure.

For example, FIG. 4 shows an instance of de-jittering dual-camera frame images according to Embodiment 1 of the present disclosure.

Referring to FIG. 4, $H_{12}{}^t$ denotes an expected relative position relationship between the unmanned aerial vehicle 1 and the unmanned aerial vehicle 2 at a moment t. In FIG. 4, the solid curves represent the actual motions of the frame images shot by the unmanned aerial vehicles, and the dashed lines represent the expected motion of the frame image shot by each unmanned aerial vehicle when collaborative jitter-prevention is performed on the two unmanned aerial vehicles.

Preferably, for the low-frequency jitter and/or other types of jitter (e.g., high-frequency jitter) occurring in the shooting process of unmanned aerial vehicles, de-jittering may also be performed by the de-jittering method as described in Embodiment 1 of the present disclosure.

Further, when it is detected that the unmanned aerial vehicles do not jitter fiercely, de-jittering may be performed based on frame images by the above method. However, when the jitter is fierce due to the influence from the strong airflow, de-jittering is performed by other methods (the other methods will be described in detail hereinafter and will not be repeated here).

Therefore, the method for determining stereoscopic multimedia information according to Embodiment 1 of the present disclosure further comprises the step of: de-jittering the collected multimedia information.

In addition, a specific method for de-jittering the collected multimedia information in Embodiment 1 of the present disclosure refers to Embodiment 3 hereinafter.

With the collaborative jitter-prevention method employed by the apparatus according to Embodiment 1 of the present disclosure, a common region of dual-camera frame images may be maximized to promote the stereoscopic effect of the common region, so that the viewing experience of the user may be improved.

Preferably, the method for determining stereoscopic multimedia information according to Embodiment 1 of the present disclosure further comprises the step of: adjusting a shooting focal length of the multimedia collection apparatuses.

A specific method for adjusting the focal length of the multimedia collection apparatuses of the two or more aerial vehicles refers to Embodiment 4.

To ensure the consistency in binocular vision of the multimedia information collected by the multimedia collection apparatuses of the two or more aerial vehicles in Embodiment 1 of the present disclosure, the respective multimedia collection apparatuses set by the two or more aerial vehicles must satisfy the following coplanar conditions:

1) when the multimedia collection apparatuses are arranged horizontally, a horizontal plane passing through an optical center and an optical axis of each of the two multimedia connection apparatuses is defined as a normal plane; when the multimedia collection apparatuses are inclined, the normal planes are also inclined; and 2) a connection line of optical centers of the two multimedia collection apparatuses is defined as a baseline, and the included angle between this baseline and an optical axis set by one of the two cameras is equal to the included angel between this baseline and another optical axis set by another of the two cameras in the embodiments of the present disclosure.

In the embodiments of the present disclosure, an angle of each multimedia collection apparatus and its carrier (i.e., the aerial vehicle on which this multimedia collection apparatus is arranged) in a direction perpendicular to the normal plane is set as a fixed angle. Therefore, in the embodiments of the present disclosure, "the normal planes of the two multimedia collection apparatuses being coplanar" is actually interpreted as "the two aerial vehicles being coplanar".

For ease of understanding, hereinafter, the expression "two aerial vehicles are coplanar" will be used to indicate that the normal planes of the two multimedia collection apparatuses are coplanar.

In addition, the multimedia collection apparatuses are controlled to rotate in the normal planes so that the optical axes of the two multimedia collection apparatuses become parallel or not parallel.

Figure 5:
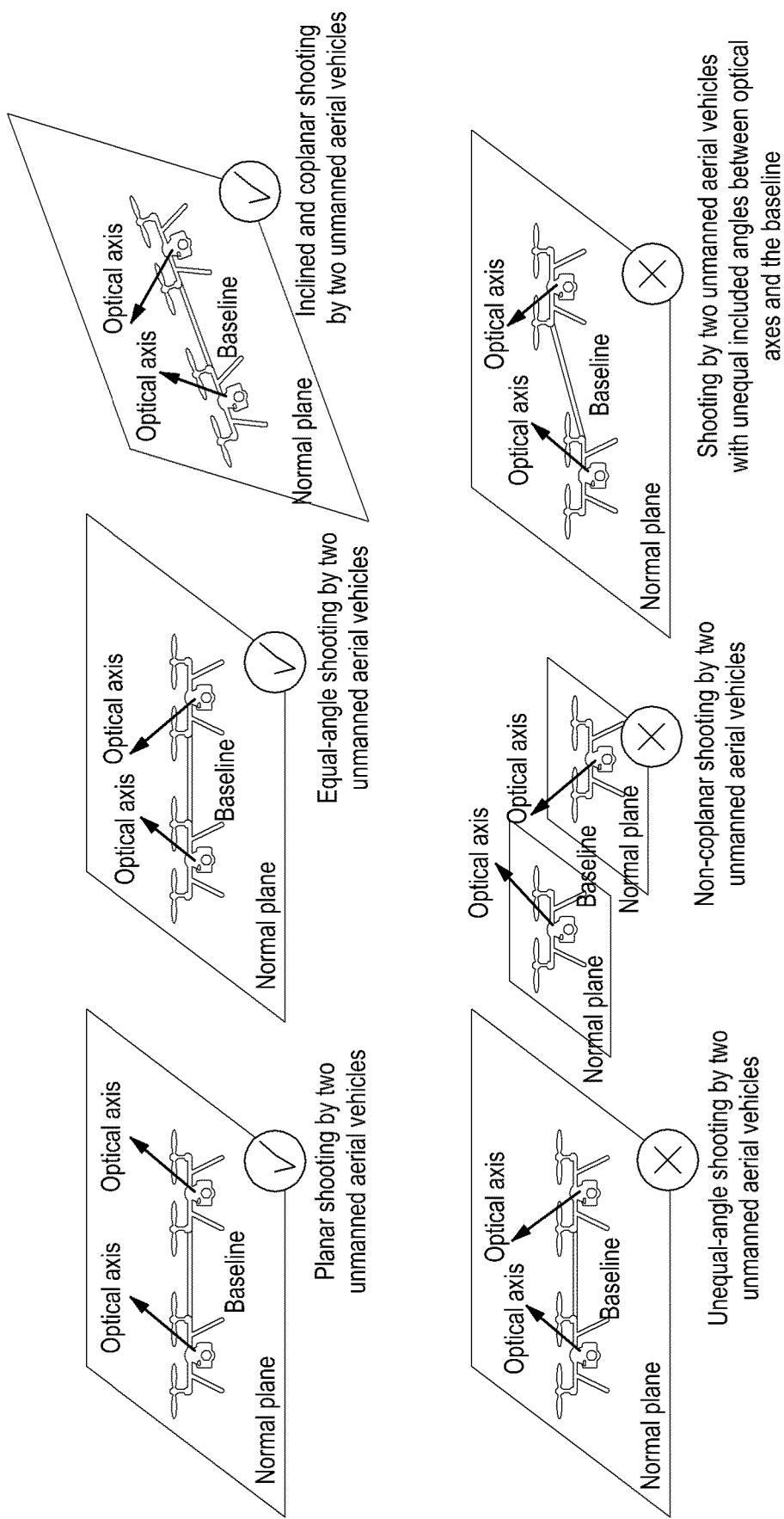
FIG. 5 is a schematic diagram of a multiple of instances in which the two unmanned aerial vehicles are coplanar/ non-coplanar and an included angle between an optical axis and a baseline is equal/unequal, according to Embodiment 1 of the present disclosure.

For example, FIG. 5 shows a multiple of instances in which the two unmanned aerial vehicles are coplanar/non-coplanar and the included angles between optical axes and baselines are equal/unequal. Specifically, as shown in FIG. 5, when two aerial vehicles are two rotor-wing unmanned aerial vehicles, the two unmanned aerial vehicles are coplanar or not coplanar, and the included angles between the optical axes and the baselines are equal or unequal; or various other cases are possible. In the lower left sub-graph and lower right sub-graph of FIG. 5, the normal planes of the two cameras are coplanar; while in the lower middle sub-graph, the normal planes of the two cameras are not coplanar due to the unequal height of the two unmanned aerial vehicles.

The method for determining stereoscopic multimedia information according to Embodiment 1 of the present disclosure further comprises the step of: performing time synchronization and/or spatial synchronization on the two or more aerial vehicles.

Wherein, when spatial synchronization is performed on the two aerial vehicles, the two aerial vehicles are coplanar. This specific synchronization method will be described in detail in connection with Embodiment 6.

Preferably, after the two aerial vehicles are synchronized, one aerial vehicle performs shooting by the multimedia collection apparatus carried by one aerial vehicle to acquire one camera frame image as multimedia information; and similarly, the other aerial vehicle performs shooting to acquire another camera frame image. For the two aerial vehicles, dual-camera frame images are acquired by shooting. Since the shooting time synchronization has been performed, the dual-camera frame images shot at a same moment may be used for determining a stereoscopic video as stereoscopic multimedia information.

Actually, in the process of shooting a stereoscopic video by the two aerial vehicles, at least one of the following operations may be executed by the method according to Embodiment 1 of the present disclosure: synchronizing the two aerial vehicles in real time; adjusting the baseline distance between the two aerial vehicles in real time; adjusting the focal length of the respective multimedia collection apparatuses of the two aerial vehicles in real time; and, de-jittering the multimedia information collected by the multimedia collection apparatuses in real time. By the operations, stereoscopic multimedia information having better stereoscopic effect and clearer images may be collected, and the viewing experience of the user may be improved.

In addition, in Embodiment 1 of the present disclosure, a way for processing exceptions generated in the synchronization operation (i.e., synchronously shooting stereoscopic multimedia information) of the two aerial vehicles is provided, which will be described in detail by referring to Embodiment 9 hereinafter.

FIG. 6A is a schematic diagram of an instance of an interior structure of the unmanned aerial vehicles, when aerial vehicles are unmanned aerial vehicles, according to Embodiment 1 of the present disclosure. To simplify FIG. 6a, the information transmission relationship between some modules is not shown.

In Embodiment 1 of the present disclosure, each of the unmanned aerial vehicles 600 includes a multimedia collection apparatus (not shown), a flight system 617, a synchronization module 607, a baseline adjustment module 613, a control module 605 or more. Preferably, in Embodiment 1 of the present disclosure, each of the unmanned aerial vehicles 600 further includes a jitter-prevention module 615, a communication module 603, an antenna 604, a sensor 601 or more.

In some embodiments, one or more of flight system 617, synchronization module 607, baseline adjustment module 613, control module 605, and/or the jitter-prevention module, are based on special purpose hardware designs. The hardware designs are based on application specific integrated circuit (ASIC), field programmable gate arrays (FPGAs), and/or custom processor and memory designs. Some of the hardware designs are realized as discrete custom chips (integrated circuits) while in some embodiments, several of the hardware designs are implemented on a common substrate in a system on a chip (SOC). The hardware designs, in some embodiments, include hardware logic to improve speed, reduce power consumption and use low silicon area. These are beneficial for low-weight manufactured aerial vehicle products which perform high speed precise nonstandard arithmetic such as neural network computations and matrix algebra computations.

Wherein, the synchronization module 607 mainly functions to collaboratively perform time and spatial synchronization on the two aerial vehicles.

The control module 605 is mainly configured to control the overall operation of the aerial vehicle and perform the following operations: receiving information transmitted by other modules; transmitting a control signal to other modules; performing error control when an exception occurs; undertaking a main vision computation task; and, performing a jitter-prevention operation in a flight control level. The control module 605 is configured to schedule the multimedia information collection apparatus to shoot a single camera frame image, i.e., to shoot dual-camera frame images for two aerial vehicles. Preferably, the control module is configured to schedule the flight system to control the flight attitude of the respective aerial vehicle.

The baseline adjustment module 613 mainly functions to: analyze according to the dual-camera frame images based on a dual-camera vision related algorithm, and provide baseline adjustment information to the control module 605; and, schedule the flight system 617 via the control module 605 to adjust the baseline distance between the two aerial vehicles.

The jitter-prevention module 615 functions to detect and compensate for the jitter of the aerial vehicle in the shooting process, so as to ensure the stability of the shot video.

The focusing module 609 functions to quickly focus an object to be shot according to the content of the object to be shot.

The communication module 603 functions to perform information interaction with a ground control console and/or a geographical control console.

The flight system 617 functions to specifically control the flight attitude of the aerial vehicle device upon receiving a flight related higher-layer abstract command of the aerial vehicle.

The specific functions of the multiple of modules and systems will be described in detail hereinafter and will not be repeated here.

In practical applications, the control module 605 of each of the two aerial vehicles is mainly responsible for comprehensively controlling the system, undertaking the computation task of the primary neural network, receiving information of other operating modules, and transmitting related control information to corresponding modules so as to realize the control to the whole system.

The control module 605 receives frame images shot by the multimedia information collection apparatus, pre-computes the frame images, and transmits the frame images to the focusing module 609 and the baseline adjustment module 613 to adjust the focal length and the baseline distance, respectively. The focusing module 609 and the baseline adjustment module 613 feed updated information of parameters back to the control module 605 by online learning, and the control module 605 updates corresponding parameters of a deep learning network upon receiving the updated information of the parameters. This may specifically refer to Embodiment 5.

The communication module 603 of each of the two aerial vehicles demodulates the received information and then transmits the demodulated information to the control module 605, and the control module 605 distributes the information received by the communication module 603 to each related modules. Meanwhile, the control module 605 delivers image/configuration information of the system to the communication module 603, and delivers the image/configuration information to the collaborated aerial vehicle or the ground control console via the communication module.

The synchronization module 607 of each of the two aerial vehicles mainly transmits a time synchronization signal according to a timestamp provided by the control module 605, to perform time synchronization. In addition, when spatial positioning has been completed, the synchronization module 607 will transmit a signal to the control module 605 to complete the synchronization process.

When the flight state of the collaborated aerial vehicle is abnormal and has gone beyond the capability of the jitter-prevention module 615, the control module 605 computes flight control parameters by considering the information transmitted from the multimedia collection apparatus, the baseline adjustment module 613 and the sensor 601, directly transmits a flight attitude and trajectory adjustment instruction (specifically referring to Embodiment 6 hereinafter) to the flight system 617, and may even perform initialization again via the synchronization module 607.

The interaction between the modules of the unmanned aerial vehicles will be described integrally hereinafter.

When the unmanned aerial vehicle is flying, signals are received by the antenna 604 and then input to the communication module 603. The communication module 603 demodulates the information received by the antenna 604 and then transmits the information to the control module 605. The control module 605 analyzes the information received from the communication module 603, and transmits control information to a corresponding module for execution. If it is required to perform a collaborative operation, the synchronization module 607 of the unmanned aerial vehicle will receive an instruction of the control module 605 and then perform a synchronization process. After the synchronization process is completed, the synchronization module 607 transmits a message to inform the control module 605 that the synchronization is completed.

After the synchronization is completed, the unmanned aerial vehicle may start synchronous shooting operation. For one unmanned aerial vehicle, the multimedia information collection apparatus transmits shot frame images to the jitter-prevention module 615. The jitter-prevention module 615 may calculate jitter information according to the inconsistency between the actual motion and expected motion of the frame images. Here, the frame images may be compensated according to the information between the frames of the frame images or the measured and estimated jitter, so as to realize the elimination of jitter. Meanwhile, the images shot by the multimedia information collection apparatus will also be transmitted to the control module 605, and the control module 605 performs deep learning front-end computation (specifically referring to Embodiments 2, 3 and 5 hereinafter). The result of computation is transmitted to the focusing module 609 and the baseline adjustment module 613 for further computation, respectively, and the focal length of the shot dual-camera frame images and a proper expected baseline distance between the two unmanned aerial vehicles are further determined. The focusing module 609 transmits the computed focal length value to a lens of the multimedia information collection apparatus for quick focusing. The baseline adjustment module 613 transmits the computed expected baseline distance to the control module 605 and the flight system 617. The flight system 617 collaboratively adjusts an actual baseline distance between the two aerial vehicles according to an adjustment instruction generated according to the expected baseline distance by the control module 605.

FIG. 6B shows the flow of shooting stereoscopic videos by two unmanned aerial vehicles, when the aerial vehicles are unmanned aerial vehicles, according to Embodiment 1 of the present disclosure.

The flowchart shown in FIG. 6b may be obtained according to an image stream (where the actual relative position relationship and the expected relative position relationship will be described with reference to Embodiment 2 hereinafter). This disclosure provides many embodiments. The embodiments are not mutually exclusive of each other. The original dual-camera frame images shot by the multimedia information collection apparatus are de-jittered by the jitter prevention module 615, and the de-jittered dual-camera frame images are transmitted to the control module 605. The control module 605 transmits, to the focusing module 609 and the baseline adjustment module 613, a front-end result computed according to the dual-camera frame images. The focusing module 609 determines focal length information for adjusting the focal length. The baseline adjustment module 613 determines expected baseline distance information and then transmits the expected baseline distance information to the flight system 617. The flight system 617 performs adjustment according to the expected baseline distance information, and transmits the adjusted actual baseline distance information to the jitter-prevention module 615. The jitter-prevention module 615 performs collaborative anti-jitter processing based on the actual baseline distance information (specifically referring to the description of the jitter-prevention module).

In Embodiment 1 of the present disclosure, when two aerial vehicles shoot a far-distance object or a medium-distance object by respective loaded multimedia collection apparatuses, the baseline distance between the two aerial vehicles may be adjusted. For example, distant buildings are shot by adjusting the baseline distance to 100 m. Thus, the far-distance object or medium-distance object has a stereoscopic effect when viewed by the user. As may be seen, the adjustment range of the baseline distance in Embodiment 1 of the present disclosure may go far beyond the size of an existing carrier represented by a single aerial vehicle. Thus, the technical problem that the far-distance object or medium-distance object in the multimedia information shot by the existing carrier, for example, a single aerial vehicle, is likely to lose the stereoscopic effect may be solved.

Moreover, in Embodiment 1 of the present disclosure, when two aerial vehicles shoot a medium-close-distance object by respective loaded multimedia collection apparatuses, the baseline distance between the two aerial vehicles may be reduced, so that the medium-close-distance object has a stereoscopic effect when viewed by the user.

Furthermore, in Embodiment 1 of the present disclosure, in the process of shooting multimedia information by two aerial vehicles, since the two aerial vehicles are dynamically flying, the distance to an object to be shot may change continuously. Therefore, in Embodiment 1 of the present disclosure, by properly and dynamically adjusting the baseline distance between the two aerial vehicles (i.e., between the multimedia collection apparatuses), the stereoscopic effect of the object to be shot may be always maintained, so that both the visual enjoyment of the user and the user experience are improved.

Embodiment 2

In Embodiment 2 of the present disclosure, the method for adjusting, according to an object to be shot, a baseline distance between two or more aerial vehicles in Embodiment 1 of the present disclosure will be described.

Embodiment 2 of the present disclosure provides a method for adjusting, according to an object to be shot, a baseline distance between two or more aerial vehicles, specifically including: adjusting, according to an object distance corresponding to the object to be shot and/or a content attribute of the object to be shot, a baseline distance/baseline distances between the two or more aerial vehicles.

Wherein, the content attribute of the object to be shot includes at least one of the following: the shape of the object to be shot, a region occupied in multimedia information by the object to be shot, and a surface feature attribute of the object to be shot.

A method for adjusting, according to an object distance corresponding to the object to be shot, a baseline distance/baseline distances between the two or more aerial vehicles will be described below.

Specifically, the object distances between the aerial vehicles and the object to be shot may be measured by binocular range finding, or computed according to an angle of pitch of the aerial vehicles and a shooting height of the aerial vehicles (a flight height during the collection).

Depth information of the object to be shot is determined according to the acquired dual-camera frame images collected by the respective multimedia collection apparatuses of the two aerial vehicles. It may be understood that the depth information of the object to be shot is the depth information with respect to (the multimedia collection apparatuses of) the aerial vehicles, the object distances between the object to be shot and the aerial vehicles may be determined. From this step, the object distances between the object to be shot and the aerial vehicles may be determined.

The object to be shot may be a salient object. A salient region may be directly extracted as a salient object from the dual-camera frame images by a salient detection method, an infrared detection method or an ultrasonic detection method. A multiple of detection regions may be extracted from the dual-camera frame images by an object detection method, and centered living objects such as a person or an animal occupying a large region in the frame image are preferentially selected as a salient object. If there are no living objects such as a person or an animal in the frame image, another object (e.g., a building or furniture) may be selected as a salient object.

According to the object distances between the object to be shot and the aerial vehicles, the baseline distance between the two aerial vehicles is adjusted.

The part (a) of FIG. 7 shows an example of a relationship between the object distance and the baseline distance. Referring to the part (a) of FIG. 7, since there is a large distance between a building as the object to be shot in an upper half of the frame image and the aerial vehicles, in order to make this building have a stereoscopic effect, the baseline distance between the two aerial vehicles shall be a long baseline distance. Therefore, when the object distance is larger, a longer baseline distance is expected.

Referring to the part (a) of FIG. 7, since there is a small distance between a building as the object to be shot in a lower half of the frame image and the aerial vehicles, in order to make this building have a stereoscopic effect, the baseline distance between the two aerial vehicles shall be a short baseline distance. Therefore, when the object distance is smaller, a shorter baseline distance is expected.

Preferably, if it is detected that the object to be shot in the dual-camera frame image is switched, the object distances between the switched object to be shot and the aerial vehicles are adjusted.

More preferably, the object distances between the object to be shot and the aerial vehicles are computed according to the angle of pitch of the aerial vehicles and the shooting height of the aerial vehicles; and, the baseline distance between the two aerial vehicles is adjusted according to the computed object distance.

FIG. 8 shows an instance of estimating the object distance according to the angle θ of pitch of the unmanned aerial vehicles and the shooting height of the unmanned aerial vehicles.

The multiple of methods for adjusting the baseline distance between two aerial vehicles according to the object distance in Embodiment 2 of the present disclosure are applicable for shooting a scene containing a close-distance object and/or a medium-distance object, and also applicable for shooting a scene containing a medium-far-distance object and/or a far-distance object.

Wherein, the object distance in the present disclosure is a distance between the object to be shot and the multimedia information collection apparatus of the aerial vehicle. The distance between the multimedia information collection apparatuses and the aerial vehicles may be ignored since it is far less than the distance between the object to be shot and the multimedia information collection apparatus. Therefore, the distance between the object to be shot and the aerial vehicle may be used as the object distance for computation hereinafter.

Those skilled in the art may demarcate the range of a medium-far object distance and the range of a far object distance according to the experimental data, historical data, empirical data and/or actual situations. For example, an object distance ranging from about 20 m to about 200 m may be defined as a medium-far object distance, and an object distance greater than about 200 m may be defined as a far object distance.

Preferably, for a medium-far-distance object or a far-distance object, the object distance may be determined according to the dual-camera frame image by binocular range finding.

Preferably, when the object distance is larger, human eyes are not sensitive to a small change in baseline distance. For a far-distance object, the object distance may be determined according to the angle of pitch of the aerial vehicles and the shooting height of the aerial vehicles. Thus, the computation complexity of the baseline adjustment algorithm may be simplified, the adjustment efficiency of the baseline distance may be improved, and the computation resources may be saved. Thus, it is advantageous to save the power of the unmanned aerial vehicles, and the time of endurance of the unmanned aerial vehicles may be prolonged.

A method for adjusting, according to the shape of the object to be shot, a baseline distance/baseline distances between the two or more aerial vehicles will be described below.

Specifically, the baseline distance/baseline distances between the two or more aerial vehicles are adjusted according to the parallax of the object to be shot in different camera frame images.

The shape of the object to be shot in the multimedia information is determined. Preferably, the object to be shot may specifically be a salient object. A region occupied by the salient object may be detected by the following method: an object detection method, a salient detection method, an infrared detection method or an ultrasonic detection method. Then, the shape of the salient object is determined.

When the shape of a same object to be shot in one camera frame image of the dual-camera frame image is the same as the shape shot in the other camera frame image, it is indicated that the object to be shot has no parallax in the dual-camera frame images, and it is not required to adjust the baseline distance between the two aerial vehicles.

Preferably, according to the parallax in the multimedia information collected for a same object by the multimedia collection apparatus of a same aerial vehicle under different baseline distances, the baseline distance between two aerial vehicles is adjusted.

When the multimedia collection apparatus of a same aerial vehicle shoots a same object under different baseline distances and if the shape of the object to be shot remains unchanged, it is not required to adjust the baseline distance in this case.

A method for adjusting, according to a region occupied in multimedia information by the object to be shot, a baseline distance/baseline distances between two or more aerial vehicles will be described below.

Specifically, a region occupied by the object to be shot is determined according to the acquired dual-camera frame image collected by the respective multimedia collection apparatuses of the two aerial vehicles. Preferably, the object to be shot may specifically be a salient object. A region occupied by the salient object may be detected by the following method: an object detection method, a salient detection method, an infrared detection method or an ultrasonic detection method.

The baseline distance between the two aerial vehicles is adjusted according to the size of the region occupied by the object to be shot.

The part (b) of FIG. 7 shows an instance of a relationship between the size of the region occupied by the object to be shot and the baseline distance. Referring to (b) of FIG. 7, since there is a small region occupied by a toy as the object to be shot in an upper half of the frame image, in a case where the object distances between the toy and the unmanned aerial vehicles remain unchanged, a large baseline distance between the unmanned aerial vehicles is required to ensure that the toy has a binocular parallax so that the toy has a stereoscopic effect. Therefore, when the region occupied by the object to be shot is small, the baseline distance is to be increased.

In the part (b) of FIG. 7, since there is a large region occupied by a person as the object to be shot in a lower half of the frame image, in a case where the object distances between this person and the unmanned aerial vehicles remain unchanged, a small baseline distance between the two unmanned aerial vehicles is required to ensure that this person has a binocular parallax so that this person has a stereoscopic effect. Therefore, when the region occupied by the object to be shot is large, the baseline distance is to be decreased.

Preferably, when the region occupied by the object to be shot belongs to a preset region level, on the basis of remaining the object distance, an expected baseline distance between the two aerial vehicles is determined from a corresponding preset expected baseline distance level; and, an actual baseline distance between the two aerial vehicles is adjusted according to the determined expected baseline distance.

A method for adjusting, according to a surface feature attribute of the object to be shot, a baseline distance/baseline distances between two or more aerial vehicles will be described below. The surface feature attribute comprises: texture, and/or color, or more.

Specifically, for two objects to be shot having a same distance to the aerial vehicles, if the surface texture of an object to be shot is smoother than a predetermined threshold, a longer baseline distance between two aerial vehicles is required to enhance the binocular parallax of the objects to be shot.

A surface texture feature of the object to be shot is determined from the multimedia information collected by the respective multimedia information collection apparatuses of two or more aerial vehicles. For example, the texture feature of the object to be shot may be acquired by high-pass filtering or other methods. Preferably, the object to be shot may specifically be a salient object.

The baseline distance between the two aerial vehicles is adjusted according to the surface texture feature of the object to be shot.

For example, a zebra as the object to be shot has rich texture information while an ordinary horse has less texture information. When unmanned aerial vehicles turn to shoot an ordinary horse from shooting a zebra, the baseline distance between the unmanned aerial vehicles may be increased.

Preferably, if the texture feature of an object to be shot is very poor and it is very insensitive to the baseline distance between two aerial vehicles, the stereoscopic effect of this object to be shot will not be enhanced significantly even if the baseline distance is adjusted. In this case, it is also possible to not adjust the baseline distance in order to save the unnecessary workload, improve the shooting efficiency and help nodes of the aerial vehicles to prolong the time of endurance of the aerial vehicles.

Preferably, when the surface feature attribute of the object to be shot is specifically texture and the texture belongs to a preset sparseness level, an expected baseline distance between the two aerial vehicles is determined from a corresponding preset expected baseline distance level; and, an actual baseline distance between the two aerial vehicles is adjusted according to the determined expected baseline distance.

Preferably, the sense of parallax is poorer if the surface color of the object to be shot is simpler. Therefore, when the surface color of the object to be shot is a single color, it is not required to adjust the baseline distance between the two aerial vehicles.

A method for adjusting, according to a shooting environment, a baseline distance/baseline distances between the two or more aerial vehicles will be described below. This method specifically comprises: adjusting, according to at least one of an ambient brightness of the shooting environment, a contrast ratio of a shooting background and the object to be shot and a flight height limit of the aerial vehicles, a baseline distance/baseline distances between the two or more aerial vehicles.

Specifically, when the ambient brightness of the shooting environment is weakened to a preset brightness level, the object distance is decreased to a preset object distance level. For example, when the unmanned aerial vehicles shoot while moving from a region with a higher ambient brightness to a region with a lower ambient brightness, the distance to the object to be shot may be decreased. The baseline distance between the two aerial vehicles is adjusted according to the decreased object distance.

When the contrast ratio of an environmental background and the object to be shot is decreased to a preset contrast ratio level, the object distance is decreased to a preset object distance level. For example, a contrast ratio of an oasis and a camel is larger, while a contrast ratio of the desert and the camel is smaller. When the unmanned aerial vehicles move from the oasis to the desert, the distance to the object to the shot may be decreased. The baseline distance between the two aerial vehicles is adjusted according to the decreased object distance.

When the aerial vehicles shoot from the outdoors to the indoors, the object distance is decreased to a preset object distance level. For example, when the unmanned aerial vehicles shoot from the outdoors to the indoors, due to a limited indoor shooting height, it is required to decrease the distance from the unmanned aerial vehicles to the object to be shot. The baseline distance between the two aerial vehicles is adjusted according to the decreased object distance.

More preferably, in practical operations, specifically, in the process of shooting a same object by two aerial vehicles, the baseline distance between the two aerial vehicles may remain unchanged to ensure the visual continuity of the shot contents, so that the user's discomfort caused by the frequent change in stereoscopic effect of the same object is avoided.

When the object to be shot remains unchanged, the baseline distance between the two aerial vehicles may remain unchanged even if the object distances between the object to be shot and the aerial vehicles, the region occupied by the object to be shot, the shape of the object to be shot, and/or the surface feature attribute of the object to be shot or more change.

FIG. 9 shows an instance in which a baseline distance between two aerial vehicles does not change when the object to be shot remains unchanged.

As shown in FIG. 9, for example, when two aerial vehicles follow a person (i.e., an object) from the indoors to the outdoors for shooting, the ambient brightness may change, and in this case, it is not required to adjust the baseline distance between the two aerial vehicles.

Preferably, when the object to be shot is switched, the aerial vehicles may slowly adjust the baseline distance between the two aerial vehicles so that a user adapts to the adjustment as soon as possible. For example, when the baseline distance between the two unmanned aerial vehicles is d at the current moment, the baseline distance may be adjusted at an adjustment speed of 0.1*d/s.

Wherein, the switching the object to be shot comprises: actively switching the object to be shot, and passively switching the object to be shot. The actively switching the object to be shot means that the current object to be shot is given up actively and switched to a next object to be shot as the object to be shot.

The passively switching the object to be shot means that the current object to be shot disappears from the field of view and a next object is forced as the object to be shot. For example, if a person as the current object to be shot enters a room, the unmanned aerial vehicles outdoor may not immediately shoot the person who enters the room, and the object to be shot is forced to switch to a door or other parts of the room.

In addition, when a salient objet as the object to be shot is not detected in the dual-camera frame image, the baseline distance between the two aerial vehicles is not adjusted.

In addition, a method for adjusting, according to a user instruction, a baseline distance between two aerial vehicles will be described below.

Specifically, object distances between a user-designated object to be shot and aerial vehicles are determined according to information about the user-designated object to be shot, and a baseline distance between the two aerial vehicles is adjusted. For example, after the system receives a user-designated object of interest, the unmanned aerial vehicles automatically perform baseline adjustment according to the information about the user-designated object. For example, this object region is reserved in the dual-camera frame image, and a surrounding region is reset as zero and input to the neural network as an image, so that an expected baseline distance is regressed.

Or, the baseline distance between the two aerial vehicles is adjusted according to a user's adjustment instruction to the baseline distance. For example, the user finely adjusts the baseline distance in real time, according to the visual effect generated by the automatic baseline adjustment done by the system. The system receives a baseline adjustment instruction of the user, and then adjusts the actual baseline distance.

Or, the baseline distance between the two aerial vehicles is adjusted according to the object distance adjusted by the user. For example, the user adjusts the object distance, for example, adjust a vertical height and a horizontal distance between the unmanned aerial vehicles and the object to be shot and a shooting angle; and the unmanned aerial vehicles automatically adjust the baseline distance between the two aerial vehicles according to the adjusted object distance.

A method for adjusting a baseline distance/baseline distances between two or more aerial vehicles will be described below.

Specifically, an adjustment mode of each aerial vehicle is determined, and a motion state of the respective aerial vehicle is adjusted according to the determined adjustment mode, the adjustment mode comprising an adjustment direction and/or an adjustment step.

Preferably, the adjustment of the baseline distance between two aerial vehicles may be realized in two modes, i.e., first baseline distance adjustment mode and second baseline distance adjustment mode.

The first baseline distance adjustment mode is as follows.

The adjustment state of the baseline distance between two aerial vehicles is classified into three types: ADJUSTMENT TO BE WIDER, ADJUSTMENT TO BE SHORTER and MAINTAIN (i.e., NO ADJUSTMENT). In the first baseline adjustment mode, the two aerial vehicles are equal in the adjustment step and opposite in the adjustment direction.

Preferably, in the first baseline distance adjustment mode, the baseline distance between the two aerial vehicles may be periodically adjusted according to a set adjustment step. Wherein, adjustment in one period comprises: acquiring multimedia information collected by the respective multimedia collection apparatuses of the two aerial vehicles, inputting the multimedia information into a preset deep learning neural network, and classifying and predicting whether the baseline distance adjustment state within the current period is ADJUSTMENT TO BE WIDER, ADJUSTMENT TO BE SHORTER or MAINTAIN. Furthermore, in the adjustment in one period, when the result of classification and prediction of the neural network indicates that the adjustment state within the current period is ADJUSTMENT TO BE WIDER or ADJUSTMENT TO BE SHORTER, controlling the respective flight systems of the two aerial vehicles so that the two aerial vehicles simultaneously adjust in a same direction or in an opposite direction by a distance of one adjustment step; and, continuously acquiring the multimedia information collected by the respective multimedia collection apparatuses of the two aerial vehicles after the baseline distance is adjusted within the current period, continuously classifying a baseline distance adjustment state within a next period, and ending the whole adjustment process of the baseline distance when the adjustment state of the baseline distance between the two aerial vehicles is MAINTAIN.

Further, in addition to the method of obtaining the result of classification and prediction by the neural network, an expected baseline distance between the two aerial vehicles may be obtained by a neural network regression algorithm; and, an actual baseline distance between the two aerial vehicles may further be adjusted based on the expected baseline distance. For example, when the baseline distance adjustment state is ADJUSTMENT TO BE WIDER or ADJUSTMENT TO BE SHORTER, the respective flight systems of the two aerial vehicles are controlled so that the two aerial vehicles simultaneously adjust their positions in a same direction or in an opposite direction until the actual baseline distance between the two aerial vehicles reaches the expected baseline distance.

More preferably, adjustment of the baseline distance between the two aerial vehicles in one period may comprise: directly acquiring an expected baseline distance between the two aerial vehicles within the current period by the neural network regression algorithm, and an actual baseline distance between the two aerial vehicles within the current period is obtained by a distance measurement device between the two aerial vehicles; and, determining whether the baseline distance adjustment state within the current period is ADJUSTMENT TO BE WIDER, ADJUSTMENT TO BE SHORTER or MAINTAIN. When the baseline distance adjustment state within the current period is ADJUSTMENT TO BE WIDER or ADJUSTMENT TO BE SHORTER, the respective flight systems of the two aerial vehicles are controlled so that the two aerial vehicles simultaneously adjust their positions in a same direction or in an opposite direction; and, adjustment of the baseline distance in a next period is performed until the actual baseline distance between the two aerial vehicles within a certain period is consistent with the expected baseline distance.

FIG. 10A shows a schematic diagram of an instance of adjusting the baseline distance between two aerial vehicles in the first baseline distance adjustment mode, according to Embodiment 2 of the present disclosure.

Referring to FIG. 10A, the baseline adjustment mode may be classified and predicted by the neural network, or may be obtained by comparing the current actual baseline distance with the expected baseline distance. Specifically, a baseline adjustment module 2603 included in the apparatus for determining stereoscopic multimedia information determines the baseline adjustment mode (ADJUSTMENT TO BE CLOSER, ADJUSTMENT TO BE FARTHER or MAINTAIN) and the expected baseline distance by using left-eye video frames and right-eye video frames, and flight systems 1001, 1003 of the two aerial vehicles are controlled to adjust flight trajectories, so that the baseline distance between the unmanned aerial vehicles is adjusted.

Next, second baseline distance adjustment mode is as follows.

In the second baseline distance adjustment mode, the adjustment modes for the two aerial vehicles are independent of each other. Each aerial vehicle has three adjustment directions: ADJUSTMENT TO LEFT, ADJUSTMENT TO RIGHT and NO ADJUSTMENT. In the second baseline distance adjustment mode, the two aerial vehicles are generally unequal in the adjustment step.

Preferably, in the second baseline distance adjustment mode, the adjustment mode for each aerial vehicle is determined according to the position of the object to be shot in the collected multimedia information. To make the object to be shot always in the center of the multimedia information, the two aerial vehicles may be different in the adjustment direction and the adjustment step.

Preferably, in the second baseline distance adjustment mode, the baseline distance between the two aerial vehicles may be periodically adjusted. Wherein, adjustment in one period comprises: acquiring multimedia information collected by the respective multimedia collection apparatuses of the two aerial vehicles, inputting the multimedia information into a preset deep learning neural network, and classifying and predicting the adjustment mode for each of the two aerial vehicles within the current period, the adjustment mode comprising an adjustment direction and an adjustment step, wherein the adjustment direction for each of the two aerial vehicles includes nine situations; according to the adjustment mode for each of the two aerial vehicles, controlling the respective flight systems of the two aerial vehicles, and adjusting the respective flight positions of the two aerial vehicles; and, continuously acquiring the multimedia information collected by the respective multimedia collection apparatuses of the two aerial vehicles after the baseline distance is adjusted within the current period, continuously classifying and predicting the respective adjustment modes of the two aerial vehicles, and ending the whole adjustment process of the baseline distance when the respective modes for the two aerial models both are NO ADJUSTMENT.

FIG. 10B shows an instance of adjusting the baseline distance between two aerial vehicles in the second baseline distance adjustment mode according to Embodiment 2 of the present disclosure.

Referring to FIG. 10B, the baseline adjustment module 2603 included in the apparatus for determining stereoscopic multimedia information determines the baseline adjustment mode (ADJUSTMENT TO LEFT, ADJUSTMENT TO RIGHT or MAINTAIN) for each unmanned aerial vehicle by using left-eye video frames and right-eye video frames, and the flight system 1001, 1003 of each unmanned aerial vehicles is controlled to adjust the flight trajectory according to the respective baseline adjustment mode thereof, so that the baseline distance between the unmanned aerial vehicles is adjusted.

In Embodiment 2 of the present disclosure, the baseline distance/baseline distances between two or more aerial vehicles may be adjusted in real time according to the distance (i.e., object distance) between the object to be shot and the aerial vehicles and the content attribute of the object to be shot, so that the object to be shot, particularly a medium-far-distance or far-distance object to be shot, has a sufficient binocular parallax in the multimedia information collected by the respective multimedia collection apparatuses of two or more aerial vehicles. Thus, the medium-far-distance or far-distance object to be shot is allowed to have a stereoscopic effect, and the viewing experience of the user is improved.

Moreover, in Embodiment 2 of the present disclosure, the baseline distance/baseline distances between two or more aerial vehicles is adjusted in real time according to at least one of the shape of the object to be shot, the region occupied in the multimedia information by the object to be shot, and the surface feature attribute of the object to be shot. The baseline distance/baseline distances between two or more aerial vehicles is adjusted according to at least one of the ambient brightness of the shooting environment, the contrast ratio of the shooting background and the object to be shot, and the flight height limit of the aerial vehicles. Hence, the stereoscopic effect of the object to be shot in the multimedia information collected by the respective multimedia collection apparatuses of two or more aerial vehicles is further improved.

Embodiment 3

Embodiment 3 of the present disclosure describes a method for de-jittering multimedia information collected by respective multimedia information collection apparatuses of two or more aerial vehicles. The methods and apparatuses of Embodiment 3 share features with the methods, apparatuses and applications of Embodiment 1. Many features of Embodiment 3 are related to compensation of jitter. The jitter compensation techniques of Embodiment 3 are applicable to the methods, apparatuses and applications of Embodiment 3. Many features of Embodiment 4 (discussed further below) are related to focal length; the Embodiment 4 methods, apparatuses and applications are also applicable to Embodiment 1 along with the features of Embodiment 3. This general accumulation of features, described in this paragraph particularly with Embodiments 3 and 4 is also applicable for the other embodiments.

FIG. 11 shows an instance of de-jittering multimedia information collected by a multimedia collection apparatus of each of two or more aerial vehicles according to Embodiment 3 of the present disclosure.

Referring to FIG. 11, an apparatus for determining stereoscopic multimedia information determines actual motion information corresponding to the multimedia information collected by the multimedia collection apparatus of each aerial vehicle, in 1101.

A feature point is determined from multimedia information collected by the multimedia collection apparatus of each aerial vehicle within a period of time corresponding to a set moment point.

The period of time corresponding to the set moment point may be a period of time containing the set moment point, for example, a period of time using the set moment point as a starting moment point, a period of time using the set moment point as an ending moment point, or a period of time in which the set moment point is a moment point within this period of time.

For example, it is assumed that four frames of single-camera frame images as multimedia information collected by unmanned aerial vehicles i and j are obtained at a moment t and a moment t+1. FIG. 12 shows a relationship between the four frames of single-camera frame images collected by the two unmanned aerial vehicles, according to Embodiment 3 of the present disclosure. At a same moment (e.g., moment t), pixel points of the single-camera frame images of different unmanned aerial vehicles should conform to the constraint of an actual relative position relationship $H_{ij}^{t}$; and, at the moment t+1, pixel points of the single-camera frame images of different unmanned aerial vehicles should conform to the constrain of an actual relative position relationship $H_{ij}^{t+1}$. In addition, between the moments t and t+1, the position information of a same feature point in two frames of single-camera frame images shot by each unmanned aerial vehicle may be used for estimating actual motion information of the images shot by this unmanned aerial vehicle at the moment t.

Preferably, a feature point is selected from multimedia information collected by a multimedia collection apparatus of a set aerial vehicle at a set moment point. A matched feature point in the multimedia information collected by the multimedia collection apparatus of each aerial vehicle within a period of time corresponding to the set moment point is determined according to the selected feature point.

Specifically, for a set aerial vehicle between two or more aerial vehicles, at least one feature point is extracted from the multimedia information collected by the multimedia collection apparatus of the set aerial vehicle at a set moment point.

For a multiple of feature points in the multimedia information (e.g., video frame images) collected by the set aerial vehicle at the corresponding set moment point, in the spatial dimension, feature points matched with the multiple of feature points may be determined from multimedia information collected by multimedia collection apparatuses of other aerial vehicles at the set moment point; and, in the time dimension, feature points matched with the multiple of feature points may be determined from multimedia information collected by the multimedia collection apparatus of the set aerial vehicle within a period of time (e.g., to which the set moment points belongs) corresponding to the set moment point.

More preferably, after the matched feature points are determined, for feature points in the multimedia information shot by the multimedia collection apparatus of each aerial vehicle at any moment within the period of time, feature points conforming to a relative position relationship of each aerial vehicle at the any moment point are selected.

Specifically, according to the actual baseline distance between the two aerial vehicles at the set moment point, a first actual relative position relationship corresponding to the multimedia information collected by the respective multimedia collection apparatuses of the two aerial vehicles at the set moment point is determined; and, feature points not conforming to the first actual relative position relationship in the multimedia information collected by each aerial vehicle at the set moment point are determined and then filtered. Wherein, the first actual relative position relationship specifically refers to a position relationship between matched feature points in the multimedia information of the two aerial vehicles at the set moment point. Further, when there is no feature point in one piece of multimedia information (e.g., collected by an aerial vehicle other than the set aerial vehicle), it is naturally not in conformity with the first actual relative position relationship.

For example, for single-camera frame images (used as multimedia information here) collected by an unmanned aerial vehicle i (used as a set aerial vehicle here) at a moment t (used as set moment point here), N candidate feature points may be acquired (by a feature point selection algorithm), and matched candidate feature points are searched from single-camera frame images collected by an unmanned aerial vehicle j at the moment t by using an actual relative position relationship $H_{ij}^{t}$ between the two unmanned aerial vehicles at the moment t.

FIGS. 13A and 13B show examples of principle of filtering feature points in frame images, according to Embodiment 3 of the present disclosure.

Referring to FIG. 13A, since the leftmost candidate feature points of the unmanned aerial vehicle i go beyond the field of view of the unmanned aerial vehicle j and may not be observed in the single-camera frame images shot by the unmanned aerial vehicle j, the leftmost candidate feature points of the unmanned aerial vehicle i are filtered. The actual relative position relationship is computed according to the measured baseline distance between the two unmanned aerial vehicles. In some embodiments, feature points are retained from the candidate feature points when the feature points appear in the field of view of both unmanned aerial vehicle i and unmanned aerial vehicle j. Retaining such feature points may also be referred to as screening. FIG. 13A shows a candidate feature point near vegetation at time t in the lower left of the field of view for unmanned aerial vehicle i ("vegetation candidate feature point"). No matching vegetation candidate feature point occurs in the field of view of unmanned aerial vehicle j: the unmatched vegetation feature point is exemplary of unmatched candidate feature points not retained for display to the user, in some embodiments.

In the time dimension, feature points matched with the feature points in the multimedia information at the set moment point are determined from the multimedia information collected by each aerial vehicle at another moment point after the set moment point.

According to the actual baseline distance between two aerial vehicles at another moment point (e.g., a next moment point) other than the set moment point, a second actual relative position relationship corresponding to the multimedia information collected by the respective multimedia collection apparatuses of the two aerial vehicles at the another moment point is determined; and, feature points not conforming to the second actual relative position relationship in the multimedia information collected by each aerial vehicle at the set moment point are determined and then filtered. Further, for feature points in the multimedia information collected by the set aerial vehicle at another moment point, when there are no feature points matched with these feature points in the multimedia information collected by other aerial vehicles at the another moment point, the feature points in the multimedia information collected by the set aerial vehicle at the another moment point naturally do not conform to the second actual relative position relationship.

The second actual relative position relationship specifically comprises: for at least one feature point in the multimedia information collected by the set aerial vehicle at the set moment point, the at least one feature point should have a same parallax in the multimedia information collected by the set aerial vehicle and other aerial vehicles at adjacent moment points. In other words, at least one feature point has no relative displacement relative to the aerial vehicles after a same period of time. When a certain feature point (of a moving object) has a relative displacement relative to the aerial vehicles after a same period of time, the parallax of this feature point in the multimedia information collected by the two aerial vehicles at adjacent moment points (moment points other than the set moment) is different from the parallax of other feature points (of a stationary object), and this feature point should be filtered.

In the multimedia information (e.g., frame images), an object which is stationary relative to the aerial vehicles may comprise an object which is stationary relative to the ground; or may comprises an object which slowly moves relative to the ground at a movement speed far less than the movement speed of the aerial vehicles during shooting (therefore, the movement speed may be ignored), for example, a running person.

The multimedia information generally has a low speed and is more likely to represent a stationary object. Therefore, the filtered feature points are generally feature points of a stationary distant object.

For example, by using a feature point matching technology, in single-camera frame images (used as multimedia information) of an unmanned aerial vehicle i (used as a set aerial vehicle) at a moment t+1 (used as a moment point other than the set moment point, e.g., an adjacent moment point), feature points matched with the candidate feature point in single-camera frame images of the unmanned aerial vehicle i at the moment t (used as the set moment point) are searched, and the same operation is performed on an unmanned aerial vehicle j (used as an aerial vehicle other than the set aerial vehicle).

The matched feature points in the dual-camera frame images of the two unmanned aerial vehicles i and j at the moment t+1 are verified by using an actual relative position relationship $H_{ij}^{t+1}$, which may be referred to generally as H_actual, between the two unmanned aerial vehicles at the moment t+1. Since a moving object still changes in position even without jitter of the unmanned aerial vehicles and the change in position of a close object in the images may not accurately reflect the jitter of the unmanned aerial vehicles, a large deviation will be brought to the result of estimation if the feature points of the moving object or the close object participate in the motion estimation process. Therefore, in the feature point matching process of the present disclosure, a series of feature points of a stable and stationary distant object are selected according to the relative position relationship between the two unmanned aerial vehicles, so that the accuracy of computation of the position information of feature points and the accuracy of collaborative jitter-prevention are improved.

Referring to FIG. 13B, since an automobile has a relative motion relative to the unmanned aerial vehicles and the automobile is a close object, the relative positions of feature points within the outline range of the automobile at the moment t+1 do not conform to the constraint $H_{ij}^{t+1}$, and such features points are then filtered.

Preferably, a set $\{p_i^t(m)\}$ of feature points is selected for an image frame$_i^t$ shot by an unmanned aerial vehicle i at a moment t. The set of feature points may be selected randomly, or may be obtained by feature extraction rules or other rules. A set $\{p_j^t(m)\}$ of corresponding points on an image frame$_i^t$ may be acquired by block matching, an optical flow method, feature matching or other methods, and satisfies the following formula (1):

$$p_i^t(m) = p_j^t(m) H_{ij}^t \qquad (1)$$

A correspondence between the images frame$_i^t$ and frame$_i^{t+1}$ when the unmanned aerial vehicle i is at adjacent moments t and t+1 is taken into consideration. For the set $\{p_i^t(m)\}$ of points on the frame image frame$_i^t$, a set $\{p_i^{t+1}(m^t)\}$ of corresponding feature points on the frame image frame$_i^{t+1}$ is computed by block matching, an optical flow method, feature matching or other methods; and, a set $\{p_j^{t+1}(m^t)\}$ of corresponding feature points on the frame image frame$_j^{t+1}$ is computed in a similar way, and satisfies the following formula (2):

$$p_i^{t+1}(m^t) = p_j^{t+1}(m^t) H_{ij}^{t+1} \qquad (2)$$

Accordingly, a set of feature points may be determined based on the formulas (1) and (2).

According to the determined feature point, motion information between multimedia information collected by the multimedia collection apparatuses within the period of time corresponding to the set moment point is determined as actual motion information corresponding to multimedia information collected by the multimedia collection apparatuses at the set moment point.

Preferably, position information of the feature point in multiple pieces of multimedia information collected within the period of time corresponding to the set moment point is determined. Motion information between any two adjacent pieces of multimedia information within the period of time is determined according to the determined position information.

Further, motion information between multimedia information at two adjacent moment points is determined according to the position information of the feature point in the multimedia information of a same aerial vehicle at a multiple of moment points.

FIG. 14 shows an instance of determining motion information between two frame images at adjacent moments, according to Embodiment 3 of the present disclosure.

Referring to FIG. 14, motion information $M_i^t$ between two frame images (used as multimedia information) within a period of time [t,t+1] may be estimated from the feature points selected by any unmanned aerial vehicle (the unmanned aerial vehicle i, as example) at the moments t and t+1 (FIG. 14). In other words, motion information $M_i^t$ between two frame images (used as multimedia information) within a period of time [t,t+1] may be calculated in the following formula (3):

$$\text{argmin } \Sigma_m \|M_i^t p_i^t(m) - p_i^{t+1}(m^t)\| \qquad (3)$$

wherein, argmin denotes Minimum value; and $\|*\|$ denotes a metric, which may be an L2 norm, an L1 norm or other meaningful metrics. Similarly, motion information of frame images within each period of time such as [t−1,t] and [t−2,t−1] may be estimated.

Preferably, according to the motion information between two adjacent pieces of multimedia information, the accumulated motion information of the multimedia information collected by the multimedia collection apparatuses within the period of time corresponding to the set moment point is determined as motion information between the multimedia information collected by the multimedia collection apparatuses within the period of time.

The accumulated motion information of the multimedia information collected within the period of time corresponding to the set moment point may be the accumulated motion information of the multimedia information collected at any two moment points within the period of time corresponding to the set moment point; or may be the accumulated motion information of the multimedia information collected at a multiple of moment points within the period of time corresponding to the set moment point. When the period of time corresponding to the set moment point contains only two moment points, that is the accumulated motion information of the multimedia information collected at the two moment points.

Further, according to the motion information between the multimedia information at two adjacent moments, the accumulated motion information of the multimedia information within the period of time corresponding to the set moment point is determined as actual motion information of the multimedia information at the set moment point.

FIG. 15 shows an instance of the accumulated motion information of a multiple of frame images within a period of time, according to Embodiment 3 of the present disclosure.

Referring to FIG. 15, the sum of motion information $M_i^t$ of frame images (used as multimedia information) within a period of time (e.g., a period of time [t−k,t+1]) is computed, and the accumulated actual motion information $F_i^t = M_i^t M_i^{t-1} \ldots M_i^{t-k}$ of the frame images, also referred to generally as F_actual, may be obtained based on the computed sum of motion information of frame images. Motion information from one frame to another in time may be referred to generally as actual motion information M.

Turning back to FIG. 11, the apparatus for determining stereoscopic multimedia information determines expected motion information corresponding to the multimedia information according to the actual motion information and an expected baseline distance/expected baseline distances between two or more unmanned aerial vehicles.

Specifically an expected relative position relationship between the two or more aerial vehicles is determined according to an expected baseline distance/expected baseline distances between two or more aerial vehicles; and, according to the actual motion information corresponding to the multimedia information collected by the multimedia collection apparatus of each aerial vehicle and the determined expected relative position relationship, expected motion information corresponding to the multimedia information collected by the multimedia collection apparatus of each aerial vehicle is determined.

Preferably, an expected relative position relationship corresponding to the multimedia information collected by the respective multimedia collection apparatuses of the two aerial vehicles at the set moment point is determined according to the expected baseline distance between the two aerial vehicles at the set moment point. The expression "at the set moment point" indicates a time interval including the set moment point. In FIG. 12, that time interval including the set moment point includes at least the interval including the times t and t+1. Expected motion information corresponding to the multimedia information collected by the multimedia collection apparatus of each aerial vehicle at the set moment point is determined according to the expected relative position relationship corresponding to the multimedia information at the set moment point.

For example, the expected relative position relationship is determined according to the expected baseline distance between the two aerial vehicles at the set moment point, which is regressed by the deep learning neural network operating on position data such as the spatial trajectories illustrated in FIG. 4. Considering the constraint of the expected relative position relationship ($H_{ij}^t$, also denoted H_expected) for the two unmanned aerial vehicles at the set moment point, the expected motion information of a single-camera frame image (used as multimedia information) shot by each unmanned aerial vehicle at the set moment point is obtained.

In other words, the expected motion information of a single-camera frame image shot by each unmanned aerial vehicle at the set moment point may be determined in the following formula (4):

$$\operatorname{argmin}(\|\tilde{F}_i^t - F_i^t\| + \|\tilde{F}_j^t - F_j^t\|) \quad (4)$$

wherein, $\tilde{F}_i^t$ and $\tilde{F}_j^t$ satisfy a relationship of $\tilde{F}_i^t = \tilde{F}_j^t \tilde{H}_{ij}^t$. $\tilde{F}_i^t$ and $\tilde{F}_j^t$ may also be referred to generally as F_expected. Thus, F_expected is a smoothed version of F_actual. F_actual suffers the effects of winds and control errors between the aerial vehicles. F_expected is a smoothed version of F_actual. F_expected, along with the baseline distance between the aerial vehicles, is a basis of an improved stereoscopic impression to a user.

In FIG. 11, the apparatus for determining stereoscopic multimedia information de-jitters the multimedia information collected by the multimedia collection apparatus of each aerial vehicle based on the actual motion information and expected motion information corresponding to the multimedia information, in 1103.

Jitter information corresponding to the multimedia information is determined according to the actual motion information and expected motion information corresponding to the multimedia information collected by the multimedia collection apparatus of each aerial vehicle; and, the multimedia information is de-jittered according to the jitter information.

Preferably, jitter information of the multimedia information at the set moment point is determined according to the actual motion information and expected motion information of the multimedia information shot by the multimedia collection apparatus of each aerial vehicle at the set moment point; and, the multimedia information at the set moment point is de-jittered according to the jitter information of the multimedia information at the set moment point.

Preferably, jitter information of the frame images may be obtained by comparing the actual motion information with the expected motion information of the frame images (used as multimedia information) shot by the unmanned aerial vehicles at the set moment point, and each frame image is de-jittered according to the jitter information.

For example, for the unmanned aerial vehicle i, jitter information $S_i^t$ of a single-camera frame image (used as multimedia information) shot at the moment t (used as the set moment point) is computed according to the following formula (5):

$$S_i^t = \tilde{F}_i^t / F_i^t \quad (5)$$

The jitter information may be referred to generally as S.

For a frame image with jitter, the frame image is de-jittered according to the following formula (6):

$$\widetilde{frame}_i^t = frame_i^t / S_i^t \tag{6}$$

In the formula (6), $\widetilde{frame}_i^t$ denotes the de-jittered single-camera frame image shot by the unmanned aerial vehicle i at the moment t.

Similarly, the single-camera frame image shot by the unmanned aerial vehicle j at the moment t may also be de-jittered in the same way.

It is to be noted that, in Embodiment 3 of the present disclosure, by utilizing the accumulated motion information of images constrained by the expected relative position relationship between the two unmanned aerial vehicles within a period of time, in comparison with utilizing motion information between adjacent frames, weak perturbation possibly contained in the motion information between adjacent frames may be eliminated, the smoothness of the motion information may be improved, and the smoothness of the whole de-jittering process may be improved by using smoother motion information.

A specific process of determining the relative position relationship H will be described below.

FIG. 16 shows an example of determining a position relationship of imaging pixels at a same three-dimensional point by two aerial vehicles, according to Embodiment 3 of the present disclosure.

Referring to FIG. 16, a position relationship between imaging pixels of the multimedia collection apparatuses of the two aerial vehicles at a same three-dimensional point is expressed by the following formula (7):

$$P' = K'RK^{-1}P + K't/Z \tag{7}$$

In the formula (7), P and P' are coordinate positions of two imaging pixel points in respective single-camera frame images, where $P=[x,y,z]^T$ and $P'=[x',y',z']^T$. A vector $\bar{P}'=[P',1]^T$ ($\bar{P}$ may be defined similarly) and a relative position relationship $$H = \begin{bmatrix} K'RK^{-1} & 0 \\ 0 & K't/Z \end{bmatrix}$$

may be defined so that $\bar{P}'=H\bar{P}$. In the formula (7), Z denotes the object distance, t denotes a translation transformation relationship (related to the baseline distance), and R denotes a rotation transformation matrix (which is related to an included angle of optical axes of the two multimedia collection apparatuses (e.g., dual-camera camera shooting apparatuses) of the two aerial vehicles in the normal plane; however, since the optical axes of the dual-camera multimedia collection apparatuses are parallel generally, R is degraded as a unit matrix I). K and K' are camera calibration matrixes, and are related to the focal length of the cameras and principal points of the cameras (it may be assumed that K is equal to K' when the parameters, such as focus of the cameras, are identical).

Variables influencing the relative position relationship H comprise the baseline distance. When feature points between single-camera frame images are matched in the spatial dimension and the time dimension in the step 1101, actual relative position relationships $H_{ij}^t$ and $H_{ij}^{t+1}$ may be obtained by the measured baseline distance; and, when the expected motion information of the images are computed in the step 1102, an expected relative position relationship $\tilde{H}_{ij}^t$ may be obtained by using the expected baseline distance regressed by the baseline adjustment module 613.

In another implementation, the unmanned aerial vehicles may measure an actual absolute position (including height and plane position) at each moment by their own measurement devices. For example, the height is measured by a barometer and by ultrasound. The plane position may be specifically a position in a plane parallel to the horizontal plane. For example, longitude and latitude coordinates may be measured by the Global Positioning System (GPS). An expected absolute position at each moment may be obtained by the flight systems, and the frame images shot by the unmanned aerial vehicles at each moment are de-jittered according to the expected absolute position and the actual absolute position.

In practice, since the absolute coordinate position of the unmanned aerial vehicles obtained by their own measurement devices generally has a large error (about 10 m), which greatly exceeds the amplitude of jitter, the de-jittering according to the expected absolute position and the actual absolute position may be regarded as pre-de-jittering before the de-jittering according to the actual motion information and expected motion information of the dual-camera frame image.

In Embodiment 3 of the present disclosure, a relative position relationship between two aerial vehicles is taken into consideration in the process of determining expected motion information of the multimedia information collected by each of two or more aerial vehicles, so it is equivalent that the expected motion information contains the relative position relationship between the two aerial vehicles. Moreover, compared with the existing de-jittering methods, by de-jittering, according to the expected motion information containing the relative position relationship between the two aerial vehicles and the actual motion information, the multimedia information collected by the respective multimedia collection apparatuses of the two aerial vehicles, it is advantageous to expand a common region between two pieces of de-jittered multimedia information, and the visual consistency between the two pieces of de-jittered multimedia information may be enhanced. As a result, it is advantageous to increase the stereoscopic effect of the stereoscopic multimedia information generated according to the de-jittered multimedia information, and the user's experience of viewing the stereoscopic multimedia information (e.g., a stereoscopic video) may be improved.

Moreover, in Embodiment 3 of the present disclosure, in the process of determining the actual motion information of the multimedia information collected by each of two aerial vehicles, feature points are filtered to reserve stationary and stable feature points, and the actual motion information of the multimedia information at the set moment point is determined based on the stationary and stable feature points. Thus, the accuracy of determining the actual motion information is increased in the embodiment of the present disclosure, the workload is reduced by filtering feature points, and the efficiency of determining the actual motion information and the efficiency of subsequent steps may also be improved.

Embodiment 4

Embodiment 4 of the present disclosure specifically describes a method for adjusting the shooting focal length of the multimedia collection apparatuses.

FIG. 17A shows an example of a method for adjusting a shooting focal length of multimedia collection apparatuses, according to Embodiment 4 of the present disclosure.

Referring to FIG. 17A, the apparatus for determining stereoscopic multimedia information determines an initial focal length according to the multimedia information collected by respective multimedia collection apparatuses of two or more aerial vehicles, in 1701.

The deep learning has an end-to-end learning characteristic in comparison with the conventional machine learning methods. A neural network quantitative model based on deep learning has many parameters, and is more excellent than the conventional methods and convenient for online learning and timely adjustment of the model. Meanwhile, by the deep learning, potential information such as salience in frame images may be autonomously learned according to pre-marked training samples.

Multimedia information (e.g., dual-camera frame images) collected by respective multimedia collection apparatuses of two or more aerial vehicles is processed by a neural network, to determine an estimated value of the focal length as an initial focal length.

Preferably, the de-jittered multimedia information is input into a deep learning neural network, an estimated value d' of the focal length of the multimedia information is regressed by the neural network, as an initial value of the focal length of the multimedia collection apparatuses of the two aerial vehicles, i.e., an initial focal length.

In FIG. 17A, the apparatus for determining stereoscopic multimedia information performs focal length search for each aerial vehicle by using the determined initial focal length as a starting point, in 1702.

For each of the two or more aerial vehicles, for the multimedia collection apparatus loaded in this aerial vehicle, the multimedia collection apparatus is controlled to perform focal length search by using the determined initial focal length as a starting point.

Each aerial vehicle has a different search direction when performing the focal length search. For example, the respective multimedia collection apparatuses of the two aerial vehicles are controlled to search the current focal length in opposite directions by using the initial focal length determined in the above step 1701 as a starting point.

FIG. 17B shows an example of bi-directionally searching the current focal length based on the initial focal length by respective multimedia collection apparatuses of two aerial vehicles, according to Embodiment 4 of the present disclosure. In FIG. 17B, the estimated focal length d' is an initial focal length; the ideal focal length is the current focal length. Cameras 1 and 2 are respective multimedia collection apparatuses of the two aerial vehicles; the focal length search mode for the multimedia collection apparatus of one aerial vehicle is d'→0; and, the focal length search mode for the multimedia collection apparatus of the other aerial vehicle is d'→∞.

When the multimedia collection apparatus of one aerial vehicle searches a proper focal length value, this proper focal length value is determined as the current focal length and then transmitted to the other aerial vehicle for focal length synchronization; and the multimedia collection apparatus of the other aerial vehicle performs focusing according to the received focal length. Since the current accurate focal length is generally close to the estimated initial focal length, the multimedia collection apparatuses of the two aerial vehicles perform bidirectional search starting from the estimated initial focal length in the step 1701. In comparison with an existing process of performing traversal search from the minimum focal length to the maximum focal length by one camera multimedia collection apparatus and performing traversal search from the maximum focal length to the minimum focal length by another camera multimedia collection apparatus, the accurate current focal length may be searched quickly.

FIG. 17C shows an example of bi-directionally searching the current focal length based on the initial focal length by respective multimedia collection apparatuses of two aerial vehicles, according to Embodiment 4 of the present disclosure.

In FIG. 17C, the host machine and the auxiliary machine may be designed by the user, or, the unmanned aerial vehicle having a high remaining battery level is designated as the host machine, or, the host machine and the auxiliary machine are allocated randomly since the distinction merely lies in the computational load. The focusing module 1701 of the host machine acquires an estimated value d' (i.e., an initial focal length) according to left-eye frame images and right-eye frame images. By using the multimedia collection apparatus as a reference, the focusing module of the host machine may search to the distant from the estimated value, and the focusing module 1703 of the auxiliary machine may search to the vicinity from the estimated value. The focal length value d in FIG. 17c denotes the accurate current focal length.

Actually, since there is often a certain difference between a training set and a test set, the optimal performance of the training set does not mean that multimedia information (e.g., frame images) collected in another environment (illumination, weather, objects to be shot or more) will certainly have excellent performance.

Therefore, to further improve the focusing performance, the original deep learning neural network model may be continuously optimized by online learning and by using the actually positioned accurate focal length value.

Specifically, the accurate focal length value may be bi-directionally searched by the respective multimedia collection apparatuses of the two aerial vehicles; and, a difference (e.g., an L2 norm) between the estimated value (the initial focal length) and the accurate focal length value is regressed as a loss by deep learning and then returned so that the deep learning neural network model may be updated. Consequently, the initial focal length estimated by the updated neural network model becomes more accurate, and the focusing speed is further increased.

In Embodiment 4 of the present disclosure, the multimedia information collected by the respective multimedia collection apparatuses of two or more aerial vehicles are deeply learned to obtain an accurate estimated value of the focal length as an initial focal length; and, the respective multimedia collection apparatuses of the two or more aerial vehicles perform search in different directions based on the initial focal length, so that an accurate focal length value may be positioned more quickly and the quick focusing may be realized.

Embodiment 5

The deep learning neural network is used in both the method for determining the baseline distance/baseline distances between two or more aerial vehicles and the adjustment mode thereof in Embodiment 2 of the present disclosure and the method for determining the initial focal length in Embodiment 4.

To save computing resources, since the baseline adjustment task and the focusing task have a similarity, a deep neural network may be shared for computation so as to save the computing resources and increase the speed of real-time processing.

Embodiment 5 of the present disclosure describes a multiple of methods for determining the baseline distance, the adjustment mode and the initial focal length based on a shared neural network.

FIG. 18 shows an example of a method for determining the baseline distance, the adjustment mode and the initial focal length based on a shared neural network, according to Embodiment 5 of the present disclosure.

Referring to FIG. 18, the apparatus for determining stereoscopic multimedia information processes multimedia information of a set aerial vehicle and multimedia information received from other aerial vehicles to obtain preceding-level processed feature multimedia information based on preceding part in a neural network, in 1801.

Specifically, one of two aerial vehicles (as a set aerial vehicle) processes one camera frame image of the one aerial vehicle and another camera frame image received from the other aerial vehicle by using the preceding part in a neural network, to obtain preceding-level processed feature images.

Generally, the shared neural network is integrally arranged on one aerial vehicle, and one aerial vehicle processes dual-camera frame images of two aerial vehicles by the shared neural network and shares the result of processing to the other aerial vehicle.

For example, FIG. 19 shows an instance of an interior structure and an operating principle of the shared neural network, according to Embodiment 5 of the present disclosure. The host machine and the auxiliary machine in FIG. 19 refer to a primary aerial vehicle and a secondary aerial vehicle, respectively; the block diagram 1901 in the left half part of FIG. 19 shows the whole shared neural network in the host machine, where sensing module 1 and sensing module 2 in the shared neural network are composite layers consisting of basic modules; and, the upper right part 1903 of FIG. 19 shows an enlarged interior structure of the sensing module 1, and the lower right part 1905 shows an enlarged interior structure of the sensing module 2. Arrows in FIG. 19 represent the trend of a signal stream. In the shared neural network of FIG. 19, the first cascade layer at the upper left corner to the last non-linear unit layer in the second column are preceding part in a neural network.

In FIG. 19, a cascaded layer functions to bond a multiple of pieces of data from upper layers and then perform subsequent processing. For example, if the dimensions of data output from two non-linear units in the sensing module 2 are C(Channel)1*H(Height)*W(Width) and C2*H*W, respectively, the cascaded output is (C1+C2)*H*W. In the above example, each H of the data output from the two non-linear units must have the same size, and each W must also have the same size. The non-linear units comprise Sigmoid (S-type activation function), Tan h (hyperbolic tangent activation function) and/or ReLU (Rectified Linear Unit) or more. The non-linear units function to introduce non-linear transformation into the neural network so as to enhance the capability of the network in classifying data.

A single-camera frame image shot by the multimedia collection apparatus of the auxiliary machine is down-sampled and then transmitted to the host machine (the down-sampled frame image may comprise but be not limited to 112*112 pixels). Upon receiving the down-sampled frame image, the host machine inputs two frame images into the preceding part in a neural network for computation, so as to obtain preceding-level processed feature images.

Turning back to FIG. 18, the apparatus for determining stereoscopic multimedia information processes the preceding-level processed feature multimedia information with first, second and third post parts in the neural network, to obtain an expected baseline distance, an adjustment mode of the baseline distance and an initial focal length, respectively, in 1802.

Preferably, one aerial vehicle (used as a set aerial vehicle) processes the preceding-level processed feature images by the first, second and third post parts in the neural network, to obtain an expected baseline distance, an adjustment mode of the baseline distance and an initial focal length, respectively.

For example, a portion after the last non-linear unit layer in the shared neural network of FIG. 19 is classed into the post part in a neural network. Wherein, following with the last non-linear unit, the first post part in a neural network consists of an sensing module 2, a pooling layer, and two fully-connected layers; the sensing module 2, the pooling layer and the fully-connected layer all extending to the lower left side, and a fully-connected layer and a Sigmoid classification layer both continuously extending to lower left form the second post part in a neural network; and, the sensing module 2, a pooling layer, a fully-connected layer and another full-connected layer all extending to a lower right side after the last non-linear unit layer form the third post part in a neural network.

The preceding-level processed feature images is processed by the first post part in the neural network, the second post part in the neural network and the third post part in the neural network, to obtain an expected baseline distance, an adjustment mode of the baseline distance and an initial focal length, respectively.

More preferably, the host machine and the auxiliary machine collect left-eye and right-eye frame images, respectively. Abstract features in the frame images may be extracted layer by layer by a convolutional layer, the pooling layer and other modules in the shared neural network. The deeply extracted image features may facilitate the improvement of the estimation accuracy of the baseline distance, the adjustment mode of the baseline distance and the focal length.

Moreover, with the increase in the number of layers of the neural network, the resolution of feature images input into a lower layer is gradually decreased, and the amount of computation is also reduced. Therefore, the preceding part in a neural network is complicated in computation and high in workload, while the post part in a neural network is simple in computation and low in workload. Hence, it is possible to specify the functions of the control module 605, the baseline adjustment module 613 and the focusing module 609. The control module 605 undertakes the computation involved in the preceding part in a neural network, and the baseline adjustment module 613 and the focusing module 609 utilizes the computation involved in the post parts in a neural network.

Preferably, the master control module, the baseline adjustment module 613 and the focusing module 609 may be different hardware modules. Since the baseline adjustment module 613 and the focusing module 609 have a small workload, the hardware configurations for the two modules may be saved, so that it is advantageous to reduce the cost while ensuring the computation real time.

The host machine transmits, as the computed results and to the auxiliary machine, the expected baseline distance, the adjustment direction of the baseline distance and the initial focal length; and the auxiliary machine performs adjustment according to the received computed results.

FIG. 20 shows an example of another method for determining the baseline distance, the baseline distance adjustment mode and the initial focal length based on a shared neural network, according to Embodiment 5 of the present disclosure.

Referring to FIG. 20, the apparatus for determining stereoscopic multimedia information processes multimedia information collected by the multimedia collection apparatus of a set aerial vehicle with a first-level sub-neural network among the preceding part in a neural network, to obtain first-level feature multimedia information of the set aerial vehicle, in 2001.

Preferably, one of two aerial vehicles processes the de-jittered one-camera frame image of this aerial vehicle by using a first-level sub-neural network among the preceding part in a neural network, to obtain a first-level feature image of the one camera.

Generally, a most portion of the shared neural network is arranged in one aerial vehicle, while a small portion of the shared neural network is arranged in the other aerial vehicle. The two aerial vehicles preprocess respective single-frame images according to front-end layers in the shared neural network, to obtain preprocessed feature images. Then, one aerial vehicle processes the preprocessed feature images of the two aerial vehicles by using the remaining layers of the shared neural network, and can share the final result of processing to the other aerial vehicle.

For example, FIG. 21 shows another example of an interior structure and an operating principle of the shared neural network, according to Embodiment 5 of the present disclosure.

The host machine and the auxiliary machine in FIG. 21 refer to a primary aerial vehicle and a secondary aerial vehicle, respectively; the block diagram 2101 in the left half part of FIG. 21 shows a portion of the shared neural network in the host machine; and, the block diagram 2103 in the right half part of FIG. 21 shows a portion of the shared neural network in the auxiliary machine.

In the shared neural network of FIG. 21, the portions from the first cascaded layer at the upper left corner and the first cascaded layer at the upper right corner to the last non-linear unit layer in the middle column are preceding parts in a neural network. The portion from the first cascaded layer to the last pooling layer in the left column is the first-level sub-neural network among the preceding parts in a neural network arranged in the host machine; and the portion from the first cascaded layer to the last pooling layer in the right column is a first-level sub-neural network among the preceding parts in a neural network arranged in the auxiliary machine.

The primary aerial vehicle of the two aerial vehicles processes the de-jittered one-camera frame image of this aerial vehicle by using the first-level sub-neural network among preceding parts in the neural network, to obtain a first-level feature image of the one camera. Similarly, the auxiliary aerial vehicle of the two aerial vehicles obtains a first-level feature image of the other camera, and transmits this first-level feature image to the primary aerial vehicle.

Turning back to FIG. 20, the apparatus for determining stereoscopic multimedia information receives first-level feature multimedia information of the other aerial vehicle, in 2002.

Preferably, the first-level feature image of the other camera of the other aerial vehicle is received.

Preferably, the primary aerial vehicle receives the first-level feature image of the other camera of the auxiliary aerial vehicle.

For example, the control module 605 in the primary aerial vehicle receives the first-level feature image of the other camera of the auxiliary aerial vehicle via the communication module 603 or the synchronization module 607.

The apparatus for determining stereoscopic multimedia information processes first-level feature multimedia information of the set aerial vehicle and the first-level feature multimedia information of the other aerial vehicle based on the second-level sub-neural network among the preceding parts in a neural network, to obtain the preceding-level processed feature multimedia information, in 2003.

Preferably, the first-level feature images of the two cameras are processed by using the second-level sub-neural network among the preceding parts in a neural network, to obtain the preceding-level processed feature images.

For example, in the shared neural network of FIG. 21, the portion from the first cascaded layer to the last non-linear unit layer in the middle column is the second-level sub-neural network among the preceding parts in a neural network arranged in the host machine.

The apparatus for determining stereoscopic multimedia information processes the preceding-level processed feature multimedia information with a first post part in a neural network, a second post part in a neural network and a third post part in a neural network, to obtain an expected baseline distance, an adjustment mode of the baseline distance and an initial focal length, respectively, in 2004.

The first, second and third post parts in a neural network in FIG. 21 are the same as those in FIG. 19.

The specific method for obtaining the expected baseline distance, the adjustment mode of the baseline distance and the initial local length in step 2004 is consistent with the specific method for obtaining the expected baseline distance, the adjustment mode of the baseline distance and the initial local length in the step 1802 so the detailed description thereof will be omitted here.

Preferably, the primary aerial vehicle processes the preceding-level processed feature images by using the first post part in the neural network, the second post part in the neural network and the third post part in the neural network, to obtain an expected baseline distance, an adjustment mode of the baseline distance and an initial focal length, respectively.

Accordingly, in the method in the steps S2001 to S2003, the primary and secondary aerial vehicles perform front-end computation, respectively, and the secondary aerial vehicle transmits an intermediate result of computation to the primary aerial vehicle for subsequent computation. This Embodiment 5 of the present disclosure may make full use of the computing resources of the two aerial vehicles, and make the real-time response speed quick.

In Embodiment 5 of the present disclosure, the computation workload of the method for determining the expected baseline distance, the adjustment mode of the baseline distance and the initial focal length is reduced by the shared neural network, the efficiency is improved, and the timeliness of the determination of the expected baseline distance, the adjustment mode of the baseline distance and the initial focal length is also improved. Furthermore, in the Embodiment 5 of the present disclosure, the energy consumption of the aerial vehicles is reduced, and it is advantageous to prolong the time of endurance of the aerial vehicles.

Moreover, in Embodiment 5 of the present disclosure, the neural network may be divided into preceding parts in a neural network and post parts in a neural network, and the computation for the post parts in a neural network with a low computation workload is allocated to the baseline adjustment module 613 and the focusing module 609. As a result, in the Embodiment 5 of the present disclosure, it is advantageous to reduce the requirements on the hardware configuration of the baseline adjustment module 613 and the focusing module 609, and reduce the cost while ensuring the computation timeliness.

Embodiment 6

Embodiment 6 of the present disclosure describes a method for performing time synchronization and/or spatial synchronization on two or more aerial vehicles, comprising: synchronizing the shooting time of two aerial vehicles, and allowing the two aerial vehicles to be coplanar.

The synchronization modules 607 in the two aerial vehicles may complete two tasks, i.e., spatial synchronization and time synchronization.

The spatial synchronization is mainly applied in the initialization process of the two aerial vehicles; may also be applied in the process of collecting multimedia information by respective multimedia collection apparatuses included in the two aerial vehicles, for example, restoring (reinitializing) in a case where the two aerial vehicles are not coplanar due to the jitter.

FIG. 22 shows an instance of spatial synchronization related hardware in an unmanned aerial vehicle, according to Embodiment 6 of the present disclosure. The spatial synchronization related hardware comprises: an optical transmitter, an optical receiver, an ultrasonic transmitting antenna, a receiving antenna array or more.

A method for positioning an unmanned aerial vehicle may be an LED (Light-Emitting Diode) based positioning method, a laser (which may be invisible light, for example, infrared light at 1480 nm) based positioning method, an ultrasonic positioning method or more.

Preferably, the ultrasound may be used for coarse positioning. The transmitting signals are received by an antenna array, and a stereoscopic angle is computed for positioning. A laser transmitter and a laser receiver are used for precise positioning and calibration. When a receiver center receives laser light having a highest power from the transmitter, the spatial positioning is finished.

In addition, this method may also be popularized and applied to the calibration of a multiple of parallel unmanned aerial vehicles by cascading.

For the online time synchronization, the time synchronization is used to synchronize and calibrate the communication time and shooting time of the two aerial vehicles. Only after the time synchronization is completed, the two aerial vehicles may perform synchronous shooting, and the shot dual-camera video frame images may be completely consistent in time.

Preferably, pulse light signals with a varying frequency are transmitted between the two aerial vehicles as synchronization signals, and timestamps are synchronized by the pulse light signals. Or, pulse electric signals with a varying frequency are transmitted between the two aerial vehicles as synchronization signals, and timestamps are synchronized by the electric signals.

The synchronization module 607 is also responsible for processing failures of the aerial vehicles and controlling the collaborative flight of a multiple of aerial vehicles, for example, collaborative steering control and automatic track shooting. This will be described in detail with reference to Embodiments 7 and 8.

Embodiment 7

Embodiment 7 of the present disclosure describes a collaborative steering control method of two aerial vehicles, comprising: after each of the two aerial vehicles receives a rotation instruction, determining, according to the rotation instruction, a common angular speed of the two aerial vehicles and a rotation trajectory of this aerial vehicle; and, performing, by each aerial vehicle, synchronous rotation flight according to the common angular speed and the rotation trajectory of this aerial vehicle.

When the aerial vehicles need to steer, the two aerial vehicles need to perform synchronous rotation while ensuring the continuity and consistence of the field of view. Here, the continuity and consistence of the field of view comprises the following condition that cameras of the two aerial vehicles are always coplanar, and the baseline distance between the two aerial vehicles needs to be adjusted according to an instruction indicated by the baseline adjustment module 613.

FIG. 23A is an instance of rotation trajectories of two aerial vehicles, according to Embodiment 7 of the present disclosure.

Referring to FIG. 23A, the two aerial vehicles have different distances to a center of a rotation sphere. So, to ensure the synchronization of the two aerial vehicles, rotation arc lengths of the two aerial vehicles may be adjusted to correspond to the distances from the two aerial vehicles to the center of the rotation sphere. Here, the synchronization means that the two aerial vehicles and the center of the rotation sphere are on a same radius (the two aerial vehicles and the center of the rotation sphere are on a same straight line) and the rotation angular speeds of the two aerial vehicles are equal.

Based on this, according to the Embodiment 7 of the present disclosure, when an aerial vehicle receives a rotation instruction, the synchronization module 607 determines the center of the rotation sphere and the respective rotation trajectories; the specific implementations (defining the angular speed of each aerial vehicle, or more) are performed by the control module 605; and an operation instruction is transmitted to the flight control system for operating the flight attitude of the aerial vehicle. During the adjustment process, the state of each aerial vehicle will be fed back to the control system in real time, so as to ensure that the two aerial vehicles are in a normal and synchronous state.

FIG. 23B shows an instance of a collaborative steering control method of two aerial vehicles, according to Embodiment 7 of the present disclosure.

Referring to FIG. 23B, the communication module 603 of each unmanned aerial vehicle 617 receives and quantizes a rotation instruction input by a user and parameters such as an expected position, a height and a shooting angle for the multimedia information collection apparatus (i.e., converts analog signals into machine-executable digital signals), and transmits the quantized instruction to the control module 605. The control module 605 then analyzes this rotation instruction received from the communication module 603 and transmits the analyzed information to the synchronization module 607.

Embodiment 8

Embodiment 8 of the present disclosure describes an automatic tracking and shooting method of two aerial vehicles.

The automatic tracking and shooting method of two aerial vehicles includes, after one of the two aerial vehicles receives a track instruction for a target object, determining and transmitting position information of the target object related to the track instruction by using dual-camera frame images to the other aerial vehicle.

According to the position information of the target object, the two aerial vehicles use the target object as an object to be shot for tracking and shooting. Specifically, the two aerial vehicles generates a corresponding rotation instruction so as to perform corresponding synchronous rotation flight and shoot dual-camera frame images when it is detected that a direction of motion of the target object changes.

Preferably, the aerial vehicles may track and shoot a certain object. When the control module 605 of each aerial vehicle receives, via the communication module 603, a track instruction transmitted by the ground control console, the aerial vehicle will maintain the current height and angle according to the track instruction and then track and shoot the target object. Meanwhile, when the object changed its orientation, the two aerial vehicles will be collaboratively rotated for shooting. This task is complicated and will be collaboratively accomplished by a multiple of modules, where the operating principles and implementations of the modules may refer to the above corresponding embodiments.

For example, FIG. 24 shows an instance of a target object, according to Embodiment 8 of the present disclosure.

Referring to FIG. 24, when a primary aerial vehicle receives an instruction of tracking the target object, the primary aerial vehicle will inform the secondary aerial vehicle to perform tracking and shooting together. Here, the target tracking technology is adopted, and the computation of the target tracking technology may be performed by the control module. The primary aerial vehicle performs real-time computation to obtain the position of the object to be tracked, then tracks the object to be tracked (as shown by the trajectory 1 in FIG. 25), and transmits related parameters to the secondary aerial vehicle. The communication module 603 of the secondary aerial vehicle receives a control command from the primary aerial vehicle, and performs synchronous adjustment (as shown by the trajectory 2 in FIG. 25) according to the command from the primary aerial vehicle; meanwhile, the control module 605 will cooperate with the baseline adjustment module 613 to adjust a proper baseline distance between the primary and secondary serial vehicles according to the target object (i.e., the antelope in FIG. 24) (the specific adjustment method of the baseline distance may refer to Embodiment 2), and input the received frame images into the focusing module 609 to estimate the focal length. After the adjustment of the focal length is completed, the two aerial vehicles follow the target object, the respective control modules 605 of the primary and secondary aerial modules transmits a specific flight instruction to the flight control system 617 and then the specific flight instruction is executed by the flight control system 617 till the end of the shooting. If the traveling trajectory of the target object in the whole process is not straight, the two aerial vehicles may perform synchronous rotation (the specific method of synchronous rotation may refer to Embodiment 7).

Accordingly, in the automatic tracking and shooting method of two aerial vehicles provided in Embodiment 8 of the present disclosure, stereoscopic videos and/or stereoscopic pictures of a moving target object may be automatically shot by using two aerial vehicles as two cameras.

Embodiment 9

Embodiment 9 of the present disclosure describes a method for processing typical exceptions in the process of shooting a stereoscopic video by two or more aerial vehicles.

In the Embodiment 9 of the present disclosure, a jitter-prevention method exceeding the capability of the jitter-prevention module 615 comprises: when it is detected that an overlapped region of an object to be shot contained in multimedia information collected by respective multimedia collection apparatuses of two aerial vehicles is less than an overlapped region threshold or it is detected that a unit jitter amplitude of any one of the two aerial vehicles exceeds a unit jitter amplitude threshold, performing synchronization again.

Specifically, in the shooting process by the two aerial vehicles, the control modules 605 in the aerial vehicles need to monitor the whole shooting process. Whether the jitter of the aerial vehicles is within the processing capability of the jitter-prevention module 615 may be determined by deciding the size of the overlapped region (i.e., matching degree between the feature points of dual-camera images) of dual-camera frame images (used as multimedia information of the two aerial vehicles) or by a physical apparatus measurement. The physical apparatus measurement may be the jitter amplitude of one aerial vehicle. For example, if the height of an unmanned aerial vehicle is reduced by 10 m within 1 s, the jitter amplitude is too large and exceeds the capability of the jitter-prevention module 615.

If the two aerial vehicles encounter a strong airflow or the state synchronization of the two aerial vehicles is abnormal, and the common field of view of the two aerial vehicles is thus too small (that is, the overlapped region in the dual-camera frame images is too small), then the control module 605 may detect the exception.

Subsequently, the two aerial vehicles may restart the synchronization process until they resumes to normal. Meanwhile, the control module 605 may compute flight control parameters by comprehensively considering the information transmitted from the multimedia information collection apparatus, the baseline adjustment module 613 and the sensor 601, and then directly transmit a flight attitude and trajectory adjustment instruction to the flight system.

A seamless replacement method of a single aerial vehicle after a failure occurs comprises: when one of the two aerial vehicles detects that this aerial vehicle is about to or has been already unable to operate normally, transmitting the parameters of this aerial vehicles to the other aerial vehicle in real time; allowing the other aerial vehicle fly to the vicinity of this aerial vehicle according to the real-time received parameters, then synchronizing this aerial vehicle with the other aerial vehicle, and continuous shooting by the other aerial vehicle in replace of this aerial vehicle.

For example, when one unmanned aerial vehicle B of two unmanned aerial vehicles A and B may not continuously operate normally within a short period of time due to the insufficient battery level or other problems, the unmanned aerial vehicle B will transmit a message to the ground control console, and the ground control console dispatches an unmanned aerial vehicle C to replace the unmanned aerial vehicle B. The ground dispatching station delivers, to the unmanned aerial vehicle C, operation state information of the unmanned aerial vehicle B, including the flight attitude, the operation task state and other detailed information. Upon receiving the information, the unmanned aerial vehicle C fits its own operation state to a same state as the unmanned aerial vehicle B by using the information content as a reference. At this time, the unmanned aerial vehicle B leaves the link and returns to the base station. At this time, the two unmanned aerial vehicles A and C operate collaboratively. Thus, the purpose of seamlessly switching between the unmanned aerial vehicles B and C is realized.

A method for saving computing resources comprises: by one of the two aerial vehicles, transmitting parameters required for adjustment of the baseline distance and/or the focal length to another aerial vehicle; and, allowing the another aerial vehicle to adjust the baseline distance and/or the focal length according to the received parameters.

For example, when two unmanned aerial vehicles operate collaboratively, a large amount of energy is to be consumed to maintain various operations such as flight, control, shooting and cooperation. However, parts of operation contents during cooperation of two unmanned aerial vehicles are similar or identical, for example, communication with the base station, path planning and flight control. To save energy, the identical or similar workloads between the two unmanned aerial vehicles are assigning to one unmanned aerial vehicle, and the result of computation is shared to the other unmanned aerial vehicle. Thus, when the unmanned aerial vehicles A and B operate collaboratively, the unmanned aerial vehicle A is maintained to work at 100% of computation loads, while the unmanned aerial vehicle B is merely maintained to work at loads necessary for its own operations (the operations of the flight system, the camera, the communication module 603 and the synchronization module 607) and to receive the result of computation from the unmanned aerial vehicle A. Hence, 30% to 50% of energy consumption in the unmanned aerial vehicle B may be saved.

Similarly, if a failure occurs in some sensors or other components such as the focusing module 609, the baseline adjustment module 613 and the jitter-prevention module 615 of the unmanned aerial vehicle B, the result of computation of the corresponding components of the collaborated unmanned aerial vehicle A may also be used.

At this time, the two aerial vehicles may monitor each other's operation performed therein. in real time.

For example, when one of the two unmanned aerial vehicles executes a task, the appearance or state information of the other aerial vehicle may be acquired by the multimedia information collection apparatus or the sensor 601. For example, if one unmanned aerial vehicle A becomes abnormal and the ground control console may not acquire information about the unmanned aerial vehicle A, the information about the unmanned aerial vehicle A is collected by the multimedia collection apparatus and the sensor 601 of the unmanned aerial vehicle B, and then fed back to the ground control console by the unmanned aerial vehicle B.

When occlusion occurs during shooting of an aerial vehicle, the aerial vehicle may perform the following process.

For example, in the process of shooting a stereoscopic video by two unmanned aerial vehicles, when it is detected that the multimedia information collection apparatus of a first unmanned aerial vehicle encounters an occluding object, the user may automatically or manually select a de-occluding mode via the ground control console, the ground control console transmits an instruction related to the de-occluding mode to the first unmanned aerial vehicle, and the multimedia information collection apparatus of the first unmanned aerial vehicle stops shooting until the occlusion ends. In this case, the multimedia information (e.g., frame images) collected by this multimedia information collection apparatus of the first unmanned aerial vehicle may be complemented by using the multimedia information collected by the multimedia information collection apparatus of a second aerial vehicle at a same moment. Thus, the storage resources of the aerial vehicles may be saved, and the audience will not be affected by the occlusion when viewing.

An apparatus for determining stereoscopic multimedia information based on the method according to the aforementioned embodiments of the present disclosure will now be described. According to the actual situations, the apparatus for determining stereoscopic multimedia information may include but be not limited to being arranged in the cloud of a backbone network, being arranged in a ground control console or being arranged in each of a multiple of aerial vehicles.

FIG. 26 shows a schematic block diagram of an interior structure of the device for determining stereoscopic multimedia information according to embodiments of the present disclosure.

Referring to FIG. 26, the apparatus for determining stereoscopic multimedia information includes a multimedia information acquisition module 2601, a stereoscopic multimedia information determination module 2602, and a storage module 2607.

Wherein, the multimedia information acquisition module 2601 is configured to acquire multimedia information collected by respective multimedia collection apparatuses of two or more aerial vehicles and store the multimedia information in the storage module 2607.

The stereoscopic multimedia information determination module 2602 is configured to determine corresponding stereoscopic multimedia information according to the multimedia information stored in the storage module 2607.

More preferably, as shown in FIG. 26, the device for determining stereoscopic multimedia information according to embodiments of the present disclosure further inlcudes a baseline adjustment module 2603.

The baseline adjustment module 2603 is configured to adjust, according to an object to be shot and/or a shooting environment, a baseline distance/baseline distances between the two or more aerial vehicles.

Preferably, the baseline adjustment module 2603 is specifically configured to adjust, according to an object distance corresponding to the object to be shot and/or a content attribute of the object to be shot, a baseline distance/baseline distances between the two or more aerial vehicles, the content attribute of the object to be shot comprising at least one of the following: a shape of the object to be shot, a region occupied in the multimedia information by the object to be shot, and a surface feature attribute of the object to be shot.

Preferably, the baseline adjustment module 2603 is configured to adjust, according to at least one of an ambient brightness of the shooting environment, a contrast ratio of a shooting background and the object to be shot and a flight height limit of the aerial vehicles, a baseline distance/ baseline distances between the two or more aerial vehicles.

Preferably, the baseline adjustment module 2603 is configured to determine an adjustment mode for each aerial vehicle according to the position of the object to be shot in the multimedia information stored in the storage module 2607, respectively.

More preferably, as shown in FIG. 26, the device for determining stereoscopic multimedia information according to embodiments of the present disclosure further includes a jitter-prevention module 2604.

The jitter-prevention module 2604 is configured to de-jitter the multimedia information stored in the storage module 2607.

Preferably, the jitter-prevention module 2604 is specifically configured to: determine actual motion information corresponding to the multimedia information collected by the multimedia collection apparatus of each aerial vehicle; determine, according to the actual motion information and an expected baseline distance/expected baseline distances between the two or more unmanned aerial vehicles, expected motion information corresponding to the multimedia information; and, correspondingly de-jitter the multimedia information according to the actual motion information and expected motion information corresponding to the multimedia information.

Preferably, the jitter-prevention module 2604 is configured to: determine a feature point from multimedia information collected by the multimedia collection apparatus of each aerial vehicle within a period of time corresponding to a set moment point; and, determine, according to the determined feature point, motion information between multimedia information collected by the multimedia collection apparatus within the period of time corresponding to the set moment point, as actual motion information corresponding to multimedia information collected by the multimedia collection apparatus at the set moment point.

Preferably, the jitter-prevention module 2604 is configured to: determine position information of the feature point in multiple pieces of multimedia information collected within the period of time corresponding to the set moment point; determine, according to the determined position information, motion information between any two adjacent pieces of multimedia information within the period of time; and, determine, according to the motion information between two adjacent pieces of multimedia information, the accumulated motion information of the multimedia information collected by the multimedia collection apparatus within the period of time, as motion information among the multimedia information collected by the multimedia collection apparatus within the period of time.

Preferably, the jitter-prevention module 2604 is configured to: select a feature point from multimedia information collected by a multimedia collection apparatus of a set aerial vehicle at a set moment point; and, determine, according to the selected feature point, a matched feature point in the multimedia information collected by the multimedia collection apparatus of each aerial vehicle within a period of time corresponding to the set moment point.

Preferably, the jitter-prevention module 2604 is further configured to: for feature points in the multimedia information shot by the multimedia collection apparatus of each aerial vehicle at any moment point within the period of time, select feature points conforming to a relative position relationship of each aerial vehicle at the any moment point.

Preferably, the jitter-prevention module 2604 is specifically configured to: determine, according to an expected baseline distance/expected baseline distances between two or more aerial vehicles, an expected relative position relationship between the two or more aerial vehicles; and, determine, according to the actual motion information corresponding to the multimedia information collected by the multimedia collection apparatus of each aerial vehicle and the determined expected relative position relationship, expected motion information corresponding to the multimedia information collected by the multimedia collection apparatus of each aerial vehicle.

Preferably, the jitter-prevention module 2604 is configured to: determine, according to the actual motion information and expected motion information corresponding to the multimedia information collected by the multimedia collection apparatus of each aerial vehicle, jitter information corresponding to the multimedia information; and, de-jitter the multimedia information according to the jitter information.

More preferably, as shown in FIG. 26, the device for determining stereoscopic multimedia information according to embodiments of the present disclosure further comprises a focusing module 2605.

The focusing module 2605 is configured to adjust a shooting focal length of the multimedia collection apparatuses.

Preferably, the focusing module 2605 is specifically configured to: determine an initial focal length according to the multimedia information collected by respective multimedia collection apparatuses of the two or more aerial vehicles; and, for each aerial vehicle, perform focal length search by using the determined initial focal length as a starting point, each aerial vehicle having a different search direction when performing focal length search.

More preferably, as shown in FIG. 26, the device for determining stereoscopic multimedia information according to embodiments of the present disclosure further comprises a synchronization module 2606.

The synchronization module 2606 is configured to perform time synchronization and/or spatial synchronization on the two or more aerial vehicles.

Specifically, the synchronization module 2606 is configured to, after performing time synchronization and/or spatial synchronization on the two or more aerial vehicles, transmit a notification indicating that synchronization has been performed to the multimedia information acquisition module 2601.

Moreover, the multimedia information acquisition module 2601 is configured to, upon receiving the notification indicating that synchronization has been performed, continue acquiring multimedia information collected by the respective multimedia collection apparatuses of two or more aerial vehicles.

More preferably, the device for determining stereoscopic multimedia information according to embodiments of the present disclosure further comprises a control module (not shown in the figures).

The control module is configured to enable a set aerial vehicle to process the multimedia information of this set aerial vehicle and the multimedia information received from other aerial vehicles by using a preceding part in a neural network in a neural network, to obtain the preceding-level processed feature multimedia information; and, enable the set aerial vehicle to process the preceding-level processed feature multimedia information by using first, second and third post parts in a neural network in the neural network, to obtain the expected baseline distance, the adjustment mode for the baseline distance and the initial focal length, respectively.

Or, the control module is configured to enable a set aerial vehicle to process the multimedia information collected by the multimedia collection apparatus of this set aerial vehicle by using a first-level sub-neural network in a preceding part in a neural network, to obtain first-level feature multimedia information of this set aerial vehicle; enable the set aerial vehicle to receive the first-level feature multimedia information from the other aerial vehicle; and, enable the set aerial vehicle to process the first-level feature multimedia information of this set aerial vehicle and the other aerial vehicle by using a second-level sub-neural network in the preceding parts in a neural network, to obtain preceding-level processed feature multimedia information.

The implementations of functions of the multimedia information acquisition module 2601, the stereoscopic multimedia information determination module 2602, the baseline adjustment module 2603, the jitter-prevention module 2604, the focusing module 2605, the synchronization module 2606 and the control module may refer to the specific contents of the flow steps of the methods according to Embodiments 1 to 9, so the detailed description thereof will be omitted here.

Although the multimedia information acquisition module 2601, the stereoscopic multimedia information determination module 2602, the baseline adjustment module 2603, the jitter-prevention module 2604, the focusing module 2605, the synchronization module 2606, the storage module 607, and the control module are shown to be implemented in separate units, the apparatus for determining stereoscopic multimedia information may be implemented in the form that at least two of the multimedia information acquisition module 2601, the stereoscopic multimedia information determination module 2602, the baseline adjustment module 2603, the jitter-prevention module 2604, the focusing module 2605, the synchronization module 2606, the storage module 607, and the control module are integrated. For example, the multimedia information acquisition module 2601 may be configured with a single transceiver, and the stereoscopic multimedia information determination module 2602, the baseline adjustment module 2603, the jitter-prevention module 2604, the focusing module 2605, the synchronization module 2606, the storage module 607, and the control module may be implemented in a single processor. Alternatively, the apparatus for determining stereoscopic multimedia information may be implemented in a single processor.

FIG. 27A shows a detailed framework instance of a single unmanned aerial vehicle, according to embodiments of the present disclosure. Especially, FIG. 27A shows a detailed framework instance of an unmanned aerial vehicle 2700 according to an embodiment of the present disclosure, in which a transmission mode for an internal information stream of the unmanned aerial vehicle is mainly shown. For clarity, some information not involved in the present disclosure has been omitted in FIG. 27A.

FIG. 27B shows another detailed framework instance of unmanned aerial vehicles, according to embodiments of the present disclosure. Especially, FIG. 27B shows a detailed framework instance of two unmanned aerial vehicles 2701, 2703 according to embodiments of the present disclosure, in which a transmission mode for an internal information stream of each unmanned aerial vehicle is mainly shown and a transmission mode for the information stream between the two unmanned aerial vehicles 2701, 2703. For clarity, some information not involved in the present disclosure has been omitted in FIG. 27B.

A user may use an unmanned aerial vehicle to shoot 2D videos, or use two unmanned aerial vehicles to shoot stereoscopic videos. In comparison with the existing unmanned aerial vehicles for shooting videos, the main hardware cost of the apparatus for determining stereoscopic multimedia information according to embodiments of the present disclosure is spent for the arrangement of a synchronization module in the unmanned aerial vehicle. Thus, it may be very convenient for the user to shoot an expected stereoscopic video without relying on any complicated apparatus, and it is advantageous to reduce the overall cost of a system for determining stereoscopic multimedia information and expand the application range of this system.

It should be understood by those skilled in the art that the present disclosure involves devices for carrying out one or more of operations as described in the present application. Those devices may be specially designed and manufactured as intended, or may comprise well known apparatuses (i.e., devices) in a general-purpose computer. Those devices have computer programs stored in a universal computer, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure may also be alternated, changed, rearranged, decomposed, combined or deleted. Further, the steps, measures and solutions of the prior art in the operations, methods and operations disclosed in the present disclosure may also be alternated, changed, rearranged, decomposed, combined or deleted.

Several embodiments have thus been described, but it will be understood that various modifications may be made without departing the scope of the present disclosure. Thus, it will be apparent to those ordinary skilled in the art that the present disclosure is not limited to the embodiments described, but may encompass not only the appended claims but the equivalents.

What is claimed is:

1. A method for determining stereoscopic multimedia information,
   the method comprising:
   adjusting a baseline distance between a plurality of aerial vehicles based on distances between a target object to be shot by the aerial vehicles and the aerial vehicles, and an attribute of the target object where the distances between the target object and the aerial vehicles remain unchanged, wherein the plurality of aerial vehicles includes a first aerial vehicle and a second aerial vehicle;

acquiring multimedia information about the target object from the first and the second aerial vehicles with the adjusted baseline distance; and determining stereoscopic multimedia information based on the acquired plurality of multimedia information.

2. The method according to claim 1,
wherein the attribute of the target object comprises at least one of: a shape of the target object, a region occupied in multimedia information by the target object, and a surface feature attribute of the target object,
wherein adjusting the baseline distance further comprises:
adjusting the baseline distance according to at least one of:
an ambient brightness of a shooting environment of the target object,
a contrast ratio between a shooting background and the target object, and
a flight height limit of the plurality of aerial vehicles;
determining an adjustment mode of the first aerial vehicle based on a position of the target object; and
adjusting a motion state of the first aerial vehicle according to the determined adjustment mode,
wherein the adjustment mode comprises at least one of an adjustment direction and an adjustment step.

3. The method of claim 1, further comprising:
determining actual motion information M corresponding to the acquired plurality of multimedia information;
determining actual accumulated motion information F_actual in terms of a time sequence of M values;
determining expected accumulated motion information F_expected based on actual accumulated motion information F_actual and an expected relative position relationship H_expected between the first and the second aerial vehicles; and
de-jittering the acquired plurality of multimedia information based on the actual accumulated motion information F_actual and the expected accumulated motion information F_expected.

4. The method of claim 3, wherein the determining actual accumulated motion information F_actual comprises determining a feature point in the acquired plurality of multimedia information within a period of time corresponding to a set moment point.

5. The method of claim 4, wherein the determining the feature point comprises:
determining position information of the feature point;
determining actual motion information M between two adjacent single-camera frame images, wherein the plurality of multimedia information includes the two adjacent single-camera frame images; and
determining, according to the actual motion information M the actual accumulated motion information F_actual.

6. The method of claim 4, wherein the determining the feature point comprises:
selecting a first feature point in multimedia information acquired from the first aerial vehicle at the set moment point among the acquired plurality of multimedia information;
determining, according to the selected feature point, a matched feature point in the plurality of multimedia information; and for a first plurality of feature points selected in the acquired plurality of multimedia information, screening a second plurality of feature points conforming to a relative position relationship H_actual,
wherein screening refers to retention of the second plurality of feature points for display to a user, and wherein the first plurality of feature points includes the second plurality of feature points, and wherein the second plurality of feature points includes the first feature point.

7. The method of claim 3, wherein the expected relative position relationship H_expected is obtained based on a regression of aerial vehicle position data.

8. The method of claim 3, wherein de-jittering the acquired plurality of multimedia information comprises:
determining jitter information S of a single-camera frame image for the first aerial vehicle, wherein the acquired plurality of multimedia information includes the single-camera frame image; and
de-jittering the single-camera frame image according to the jitter information S.

9. The method of claim 1, further comprising: one of i) adjusting a shooting focal length of the first and the second aerial vehicles and ii) performing at least one of time synchronization and spatial synchronization between the first aerial vehicle and the second aerial vehicle.

10. The method of claim 9, wherein the adjusting the shooting focal length comprises:
determining an initial focal length according to the acquired plurality of multimedia information;
for the first aerial vehicle, performing a first focal length search by using the determined initial focal length as a starting point; and
for the second aerial vehicle, performing a second focal length search by using the determined initial focal length as a starting point,
wherein the first and the second focal length searches have different search directions.

11. An apparatus for determining stereoscopic multimedia information, the apparatus comprising:
a transceiver transmitting stereoscopic multimedia information and receiving control
signals; and
a processor configured to:
adjust a baseline distance between a plurality of aerial vehicles based on distances between a target object to be shot by the aerial vehicles and the aerial vehicles, and an attribute of the target object where the distances between the target object and the aerial vehicles remain unchanged, wherein the plurality of aerial vehicles includes a first aerial vehicle and a second aerial vehicle,
acquire multimedia information about the target object from the first and the second aerial vehicles with the adjusted baseline distance, and
determine the stereoscopic multimedia information based on the acquired plurality of multimedia information.

12. The apparatus of claim 11,
wherein the attribute of the target object comprise at least one of: a shape of the target object, a region occupied in multimedia information by the target object, and a surface feature attribute of the target object;
wherein the processor is further configured to:
adjust the baseline distance according to at least one of:
an ambient brightness of a shooting environment of the target object, a contrast ratio of a shooting background and the target object, and a flight height limit of the plurality of aerial vehicles, determine an adjustment mode of the first aerial vehicle based on a position of the target object; and adjust a motion state of the first aerial vehicle according to the determined adjustment mode, wherein the adjustment mode comprises at least one of an adjustment direction and an adjustment step.

13. The apparatus of claim 11, wherein the processor is further configured to:

determine actual motion information M corresponding to the acquired plurality of multimedia information;

determine expected accumulated motion information F_expected based on actual accumulated motion information F_actual and an expected relative position relationship H_expected between the first and the second aerial vehicles; and de-jitter the acquired plurality of multimedia information based on the actual accumulated motion information F_actual and the expected accumulated motion information F_expected.

14. The apparatus of claim 13, wherein the processor is further configured to:

determine a feature point in the acquired plurality of multimedia information within a period of time corresponding to a set moment point.

15. The apparatus of claim 14, wherein the processor is further configured to:

determine position information of the feature point;

determine, actual motion information M between two adjacent single-camera frame images, wherein the plurality of multimedia information includes the two adjacent single-camera frame images; and determine, according to the actual motion information M, the actual accumulated motion information F_actual.

16. The apparatus of claim 14, wherein the processor is further configured to:

select a first feature point in multimedia information acquired from the first aerial vehicle at the set moment point among the acquired plurality of multimedia information;

determine, according to the selected feature point, a matched feature point in the plurality of multimedia information; and for a first plurality of feature points selected in the acquired plurality of multimedia information, retain feature points conforming to a relative position relationship H_actual for display to a user, wherein the first plurality of feature points includes the second plurality of feature points, and wherein the second plurality of feature points includes the first feature point.

17. The apparatus of claim 13, wherein the processor is further configured to:

determine the expected motion information H_expected based on a regression of aerial vehicle position data.

18. The apparatus of claim 13, wherein the processor is further configured to:

determine jitter information S of a single-camera frame image for the first aerial vehicle, wherein the acquired plurality of multimedia information includes the single-camera frame image; and de-jitter the single-camera frame image according to the jitter information S.

19. The apparatus of claim 11, wherein the processor is further configured to:

adjust a shooting focal length of the first and the second aerial vehicles; and perform time synchronization and spatial synchronization between the first aerial vehicle and the second aerial vehicle.

20. The apparatus of claim 19, wherein the processor is further configured to:

determine an initial focal length according to the acquired plurality of multimedia information; and for the first aerial vehicle, perform a first focal length search by using the determined initial focal length as a starting point, for the second aerial vehicle, perform a second focal length search by using the determined initial focal length as a starting point, wherein the first and the second focal length searches have different search directions.

* * * * *